US012788540B2

(12) United States Patent
Levy et al.

(10) Patent No.: US 12,788,540 B2
(45) Date of Patent: Nov. 10, 2026

(54) AUTOMATIC IMAGE SELECTION FOR IMAGES OF DENTAL SITES

(71) Applicant: Align Technology, Inc., San Jose, CA (US)

(72) Inventors: Tal Levy, Rehevot (IL); Shai Ayal, Tel Aviv (IL); Sergei Ozerov, Yerevan (AM); Doron Malka, Tel Aviv (IL); Ido Tishel, Kfar Bilu (IL)

(73) Assignee: Align Technology, Inc., San Jose, CA (US)

( * ) Notice: Subject to any disclaimer, the term of this patent is extended or adjusted under 35 U.S.C. 154(b) by 201 days.

(21) Appl. No.: 18/605,783

(22) Filed: Mar. 14, 2024

(65) Prior Publication Data

US 2024/0307158 A1 Sep. 19, 2024

Related U.S. Application Data

(60) Provisional application No. 63/452,875, filed on Mar. 17, 2023.

(51) Int. Cl.
*A61C 9/00* (2006.01)
*G06T 7/00* (2017.01)
*G06T 17/00* (2006.01)

(52) U.S. Cl.
CPC .......... *A61C 9/0053* (2013.01); *G06T 7/0012* (2013.01); *G06T 17/00* (2013.01); *G06T 2207/30036* (2013.01)

(58) Field of Classification Search
CPC ..... A61C 9/0053; G06T 7/0012; G06T 17/00; G06T 2207/30036; G06T 7/55
See application file for complete search history.

(56) References Cited

U.S. PATENT DOCUMENTS 6,099,314 A 8/2000 Kopelman et al.
6,334,772 B1 1/2002 Taub et al.
6,334,853 B1 1/2002 Kopelman et al.
6,463,344 B1 10/2002 Pavlovskaia et al.
6,542,249 B1 4/2003 Kofman et al.
6,633,789 B1 10/2003 Nikolskiy et al.
6,664,986 B1 12/2003 Kopelman et al.
6,697,164 B1 2/2004 Babayoff et al.
6,845,175 B2 1/2005 Kopelman et al.
6,979,196 B2 12/2005 Nikolskiy et al.
7,030,383 B2 4/2006 Babayoff et al.
7,202,466 B2 4/2007 Babayoff et al.
7,255,558 B2 8/2007 Babayoff et al.
7,286,954 B2 10/2007 Kopelman et al.
7,319,529 B2 1/2008 Babayoff
7,373,286 B2 5/2008 Nikolskiy et al.
7,507,088 B2 3/2009 Taub et al.
(Continued)

*Primary Examiner* — Jennifer Mehmood
*Assistant Examiner* — Dustin Bilodeau
(74) *Attorney, Agent, or Firm* — Lowenstein Sandler LLP

(57) ABSTRACT

Embodiments relate to techniques for selecting images from a plurality of images generated by an intraoral scanner. A method includes receiving a plurality of images of a dental site generated by an intraoral scanner, identifying a subset of images from the plurality of images that satisfy one or more selection criteria, selecting the subset of images that satisfy the one or more selection criteria, and discarding or ignoring a remainder of images of the plurality of images that are not included in the subset of images.

20 Claims, 23 Drawing Sheets

(56) References Cited

U.S. PATENT DOCUMENTS

| | | | |
|---|---|---|---|
| 7,545,372 | B2 | 6/2009 | Kopelman et al. |
| 7,698,068 | B2 | 4/2010 | Babayoff |
| 7,916,911 | B2 | 3/2011 | Kaza et al. |
| 8,108,189 | B2 | 1/2012 | Chelnokov et al. |
| 8,244,028 | B2 | 8/2012 | Kuo et al. |
| 8,587,582 | B2 | 11/2013 | Matov et al. |
| 8,948,482 | B2 | 2/2015 | Levin |
| D742,518 | S | 11/2015 | Barak et al. |
| 9,192,305 | B2 | 11/2015 | Levin |
| 9,261,356 | B2 | 2/2016 | Lampert et al. |
| 9,261,358 | B2 | 2/2016 | Atiya et al. |
| 9,299,192 | B2 | 3/2016 | Kopelman |
| D760,901 | S | 7/2016 | Barak et al. |
| 9,393,087 | B2 | 7/2016 | Moalem |
| 9,408,679 | B2 | 8/2016 | Kopelman |
| 9,431,887 | B2 | 8/2016 | Boltanski |
| 9,439,568 | B2 | 9/2016 | Atiya et al. |
| 9,451,873 | B1 | 9/2016 | Kopelman et al. |
| D768,861 | S | 10/2016 | Barak et al. |
| D771,817 | S | 11/2016 | Barak et al. |
| 9,491,863 | B2 | 11/2016 | Boltanski |
| D774,193 | S | 12/2016 | Makmel et al. |
| 9,510,757 | B2 | 12/2016 | Kopelman et al. |
| 9,660,418 | B2 | 5/2017 | Atiya et al. |
| 9,668,829 | B2 | 6/2017 | Kopelman |
| 9,675,430 | B2 | 6/2017 | Verker et al. |
| 9,693,839 | B2 | 7/2017 | Atiya et al. |
| 9,717,402 | B2 | 8/2017 | Lampert et al. |
| 9,724,177 | B2 | 8/2017 | Levin |
| 9,844,426 | B2 | 12/2017 | Atiya et al. |
| 10,076,389 | B2 | 9/2018 | Wu et al. |
| 10,098,714 | B2 | 10/2018 | Kuo |
| 10,108,269 | B2 | 10/2018 | Sabina et al. |
| 10,111,581 | B2 | 10/2018 | Makmel |
| 10,111,714 | B2 | 10/2018 | Kopelman et al. |
| 10,123,706 | B2 | 11/2018 | Elbaz et al. |
| 10,136,972 | B2 | 11/2018 | Sabina et al. |
| 10,380,212 | B2 | 8/2019 | Elbaz et al. |
| 10,390,913 | B2 | 8/2019 | Sabina et al. |
| 10,453,269 | B2 | 10/2019 | Furst |
| 10,456,043 | B2 | 10/2019 | Atiya et al. |
| 10,499,793 | B2 | 12/2019 | Ozerov et al. |
| 10,504,386 | B2 | 12/2019 | Levin et al. |
| 10,507,087 | B2 | 12/2019 | Elbaz et al. |
| 10,517,482 | B2 | 12/2019 | Sato et al. |
| 10,695,150 | B2 | 6/2020 | Kopelman et al. |
| 10,708,574 | B2 | 7/2020 | Furst et al. |
| 10,772,506 | B2 | 9/2020 | Atiya et al. |
| 10,813,727 | B2 | 10/2020 | Sabina et al. |
| 10,888,399 | B2 | 1/2021 | Kopelman et al. |
| 10,952,816 | B2 | 3/2021 | Kopelman |
| 10,980,613 | B2 | 4/2021 | Shanjani et al. |
| 11,013,581 | B2 | 5/2021 | Sabina et al. |
| D925,739 | S | 7/2021 | Shalev et al. |
| 11,096,765 | B2 | 8/2021 | Atiya et al. |
| 11,238,586 | B2 | 2/2022 | Minchenkov et al. |
| 11,367,192 | B2 | 6/2022 | Kopelman et al. |
| 11,455,727 | B2 | 9/2022 | Minchenkov et al. |
| 11,478,132 | B2 | 10/2022 | Kopelman et al. |
| 11,563,929 | B2 | 1/2023 | Saphier et al. |
| 11,633,268 | B2 | 4/2023 | Moalem et al. |
| 11,707,238 | B2 | 7/2023 | Moshe et al. |
| RE49,605 | E | 8/2023 | Kopelman |
| 11,744,681 | B2 | 9/2023 | Kopelman et al. |
| 11,759,277 | B2 | 9/2023 | Shalev et al. |
| 11,896,461 | B2 | 2/2024 | Saphier et al. |
| 11,937,996 | B2 | 3/2024 | Peleg |
| 2018/0168781 | A1* | 6/2018 | Kopelman ....... A61B 1/000094 |
| 2021/0059796 | A1 | 3/2021 | Weiss et al. |
| 2021/0121049 | A1 | 4/2021 | Rudnitsky et al. |
| 2021/0137653 | A1 | 5/2021 | Saphier et al. |
| 2021/0196152 | A1 | 7/2021 | Saphier et al. |
| 2021/0321872 | A1 | 10/2021 | Saphier et al. |
| 2023/0248473 | A1* | 8/2023 | Bercovici .......... A61C 13/0004 700/98 |
| 2024/0144600 | A1* | 5/2024 | Schmidt-Krulig ... A61B 5/0088 |

* cited by examiner

1205

1215

1225

1440

1460

AUTOMATIC IMAGE SELECTION FOR IMAGES OF DENTAL SITES

RELATED APPLICATIONS

This application claims benefit of U.S. Provisional Application No. 63/452,875, filed Mar. 17, 2023, the contents of which are hereby incorporated by reference in their entirety.

TECHNICAL FIELD

Embodiments of the present disclosure relate to the field of dentistry and, in particular, to a systems and methods for selecting images of dental sites.

BACKGROUND

Modern intraoral scanners capture thousands of color images when performing intraoral scanning of dental sites. These thousands of color images consume a large amount of storage space when stored. Additionally, performing image processing of the thousands of color images of dental sites consumes a large amount of memory and compute resources. Furthermore, transmission of the thousands of color images consumes a large network bandwidth. Additionally, some or all of the color images may be generated under non-uniform lighting conditions, causing some regions of images to have more illumination and thus greater intensity and other regions of the images to have less illumination and thus lesser intensity.

SUMMARY

Multiple implementations are described herein, a few of which are summarized below.

In a 1$^{st}$ implementation, a method comprises: receiving a plurality of images of a dental site generated by an intraoral scanner; identifying a subset of images from the plurality of images that satisfy one or more selection criteria; selecting the subset of images that satisfy the one or more selection criteria; and discarding or ignoring a remainder of images of the plurality of images that are not included in the subset of images.

A 2$^{nd}$ implementation may further extend the 1$^{st}$ implementation. In the 2$^{nd}$ implementation, the method is performed by a computing device connected to the intraoral scanner via a wired or wireless connection.

A 3$^{rd}$ implementation may further extend the 1$^{st}$ or 2$^{nd}$ implementation. In the 3$^{rd}$ implementation, the method further comprises: storing the selected subset of images without storing the remainder of images from the plurality of images.

A 4$^{th}$ implementation may further extend any of the 1$^{st}$ through 3$^{rd}$ implementations. In the 4th implementation, the method further comprises: performing further processing of the subset of images without performing further processing of the remainder of images.

A 5$^{th}$ implementation may further extend any of the 1$^{st}$ through 4$^{th}$ implementations. In the 5$^{th}$ implementation, the plurality of images comprise a plurality of color two-dimensional (2D) images.

A 6$^{th}$ implementation may further extend any of the 1$^{st}$ through 5$^{th}$ implementations. In the 6$^{th}$ implementation, the plurality of images comprise a plurality of near-infrared (NIR) two-dimensional (2D) images.

A 7$^{th}$ implementation may further extend any of the 1$^{st}$ through 6$^{th}$ implementations. In the 7$^{th}$ implementation, the method is performed during intraoral scanning.

An 8$^{th}$ implementation may further extend the 7$^{th}$ implementation. In the 8$^{th}$ implementation, the plurality of intraoral images are generated by the intraoral scanner at a rate of over fifty images per second.

A 9$^{th}$ implementation may further extend any of the 7$^{th}$ or 8$^{th}$ implementations. In the 9$^{th}$ implementation, the method further comprises: receiving one or more additional images of the dental site during the intraoral scanning; determining that the one or more additional images satisfy the one or more selection criteria and cause an image of the subset of images to no longer satisfy the one or more selection criteria; selecting the one or more additional images that satisfy the one or more selection criteria; removing the image that no longer satisfies the one or more selection criteria from the subset of images; and discarding or ignoring the image that no longer satisfies the one or more selection criteria.

A 10$^{th}$ implementation may further extend any of the 1$^{st}$ through 9$^{th}$ implementations. In the 10$^{th}$ implementation, the method further comprises: receiving a plurality of intraoral scans of the dental site generated by the intraoral scanner; generating a three-dimensional (3D) polygonal model of the dental site using the plurality of intraoral scans; identifying, for each image of the plurality of images, one or more faces of the 3D polygonal model associated with the image; for each face of the 3D polygonal model, identifying one or more images of the plurality of images that are associated with the face and that satisfy the one or more selection criteria; and adding the one or more images to the subset of images.

A 11$^{th}$ implementation may further extend the 10$^{th}$ implementation. In the 11$^{th}$ implementation, the subset of images comprises, for each face of the 3D polygonal model, at least one image associated with the face.

A 12$^{th}$ implementation may further extend 10$^{th}$ or 11$^{th}$ implementations. In the 12$^{th}$ implementation, the subset of images comprises, for each face of the 3D polygonal model, at most one image associated with the face.

A 13$^{th}$ implementation may further extend any of the 10$^{th}$ through 12$^{th}$ implementations. In the 13$^{th}$ implementation, the 3D polygonal model is a simplified polygonal model having about 600 to about 3000 faces.

A 14$^{th}$ implementation may further extend the 13$^{th}$ implementation. In the 14$^{th}$ implementation, the method further comprises: determining a number of faces to use for the 3D polygonal model.

A 15$^{th}$ implementation may further extend any of the 10$^{th}$ through 14$^{th}$ implementations. In the 15$^{th}$ implementation, identifying one or more faces of the 3D polygonal model associated with an image comprises: determining a position of a camera that generated the image relative to the 3D polygonal model; generating a synthetic version of the image by projecting the 3D polygonal model onto an imaging plane associated with the determined position of the camera; and identifying the one or more faces of the 3D polygonal model in the synthetic version of the image.

A 16$^{th}$ implementation may further extend the 15$^{th}$ implementation. In the 16$^{th}$ implementation, the synthetic version of the image comprises a height map.

A 17$^{th}$ implementation may further extend the 15$^{th}$ or 16$^{th}$ implementation. In the 17$^{th}$ implementation, determining the position of the camera that generated the image relative to the 3D polygonal model comprises: determining a first position of the camera relative to the 3D polygonal model based on a first intraoral scan generated prior to generation of the image; determining a second position of the camera relative to the 3D polygonal model based on a second intraoral scan generated after to generation of the image; and interpolating between the first position of the camera relative to the 3D polygonal model and the second position of the camera relative to the 3D polygonal model based.

An 18$^{th}$ implementation may further extend any of the 15$^{th}$ through 17$^{th}$ implementations. In the 18$^{th}$ implementation, the method further comprises: determining a face of the 3D polygonal model assigned to each pixel of a synthetic version of the image; identifying a foreign object in the image; determining which pixels from the synthetic version of the image that are associated with a particular face overlap with the foreign object in the image; and subtracting those pixels that are associated with the particular face and that overlap with the foreign object in the image from a count of a number of pixels of the synthetic version of the image that are associated with the particular face.

A 19$^{th}$ implementation may further extend the 18$^{th}$ implementation. In the 19$^{th}$ implementation, identifying the foreign object in the image comprises: inputting the image into a trained machine learning model, wherein the trained machine learning model outputs an indication of the foreign object.

A 20$^{th}$ implementation may further extend the 19$^{th}$ implementation. In the 20$^{th}$ implementation, the trained machine learning model outputs a mask that indicates, for each pixel of the image, whether or not the pixel is classified as a foreign object.

A 21$^{st}$ implementation may further extend any of the 10$^{th}$ through 20$^{th}$ implementations. In the 21$^{st}$ implementation, the method further comprises: for each image of the plurality of images, determining a respective score for each face of the 3D polygonal model; wherein identifying, for each face of the 3D polygonal model, the one or more images that are associated with the face and that satisfy the one or more selection criteria comprises determining that the one or more images have a highest score for the face.

A 22$^{nd}$ implementation may further extend the 21$^{st}$ implementation. In the 22$^{nd}$ implementation, the method further comprises: for each image of the plurality of images, assigning a face of the 3D polygonal model to each pixel of the image; wherein determining, for an image of the plurality of images, the score for a face of the 3D polygonal model comprises determining a number of pixels of the image assigned to the face of the of the 3D polygonal model.

A 23$^{rd}$ implementation may further extend the 22$^{nd}$ implementation. In the 23$^{rd}$ implementation, the method further comprises: for each image of the plurality of images, and for each pixel of the image, determining whether the pixel is saturated; and applying a weight to the pixel based on whether the pixel is saturated, wherein the weight adjusts a contribution of the pixel to the score for a face of the 3D polygonal model.

A 24$^{th}$ implementation may further extend the 22$^{nd}$ or 23$^{rd}$ implementations. In the 24$^{th}$ implementation, the method further comprises: for each image of the plurality of image, and for one or more face of the 3D polygonal model, performing the following comprising: determining an angle between a normal to the face and an imaging axis associated with the image; and applying a weight to the score for the face based on the angle between the normal to the face and the imaging axis associated with the image.

A 25$^{th}$ implementation may further extend any of the 22$^{nd}$ through 24$^{th}$ implementations. In the 25$^{th}$ implementation, the method further comprises: for each image of the plurality of images, and for one or more face of the 3D polygonal model, performing the following comprising: determining an average brightness of pixels of the image associated with the face; and applying a weight to the score for the face based on the average brightness.

A 26$^{th}$ implementation may further extend any of the 22$^{nd}$ through 25$^{th}$ implementations. In the 26$^{th}$ implementation, the method further comprises: for each image of the plurality of images, and for one or more face of the 3D polygonal model, performing the following comprising: determining an amount of saturated pixels of the image associated with the face; and applying a weight to the score for the face based on the amount of saturated pixels.

A 27$^{th}$ implementation may further extend any of the 22$^{nd}$ through 26$^{th}$ implementations. In the 27$^{th}$ implementation, the method further comprises: for each image of the plurality of images, determining a scanner velocity of the intraoral scanner during capture of the image; and applying, for the image, a weight to the score for at least one face of the 3D physical model based on the scanner velocity.

A 28$^{th}$ implementation may further extend any of the 22$^{nd}$ through 27$^{th}$ implementations. In the 28$^{th}$ implementation, the method further comprises: for each image of the plurality of images, and for one or more face of the 3D polygonal model, performing the following comprising: determining an average distance between a camera that generated the image and the face of the 3D polygonal model; and applying a weight to the score for the face based on the average distance.

A 29$^{th}$ implementation may further extend any of the 22$^{nd}$ through 28$^{th}$ implementations. In the 29$^{th}$ implementation, the method further comprises: assigning weights to each pixel of the image based on one or more weighting criteria; wherein determining, for the image, the score for a face of the 3D polygonal model comprises determining a value based on a number of pixels of the image assigned to the face of the of the 3D polygonal model and weights applied to one or more pixels of the number of pixels assigned to the face of the 3D polygonal model.

A 30$^{th}$ implementation may further extend any of the 22$^{nd}$ through 29$^{th}$ implementations. In the 30$^{th}$ implementation, the method further comprises: for each image of the plurality of images, and for each pixel of the image, determining a difference between a distance of the pixel to the camera that generated the image and a focal distance of the camera; and applying a weight to the pixel based on the difference.

A 31$^{st}$ implementation may further extend any of the 21$^{st}$ through 30$^{th}$ implementations. In the 31$^{st}$ implementation, the method further comprises: sorting the faces of the 3D polygonal model based on scores of the one or more images associated with the faces; and selecting a threshold number of faces associated with images having highest scores A 32$^{nd}$ implementation may further extend the 31$^{st}$ implementation. In the 32$^{nd}$ implementation, the method further comprises: discarding or ignoring images associated with faces not included in the threshold number of faces.

A 33$^{rd}$ implementation may further extend any of the 1$^{st}$ through 32$^{nd}$ implementations. In the 33$^{rd}$ implementation, a computer readable medium comprises instructions that, when executed by a processing device, cause the processing device to perform the method of any of the 1$^{st}$ through 32$^{nd}$ implementations.

A 34$^{th}$ implementation may further extend any of the 1$^{st}$ through 32$^{nd}$ implementations. In the 34$^{th}$ implementation, and intraoral scanning system comprises: the intraoral scanner to generate the plurality of images; and a computing device, wherein the computing device is to perform the method of any of the 1$^{st}$ through 32$^{nd}$ implementations.

In a 35$^{th}$ implementation, a method comprises: receiving a plurality of images of one or more dental sites having non-uniform illumination provided by one or more light sources of an intraoral scanner, the plurality of images having been generated by a camera of the intraoral scanner at a plurality of distances from a surface of the one or more dental sites; and training a uniformity correction model to attenuate the non-uniform illumination for images generated by the camera using the plurality of images of the one or more dental sites.

A 36$^{th}$ implementation may further extend the 35$^{th}$ implementation. In the 36$^{th}$ implementation, the method further comprises: for each image of the plurality of images, and for each pixel of the image, determining one or more intensity values; and using pixel coordinates and the one or more intensity values of each pixel of each image to train the uniformity correction model.

A 37$^{th}$ implementation may further extend the 36$^{th}$ implementation. In the 37$^{th}$ implementation, the uniformity correction model is trained to receive an input of pixel coordinates of a pixel and to output a gain factor to apply to an intensity value of the pixel.

A 38$^{th}$ implementation may further extend the 35$^{th}$ or 36$^{th}$ implementation. In the 38$^{th}$ implementation, the plurality of images as received have a red, green, blue (RGB) color space, the method further comprising: converting the plurality of images from the RGB color space to a second color space, wherein the one or more intensity values are determined in the second color space.

A 39$^{th}$ implementation may further extend any of the 35$^{th}$ through 38$^{th}$ implementations. In the 39$^{th}$ implementation, the method further comprises: for each image of the plurality of images, and for each pixel of the image, determining one or more intensity values and a depth value; and using pixel coordinates, the depth value and the one or more intensity values of each pixel of each image to train the uniformity correction model.

A 40$^{th}$ implementation may further extend the 39$^{th}$ implementation. In the 40$^{th}$ implementation, the method further comprises: receiving a plurality of intraoral scans of the one or more dental sites, the plurality of intraoral scans associated with the plurality of images; generating one or more three-dimensional (3D) surfaces of the one or more dental sites using the plurality of intraoral scans; registering the plurality of images to the one or more 3D surfaces; and determining, for each pixel of each image, the depth value of the pixel based on a result of the registering.

A 41$^{st}$ implementation may further extend the 40$^{th}$ implementation. In the 41$^{st}$ implementation, the method further comprises: for each image of the plurality of images, and for each pixel of the image, performing the following: determining a normal to a 3D surface of the one or more 3D surfaces at the pixel; and determining an angle between the normal to the 3D surface and an imaging axis of at least one of the camera or the intraoral scanner; wherein the uniformity correction model is trained to receive an input of a) pixel coordinates of a pixel b) the angle between the normal to the 3D surface and the imaging axis of at least one of the camera or the intraoral scanner at the pixel and c) a depth value of the pixel and to output a gain factor to apply to an intensity value of the pixel.

A 42$^{nd}$ implementation may further extend any of the 39$^{th}$ through 41$^{st}$ implementations. In the 42$^{nd}$ implementation, the uniformity correction model is trained to receive an input of pixel coordinates and a depth value of a pixel and to output a gain factor to apply to an intensity value of the pixel.

A 43$^{rd}$ implementation may further extend any of the 35$^{th}$ through 42$^{nd}$ implementations. In the 43$^{rd}$ implementation, the plurality of distances comprise one or more distances between the camera and the one or more dental sites of less than 15 mm.

A 44$^{th}$ implementation may further extend any of the 35$^{th}$ through 43$^{rd}$ implementations. In the 44$^{th}$ implementation, the method further comprises: receiving a second plurality of images of the one or more dental sites having the non-uniform illumination provided by the one or more light sources of the intraoral scanner, the second plurality of images having been generated by a second camera of the intraoral scanner; and training the uniformity correction model or a second uniformity correction model to attenuate the non-uniform illumination for images generated by the second camera using the second plurality of images of the one or more dental sites.

A 45$^{th}$ implementation may further extend any of the 35$^{th}$ through 44$^{th}$ implementations. In the 45$^{th}$ implementation, the uniformity correction model comprises a polynomial model.

A 46$^{th}$ implementation may further extend any of the 35$^{th}$ through 45$^{th}$ implementations. In the 46$^{th}$ implementation, training the uniformity correction model comprises updating a cost function that applies a cost based on a difference between an intensity value of a pixel and a target intensity value, wherein the cost function is updated to minimize the cost across pixels of the plurality of images.

A 47$^{th}$ implementation may further extend the 46$^{th}$ implementation. In the 47$^{th}$ implementation, training the uniformity correction model comprises performing a regression analysis.

A 48$^{th}$ implementation may further extend the 47$^{th}$ implementation. In the 48$^{th}$ implementation, the regression analysis comprises at least one of a least squares regression analysis, an elastic-net regression analysis, or a least absolute shrinkage and selection operator (LASSO) regression analysis.

A 49$^{th}$ implementation may further extend any of the 35$^{th}$ through 48$^{th}$ implementations. In the 49$^{th}$ implementation, the non-uniform illumination comprises white light illumination.

A 50$^{th}$ implementation may further extend any of the 35$^{th}$ through 49$^{th}$ implementations. In the 50$^{th}$ implementation, the plurality of images as received have a first color space, the method further comprising: training a different uniformity correction model for each color channel of the first color space.

A 51$^{st}$ implementation may further extend the 50$^{th}$ implementation. In the 51$^{st}$ implementation, the first color space comprises a red, green, blue (RGB) color space, and wherein a first uniformity correction model is trained for a red channel, a second uniformity correction model is trained for a green channel, and a third uniformity correction model is trained for a blue channel.

A 52$^{nd}$ implementation may further extend any of the 35$^{th}$ through 51$^{st}$ implementations. In the 52$^{nd}$ implementation, the method further comprises: receiving a new plurality of images of one or more additional dental sites having non-uniform illumination provided by the one or more light sources of the intraoral scanner, the new plurality of images having been generated by the camera of the intraoral scanner during intraoral scanning of one or more patients; and performing at least one of a) updating a training of the uniformity correction model or b) training a new uniformity correction model to attenuate the non-uniform illumination for images generated by the camera using the new plurality of images of the one or more additional dental sites.

A 53$^{rd}$ implementation may further extend any of the 35$^{th}$ through 52$^{nd}$ implementations. In the 53$^{rd}$ implementation, the method further comprises: for each image of the plurality of images, inputting the image into a trained machine learning model that outputs a pixel-level classification of the image, the pixel-level classification comprising one or more dental object classes; for each image of the plurality of images, and for each pixel of the image, determining one or more intensity values, a depth value and a dental object class; and using pixel coordinates, the depth value, the dental object class and the one or more intensity values of each pixel of each image to train the uniformity correction model.

A 54$^{th}$ implementation may further extend any of the 35$^{th}$ through 53$^{rd}$ implementations. In the 54$^{th}$ implementation, the method further comprises: for each image of the plurality of images, inputting the image into a trained machine learning model that outputs a pixel-level classification of the image, the pixel-level classification comprising one or more dental object classes; and training a different uniformity correction model for each dental object class of the one or more dental object classes, wherein those pixels of the plurality of images associated with the dental object class are used to train the uniformity correction model for that dental object class.

A 55$^{th}$ implementation may further extend the 54$^{th}$ implementation. In the 55$^{th}$ implementation, a first uniformity correction model is trained for a gingiva dental object class and a second uniformity correction model is trained for a tooth dental object class.

A 56$^{th}$ implementation may further extend any of the 35$^{th}$ through 55$^{th}$ implementations. In the 56$^{th}$ implementation, the one or more dental sites are one or more dental sites of one or more patients, and wherein no jig or fixture is used in generation of the plurality of images.

A 57$^{th}$ implementation may further extend any of the 35$^{th}$ through 56$^{th}$ implementations. In the 57$^{th}$ implementation, each of the plurality of distances is measured as a distance from the camera to a plane perpendicular to an imaging axis of the intraoral scanner.

A 58$^{th}$ implementation may further extend any of the 35$^{th}$ through 57$^{th}$ implementations. In the 58$^{th}$ implementation, each of the plurality of distances is measured as a distance from the camera to a dental site of the one or more dental sites along a ray from the camera to the dental site.

A 59$^{th}$ implementation may further extend any of the 35$^{th}$ through 58$^{th}$ implementations. In the 59$^{th}$ implementation, the non-uniform illumination comprises first illumination by a first light source of the one or more light sources and second illumination by a second light source of the one or more light sources, and wherein an interaction between the first light source and the second light source changes with changes in distance between the camera and the one or more dental sites.

A 60$^{th}$ implementation may further extend any of the 35$^{th}$ through 59$^{th}$ implementations. In the 60$^{th}$ implementation, a computer readable medium comprises instructions that, when executed by a processing device, cause the processing device to perform the method of any of the 35$^{th}$ through 59$^{th}$ implementations.

A 61$^{st}$ implementation may further extend any of the 35$^{th}$ through 59$^{th}$ implementations. In the 61$^{st}$ implementation, and intraoral scanning system comprises: the intraoral scanner to generate the plurality of images; and a computing device, wherein the computing device is to perform the method of any of the 35$^{th}$ through 59$^{th}$ implementations.

In a 62$^{nd}$ implementation, a method comprises: receiving an image of a dental site having non-uniform illumination provided by one or more light sources of an intraoral scanner, the image having been generated by a camera of the intraoral scanner; determining, for the image, one or more depth values associated with a distance between the camera and the dental site; and attenuating the non-uniform illumination for the image based on inputting data for the image into a uniformity correction model, the data for the image comprising the one or more depth values.

A 63$^{rd}$ implementation may further extend the 62$^{nd}$ implementation. In the 63$^{rd}$ implementation, the method further comprises performing the following for each pixel of the image: determining an intensity value for the pixel; inputting pixel coordinates for the pixel into the uniformity correction model, wherein the uniformity correction model outputs a gain factor; and adjusting the intensity value for the pixel by applying the gain factor to the intensity value.

A 64$^{th}$ implementation may further extend the 63$^{rd}$ implementation. In the 64$^{th}$ implementation, the image as received has a red, green, blue (RGB) color space, the method further comprising: converting the image from the RGB color space to a second color space, wherein the one or more intensity values are determined in the second color space.

A 65$^{th}$ implementation may further extend any of the 62$^{nd}$ through 64$^{th}$ implementations. In the 65$^{th}$ implementation, the method further comprises: determining an intensity value for the pixel; determining a depth value for the pixel; inputting pixel coordinates for the pixel and the depth value for the pixel into the uniformity correction model, wherein the uniformity correction model outputs a gain factor; and adjusting the intensity value for the pixel by applying the gain factor to the intensity value.

A 66$^{th}$ implementation may further extend the 65$^{th}$ implementation. In the 66$^{th}$ implementation, the method further comprises: receiving a plurality of intraoral scans of the dental site, the plurality of intraoral scans associated with the image; generating a three-dimensional (3D) surface of the dental site using the plurality of intraoral scans; registering the images to the 3D surface; and determining, for each pixel of the image, the depth of the pixel based on a result of the registering.

A 67$^{th}$ implementation may further extend the 66$^{th}$ implementation. In the 67$^{th}$ implementation, the method further comprises: for each pixel of the image, performing the following: determining a normal to the 3D surface at the pixel; and determining an angle between the normal to the 3D surface and an imaging axis of at least one of the camera or the intraoral scanner; wherein angle between the normal to the 3D surface and the imaging axis of at least one of the camera or the intraoral scanner at the pixel is input into the uniformity correction model together with the pixel coordinates for the pixel and the depth value for the pixel.

A 68$^{th}$ implementation may further extend any of the 62$^{nd}$ through 67$^{th}$ implementations. In the 68$^{th}$ implementation, the distance between the camera and the dental site is less than 15 mm.

A 69$^{th}$ implementation may further extend any of the 62$^{nd}$ through 68$^{th}$ implementations. In the 69$^{th}$ implementation, the uniformity correction model comprises a polynomial model.

A 70$^{th}$ implementation may further extend any of the 62$^{nd}$ through 69$^{th}$ implementations. In the 70$^{th}$ implementation, the non-uniform illumination comprises white light illumination.

A 71$^{st}$ implementation may further extend any of the 62$^{nd}$ through 70$^{th}$ implementations. In the 71$^{st}$ implementation, the image as received has a first color space, the method further comprising: attenuating the non-uniform illumination for the image for a first channel of the first color space based on inputting data for the image into a first uniformity correction model associated with the first channel; attenuating the non-uniform illumination for the image for second channel of the first color space based on inputting data for the image into a second uniformity correction model associated with the second channel; and attenuating the non-uniform illumination for the image for third channel of the first color space based on inputting data for the image into a third uniformity correction model associated with the third channel.

A $72^{nd}$ implementation may further extend the $71^{st}$ implementation. In the $72^{nd}$ implementation, the first color space comprises a red, green, blue (RGB) color space, and wherein the first channel is a red channel, the second channel is a green channel, and the third channel is a blue channel.

A $73^{rd}$ implementation may further extend any of the $62^{nd}$ through $72^{nd}$ implementations. In the $73^{rd}$ implementation, the method further comprises: performing at least one of a) updating a training of the uniformity correction model or b) training a new uniformity correction model to attenuate the non-uniform illumination for images generated by the camera using the image of the dental site.

A $74^{th}$ implementation may further extend any of the $62^{nd}$ through $73^{rd}$ implementations. In the $74^{h}$ implementation, the method further comprises: inputting the image into a trained machine learning model that outputs a pixel-level classification of the image, the pixel-level classification comprising one or more dental object classes; for each pixel of the image, determining an intensity value, a depth value and a dental object class; and for each pixel of the image, determining a gain factor to apply to the intensity value by inputting pixel coordinates of the pixel, the depth value of the pixel, and the dental object class of the pixel into the uniformity correction model.

A $75^{th}$ implementation may further extend any of the $62^{nd}$ through $74^{th}$ implementations. In the $75^{th}$ implementation, the method further comprises: inputting the image into a trained machine learning model that outputs a pixel-level classification of the image, the pixel-level classification comprising one or more dental object classes; for each pixel of the image, performing the following comprising: determining an intensity value, a depth value and a dental object class; selecting the uniformity correction model from a plurality of uniformity correction models based on the dental object class; and determining a gain factor to apply to the intensity value by inputting pixel coordinates of the pixel and the depth value of the pixel into the uniformity correction model.

A $76^{th}$ implementation may further extend the $75^{th}$ implementation. In the $76^{th}$ implementation, the uniformity correction model is trained for a gingiva dental object class or a tooth dental object class.

A $77^{th}$ implementation may further extend any of the $62^{nd}$ through $76^{th}$ implementations. In the $77^{th}$ implementation, the distance is measured as a distance from the camera to a plane perpendicular to an imaging axis of the intraoral scanner.

A $78^{th}$ implementation may further extend any of the $62^{nd}$ through $77^{th}$ implementations. In the $78^{th}$ implementation, the distance is measured as a distance from the camera to a dental site of the one or more dental sites along a ray from the camera to the dental site.

A $79^{th}$ implementation may further extend any of the $62^{nd}$ through $78^{th}$ implementations. In the $79^{th}$ implementation, the non-uniform illumination comprises first illumination by a first light source of the one or more light sources and second illumination by a second light source of the one or more light sources, and wherein an interaction between the first light source and the second light source changes with changes in distance between the camera and the one or more dental sites.

An $80^{th}$ implementation may further extend any of the $62^{nd}$ through $79^{th}$ implementations. In the $80^{th}$ implementation, the method further comprises: receiving a plurality of images of the dental site, wherein the image is one of the plurality of images; selecting a subset of the plurality of images; and for each image in the subset, performing the following: determining, for the image in the subset, one or more depth values associated with the distance between the camera and the dental site; and attenuating the non-uniform illumination for the image in the subset based on inputting data for the image in the subset into the uniformity correction model, the data for the image in the subset comprising the one or more depth values.

An $81^{st}$ implementation may further extend any of the $62^{nd}$ through $80^{th}$ implementations. In the $81^{st}$ implementation, a computer readable medium comprises instructions that, when executed by a processing device, cause the processing device to perform the method of any of the $62^{nd}$ through $80^{th}$ implementations.

An $82^{nd}$ implementation may further extend any of the $62^{nd}$ through $80^{th}$ implementations. In the $82^{nd}$ implementation, and intraoral scanning system comprises: the intraoral scanner to generate the plurality of images; and a computing device, wherein the computing device is to perform the method of any of the $62^{nd}$ through $80^{th}$ implementations.

BRIEF DESCRIPTION OF THE DRAWINGS

Embodiments of the present disclosure are illustrated by way of example, and not by way of limitation, in the figures of the accompanying drawings.

DETAILED DESCRIPTION

Figure 1:
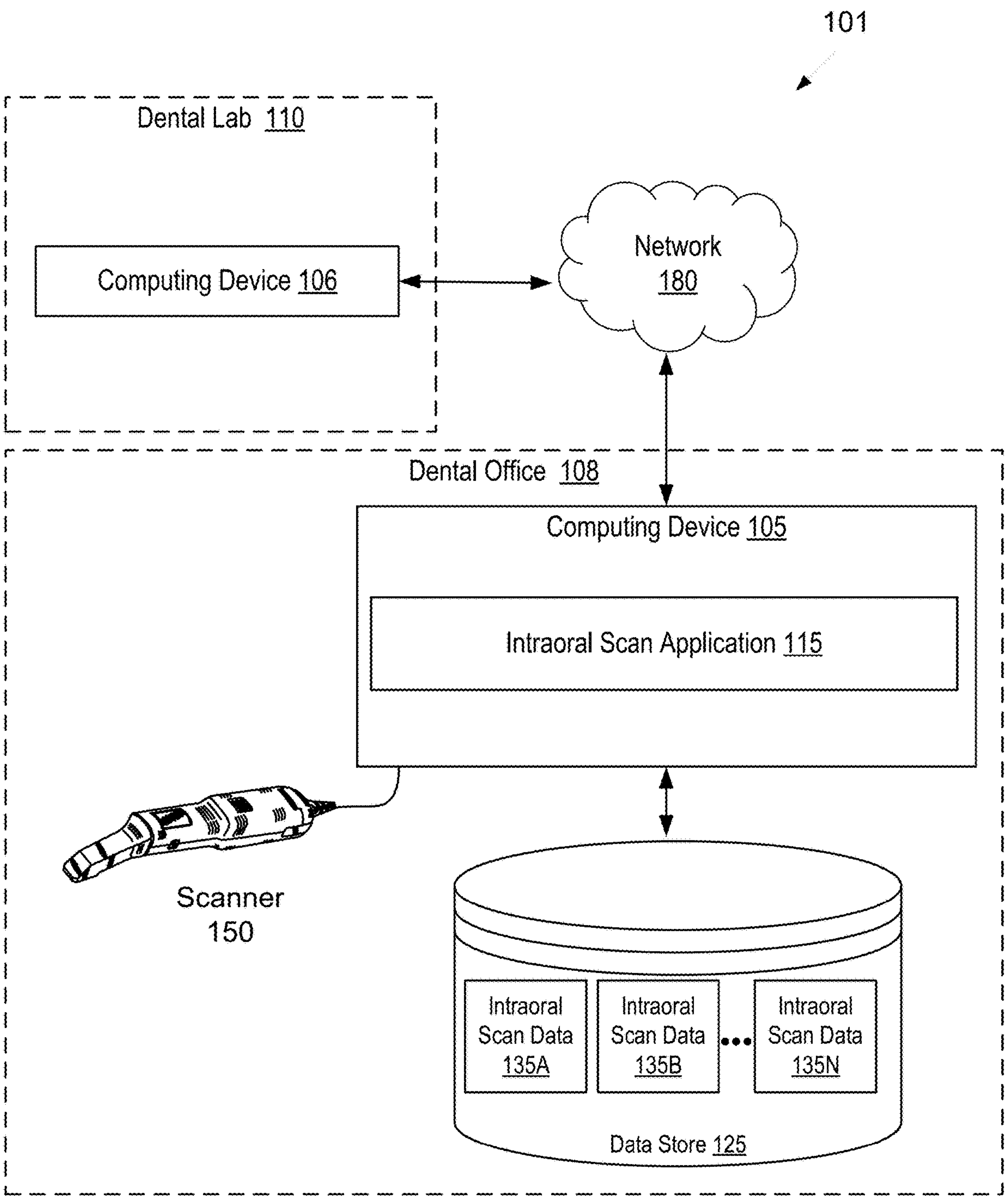
FIG. 1 illustrates one embodiment of a system for performing intraoral scanning and/or generating a virtual three-dimensional model of an dental site.

Described herein are methods and systems for selecting a subset of images of a dental site generated by an intraoral scanner. Modern intraoral scanners are capable of generating thousands of images when scanning a dental site such as a dental arch or a region of a dental arch. The images may include color images, near-infrared (NIR) images, images generated under fluorescent lighting conditions, and so on. The large number of images generated by the intraoral scanner consumes a large amount of storage space, takes a significant amount of time to process, and consumes a significant amount of bandwidth to transmit. Much of the data contained in the many images is redundant. By selecting a smaller subset of the highest quality images of the generated images for each region of the dental site, the total number of images that depict the dental site may be reduced without impacting an amount of information of the dental site contained in the images. Embodiments provide an efficient selection technique that reduces a number of images while retaining as much information (e.g., color information) about the dental site as possible.

In embodiments, processing logic estimates which images in a set of images of a dental site are "most useful" for covering a surface of the dental site and discarding a remainder of images in the set of images. In embodiments, processing logic builds a simplified polygonal model that captures a geometry of an imaged dental site based on intraoral scans of the dental site. Processing logic finds a "best" subset of images for the simplified model. A number of images that are selected can be controlled by adjusting how simple the polygonal model is (e.g., a number of faces in the polygonal model). The image selection can be performed in linear time versus a number of images and a number of faces in the simplified polygonal model, but still provides guarantees that images with information for each face will be retained. For every image dropped from the set of images, and for every face of the simplified polygonal model, the processing logic may keep at least one image that best shows that face.

Many intraoral scans and two-dimensional (2D) images of a dental site are generated during intraoral scanning. The intraoral scans are used to generate a three-dimensional (3D) model of the dental site. The 2D images contain color images that are used to perform texture mapping of the 3D model to add accurate color information to the 3D model. Texture mapping of 3D models has traditionally been a labor-intensive manual operation in which a user would manually select which color images to apply to the 3D model. This texture mapping process has been gradually automated, but remains a slow post-processing operation that is only performed after intraoral scanning is complete. Generally, all or most of the 2D images generated of a dental site are used to perform the texture mapping. In embodiments described herein, texture mapping is performed as part of an intraoral scanning process, and may be executed each time a 3D model is generated. In order to speed up the texture mapping process and reduce computing resources associated with the texture mapping process, in embodiments automatic image selection is performed based on texture mapping requirements, rather than (or in addition to) position of an intraoral scanner relative to the 3D model or content of images taken. In embodiments, the automatic image selection solves for common problems encountered in intraoral scanning, such as where parts of 2D images are obscured by foreign objects (e.g., fingers, lips, tongue, etc.).

Intraoral scanners may have multiple surface capture challenges, such as a dental object having a reflective surface material that is difficult to capture, dental sites for which an angle of a surface of the dental site to an imaging axis is high (which makes that surface difficult to accurately capture), portions of dental sites that are far away from the intraoral scanner and thus have a higher noise and/or error, portions of dental sites that are too close to the intraoral scanner and have error, dental sites that are captured while the scanner is moving too quickly, resulting in blurry data and/or partial capture of an area, accumulation of blood and/or saliva over a dental site, and so on. Some or all of these challenges may cause a high level of noise in generated intraoral images. Embodiments select the "best" images for each region of a scanned dental site, where the "best" images may be images that contain a maximal amount of information for each region and/or that minimize the above indicated problems.

Also described herein are methods and systems for attenuating non-uniform illumination of images generated by an intraoral scanner. Such attenuation may be performed before and/or after selection of a subset of images. For most intraoral scanners a light source and a camera are relatively far away from a dental surface being scanned. For example, the light source and camera are at a proximal end of the intraoral scanner, and light generated by the intraoral scanner passes through an optical system to a distal end of the intraoral scanner and out a head at a distal end of the intraoral scanner and toward a dental site. Returning light from the dental site returns through the head at the distal end of the intraoral scanner, and passes back through the optical system to the camera at the proximal end of the intraoral scanner. Because the light source and camera are relatively far from the surface being scanned for such traditional intraoral scanners, illumination of the dental site is uniform for such intraoral scanners. However, in embodiments of the present disclosure one or more light sources and one or more cameras of an intraoral scanner are very close to a dental site that is imaged (e.g., less than 15 mm from the dental site being imaged). This introduces a high non-uniformity in illumination of the dental site. The non-uniformity introduces large fluctuations in intensity of images generated by the intraoral scanner across such images. Such non-uniformity may include both intra-image non-uniformity and inter-image non-uniformity. In some embodiments, the intraoral scanner includes multiple light sources, where light from the multiple light sources interact differently with one another at different locations in space, further exacerbating the non-uniformity of the light.

One technique that may be used to calibrate an intraoral scanner for the non-uniformity of illumination provided by the intraoral scanner is to use a jig or fixture to perform a calibration procedure. However, calibration using such jigs/fixtures is costly and time consuming. Additionally, such jigs/fixtures are generally not sophisticated enough to capture the real physical effects of light interaction, reflections, and percolations of light as they occur in real intraoral scans (e.g., for images generated in the field). Accordingly, embodiments provide a calibration technique that uses real-time data from real intraoral scans (e.g., of patients) to train a uniformity correction model that attenuates the non-uniform illumination of dental surfaces in images generated by the intraoral scanner.

In embodiments, processing logic receives multiple intraoral scans and images of a dental site (e.g., of a patient). Processing logic uses the intraoral scans and images to train a uniformity correction model. The uniformity correction model may be trained to receive coordinates and depth of a pixel of an image, and to output a gain factor to apply to (e.g., multiply with) the intensity of the pixel. This operation may be performed for each pixel of the image, resulting in an adjusted image in which the non-uniform illumination has been attenuated, causing the intensity of the pixels to be more uniform across the image. The uniformity correction model may take into account object material (e.g., tooth, gingiva, etc.), angles between surfaces of the dental site and an imaging axis, and/or other information. The color-corrected images may then be used to perform one or more operations, such as texture mapping of a 3D model of the dental site.

Various embodiments are described herein. It should be understood that these various embodiments may be implemented as stand-alone solutions and/or may be combined. Accordingly, references to an embodiment, or one embodiment, may refer to the same embodiment and/or to different embodiments. Some embodiments are discussed herein with reference to intraoral scans and intraoral images. However, it should be understood that embodiments described with reference to intraoral scans also apply to lab scans or model/impression scans. A lab scan or model/impression scan may include one or more images of a dental site or of a model or impression of a dental site, which may or may not include height maps.

FIG. 1 illustrates one embodiment of a system 101 for performing intraoral scanning and/or generating a three-dimensional (3D) surface and/or a virtual three-dimensional model of a dental site. System 101 includes a dental office 108 and optionally one or more dental lab 110. The dental office 108 and the dental lab 110 each include a computing device 105, 106, where the computing devices 105, 106 may be connected to one another via a network 180. The network 180 may be a local area network (LAN), a public wide area network (WAN) (e.g., the Internet), a private WAN (e.g., an intranet), or a combination thereof.

Computing device 105 may be coupled to one or more intraoral scanner 150 (also referred to as a scanner) and/or a data store 125 via a wired or wireless connection. In one embodiment, multiple scanners 150 in dental office 108 wirelessly connect to computing device 105. In one embodiment, scanner 150 is wirelessly connected to computing device 105 via a direct wireless connection. In one embodiment, scanner 150 is wirelessly connected to computing device 105 via a wireless network. In one embodiment, the wireless network is a Wi-Fi network. In one embodiment, the wireless network is a Bluetooth network, a Zigbee network, or some other wireless network. In one embodiment, the wireless network is a wireless mesh network, examples of which include a Wi-Fi mesh network, a Zigbee mesh network, and so on. In an example, computing device 105 may be physically connected to one or more wireless access points and/or wireless routers (e.g., Wi-Fi access points/routers). Intraoral scanner 150 may include a wireless module such as a Wi-Fi module, and via the wireless module may join the wireless network via the wireless access point/router.

Computing device 106 may also be connected to a data store (not shown). The data stores may include local data stores and/or remote data stores. Computing device 105 and computing device 106 may each include one or more processing devices, memory, secondary storage, one or more input devices (e.g., such as a keyboard, mouse, tablet, touchscreen, microphone, camera, and so on), one or more output devices (e.g., a display, printer, touchscreen, speakers, etc.), and/or other hardware components.

In embodiments, scanner 150 includes an inertial measurement unit (IMU). The IMU may include an accelerometer, a gyroscope, a magnetometer, a pressure sensor and/or other sensor. For example, scanner 150 may include one or more micro-electromechanical system (MEMS) IMU. The IMU may generate inertial measurement data (also referred to as movement data), including acceleration data, rotation data, and so on.

Computing device 105 and/or data store 125 may be located at dental office 108 (as shown), at dental lab 110, or at one or more other locations such as a server farm that provides a cloud computing service. Computing device 105 and/or data store 125 may connect to components that are at a same or a different location from computing device 105 (e.g., components at a second location that is remote from the dental office 108, such as a server farm that provides a cloud computing service). For example, computing device 105 may be connected to a remote server, where some operations of intraoral scan application 115 are performed on computing device 105 and some operations of intraoral scan application 115 are performed on the remote server.

Some additional computing devices may be physically connected to the computing device 105 via a wired connection. Some additional computing devices may be wirelessly connected to computing device 105 via a wireless connection, which may be a direct wireless connection or a wireless connection via a wireless network. In embodiments, one or more additional computing devices may be mobile computing devices such as laptops, notebook computers, tablet computers, mobile phones, portable game consoles, and so on. In embodiments, one or more additional computing devices may be traditionally stationary computing devices, such as desktop computers, set top boxes, game consoles, and so on. The additional computing devices may act as thin clients to the computing device 105. In one embodiment, the additional computing devices access computing device 105 using remote desktop protocol (RDP). In one embodiment, the additional computing devices access computing device 105 using virtual network control (VNC). Some additional computing devices may be passive clients that do not have control over computing device 105 and that receive a visualization of a user interface of intraoral scan application 115. In one embodiment, one or more additional computing devices may operate in a master mode and computing device 105 may operate in a slave mode.

Intraoral scanner 150 may include a probe (e.g., a hand held probe) for optically capturing three-dimensional structures. The intraoral scanner 150 may be used to perform an intraoral scan of a patient's oral cavity. An intraoral scan application 115 running on computing device 105 may communicate with the scanner 150 to effectuate the intraoral scan. A result of the intraoral scan may be intraoral scan data 135A, 135B through 135N that may include one or more sets of intraoral scans and/or sets of intraoral 2D images. Each intraoral scan may include a 3D image or point cloud that may include depth information (e.g., a height map) of a portion of a dental site. In embodiments, intraoral scans include x, y and z information.

Intraoral scan data 135A-N may also include color 2D images and/or images of particular wavelengths (e.g., near-infrared (NIRI) images, infrared images, ultraviolet images, etc.) of a dental site in embodiments. In embodiments, intraoral scanner 150 alternates between generation of 3D intraoral scans and one or more types of 2D intraoral images (e.g., color images, NIRI images, etc.) during scanning. For example, one or more 2D color images may be generated between generation of a fourth and fifth intraoral scan by outputting white light and capturing reflections of the white light using multiple cameras.

Intraoral scanner 150 may include multiple different cameras (e.g., each of which may include one or more image sensors) that generate 2D images (e.g., 2D color images) of different regions of a patient's dental arch concurrently. Intraoral 2D images may include 2D color images, 2D infrared or near-infrared (NIRI) images, and/or 2D images generated under other specific lighting conditions (e.g., 2D ultraviolet images). The 2D images may be used by a user of the intraoral scanner to determine where the scanning face of the intraoral scanner is directed and/or to determine other information about a dental site being scanned. The 2D images may also be used to apply a texture mapping to a 3D surface and/or 3D model of the dental site generated from the intraoral scans.

The scanner 150 may transmit the intraoral scan data 135A, 135B through 135N to the computing device 105. Computing device 105 may store some or all of the intraoral scan data 135A-135N in data store 125. In some embodiments, an image selection process is performed to score the 2D images and select a subset of the 2D images. The selected 2D images may then be stored in data store 125, and a remainder of the 2D images that were not selected may be ignored or discarded (and may not be stored). The image selection process is described in greater detail below with reference to FIGS. 3-13C.

According to an example, a user (e.g., a practitioner) may subject a patient to intraoral scanning. In doing so, the user may apply scanner 150 to one or more patient intraoral locations. The scanning may be divided into one or more segments (also referred to as roles). As an example, the segments may include a lower dental arch of the patient, an upper dental arch of the patient, one or more preparation teeth of the patient (e.g., teeth of the patient to which a dental device such as a crown or other dental prosthetic will be applied), one or more teeth which are contacts of preparation teeth (e.g., teeth not themselves subject to a dental device but which are located next to one or more such teeth or which interface with one or more such teeth upon mouth closure), and/or patient bite (e.g., scanning performed with closure of the patient's mouth with the scan being directed towards an interface area of the patient's upper and lower teeth). Via such scanner application, the scanner 150 may provide intraoral scan data 135A-N to computing device 105. The intraoral scan data 135A-N may be provided in the form of intraoral scan data sets, each of which may include 2D intraoral images (e.g., color 2D images) and/or 3D intraoral scans of particular teeth and/or regions of an dental site. In one embodiment, separate intraoral scan data sets are created for the maxillary arch, for the mandibular arch, for a patient bite, and/or for each preparation tooth. Alternatively, a single large intraoral scan data set is generated (e.g., for a mandibular and/or maxillary arch). Intraoral scans may be provided from the scanner 150 to the computing device 105 in the form of one or more points (e.g., one or more pixels and/or groups of pixels). For instance, the scanner 150 may provide an intraoral scan as one or more point clouds. The intraoral scans may each comprise height information (e.g., a height map that indicates a depth for each pixel).

The manner in which the oral cavity of a patient is to be scanned may depend on the procedure to be applied thereto. For example, if an upper or lower denture is to be created, then a full scan of the mandibular or maxillary edentulous arches may be performed. In contrast, if a bridge is to be created, then just a portion of a total arch may be scanned which includes an edentulous region, the neighboring preparation teeth (e.g., abutment teeth) and the opposing arch and dentition. Alternatively, full scans of upper and/or lower dental arches may be performed if a bridge is to be created.

By way of non-limiting example, dental procedures may be broadly divided into prosthodontic (restorative) and orthodontic procedures, and then further subdivided into specific forms of these procedures. Additionally, dental procedures may include identification and treatment of gum disease, sleep apnea, and intraoral conditions. The term prosthodontic procedure refers, inter alia, to any procedure involving the oral cavity and directed to the design, manufacture or installation of a dental prosthesis at a dental site within the oral cavity (dental site), or a real or virtual model thereof, or directed to the design and preparation of the dental site to receive such a prosthesis. A prosthesis may include any restoration such as crowns, veneers, inlays, onlays, implants and bridges, for example, and any other artificial partial or complete denture. The term orthodontic procedure refers, inter alia, to any procedure involving the oral cavity and directed to the design, manufacture or installation of orthodontic elements at a dental site within the oral cavity, or a real or virtual model thereof, or directed to the design and preparation of the dental site to receive such orthodontic elements. These elements may be appliances including but not limited to brackets and wires, retainers, clear aligners, or functional appliances.

In embodiments, intraoral scanning may be performed on a patient's oral cavity during a visitation of dental office 108. The intraoral scanning may be performed, for example, as part of a semi-annual or annual dental health checkup. The intraoral scanning may also be performed before, during and/or after one or more dental treatments, such as orthodontic treatment and/or prosthodontic treatment. The intraoral scanning may be a full or partial scan of the upper and/or lower dental arches, and may be performed in order to gather information for performing dental diagnostics, to generate a treatment plan, to determine progress of a treatment plan, and/or for other purposes. The dental information (intraoral scan data 135A-N) generated from the intraoral scanning may include 3D scan data, 2D color images, NIRI and/or infrared images, and/or ultraviolet images, of all or a portion of the upper jaw and/or lower jaw. The intraoral scan data 135A-N may further include one or more intraoral scans showing a relationship of the upper dental arch to the lower dental arch. These intraoral scans may be usable to determine a patient bite and/or to determine occlusal contact information for the patient. The patient bite may include determined relationships between teeth in the upper dental arch and teeth in the lower dental arch.

For many prosthodontic procedures (e.g., to create a crown, bridge, veneer, etc.), an existing tooth of a patient is ground down to a stump. The ground tooth is referred to herein as a preparation tooth, or simply a preparation. The preparation tooth has a margin line (also referred to as a finish line), which is a border between a natural (unground) portion of the preparation tooth and the prepared (ground) portion of the preparation tooth. The preparation tooth is typically created so that a crown or other prosthesis can be mounted or seated on the preparation tooth. In many instances, the margin line of the preparation tooth is subgingival (below the gum line).

Intraoral scanners may work by moving the scanner 150 inside a patient's mouth to capture all viewpoints of one or more tooth. During scanning, the scanner 150 is calculating distances to solid surfaces in some embodiments. These distances may be recorded as images called 'height maps' or as point clouds in some embodiments. Each scan (e.g., optionally height map or point cloud) is overlapped algorithmically, or 'stitched', with the previous set of scans to generate a growing 3D surface. As such, each scan is associated with a rotation in space, or a projection, to how it fits into the 3D surface.

During intraoral scanning, intraoral scan application 115 may register and stitch together two or more intraoral scans generated thus far from the intraoral scan session to generate a growing 3D surface. In one embodiment, performing registration includes capturing 3D data of various points of a surface in multiple scans, and registering the scans by computing transformations between the scans. One or more 3D surfaces may be generated based on the registered and stitched together intraoral scans during the intraoral scanning. The one or more 3D surfaces may be output to a display so that a doctor or technician can view their scan progress thus far. As each new intraoral scan is captured and registered to previous intraoral scans and/or a 3D surface, the one or more 3D surfaces may be updated, and the updated 3D surface(s) may be output to the display. A view of the 3D surface(s) may be periodically or continuously updated according to one or more viewing modes of the intraoral scan application. In one viewing mode, the 3D surface may be continuously updated such that an orientation of the 3D surface that is displayed aligns with a field of view of the intraoral scanner (e.g., so that a portion of the 3D surface that is based on a most recently generated intraoral scan is approximately centered on the display or on a window of the display) and a user sees what the intraoral scanner sees. In one viewing mode, a position and orientation of the 3D surface is static, and an image of the intraoral scanner is optionally shown to move relative to the stationary 3D surface.

Intraoral scan application 115 may generate one or more 3D surfaces from intraoral scans, and may display the 3D surfaces to a user (e.g., a doctor) via a graphical user interface (GUI) during intraoral scanning. In embodiments, separate 3D surfaces are generated for the upper jaw and the lower jaw. This process may be performed in real time or near-real time to provide an updated view of the captured 3D surfaces during the intraoral scanning process. As scans are received, these scans may be registered and stitched to a 3D surface.

The generated intraoral scan data 135A-N may include a large number of 2D images. In some embodiments, intraoral scanner 150 includes multiple cameras (e.g., 3-8 cameras) that may generate images in parallel. In embodiments, images may be generated at a rate of about 50-150 images per second (e.g., about 170-100 images per second). Accordingly, after only a minute of scanning about 6000 images may be generated. About 6000 images generated by an intraoral scanner may consume about 18 Gigabytes of data uncompressed, and about 4 Gigabytes of data when compressed (e.g., using a JPEG compression). This amount of data takes considerable time to process and considerable space to store. It may also take considerable amount of bandwidth to transmit (e.g., to transmit over network 180). However, many of the generated images are very similar to each other. Accordingly, it is possible to remove many of the images with only a minimal reduction in an amount of information (e.g., such as color information) about a dental surface. In embodiments, intraoral scan application 115 performs an image selection process for efficient selection of images from the intraoral scan data 135A-N. Such an image selection process may be performed in real time or near-real time as images and intraoral scans are received. Selected images may be used to perform texture mapping of color information to the 3D surface using the selected images in real time or near-real time as scanning is performed.

In embodiments, intraoral scan application 115 uses a 3D model of a dental site, a set of 2D images of the dental site, and information about spatial position and optical parameters of cameras of the intraoral scanner that generated the images as an input to an image selection algorithm. The intraoral scan application 115 may generate a low-polygonal 3D model representation of the 3D surface using one or more surface simplification algorithms. In embodiments, intraoral scan application 115 reduces a number of faces (e.g., triangular faces) of the 3D surface to any target number of faces. In embodiments, the target number of faces is between 600 and 3000 faces. For each image, intraoral scan application 115 may then determine a camera that generated the image and a known position and parameters of the camera. Intraoral scan application 115 may then generate a synthetic version of each image by projecting the low-polygonal 3D model onto a plane associated with the image (e.g., based on the camera position and parameters of the camera determined for the image). The synthetic version of the images may be generated using one or more rasterization algorithms known in the art (e.g., such as the z buffer algorithm). Each of the synthetic versions of the images contain information on the faces of the low-polygonal 3D model (also referred to as the 3D polygonal model). Intraoral scan application 115 may estimate a score for each face of the 3D polygonal model in each generated synthetic image. Various techniques for scoring faces of images are described herein below. In some implementations, a "visible area" is used as a score, which may be computed by counting an amount of pixels that belong to each face in the rasterized synthetic image. Other information that may be used other than "area" to determine a score for a face include relative position of a face to a focal plane of an image (e.g., to determine if the image is in focus or not), an average brightness of pixels in the face (e.g., to avoid images taken in low light conditions), brightness or intensity uniformity of the image, number of pixels of a face where the image is saturated (e.g., to avoid images where the surface was too bright to capture properly such as due to a specular highlight), and so on. Scores may also be modified by applying one or more penalties to scores based on one or more criteria, such as assigning a penalty for images generated while the scanner 150 was moving too fast (e.g., to penalize selection of images having a high motion blur), or assigning a penalty for angles between a face normal and a camera viewing direction (e.g., imaging axis of a camera) is too high (e.g., to penalize images where the scanner is located close to the imaged surface but at an unfavorable angle). These scores may then be assigned to the intraoral image associated with the synthetic image.

Intraoral scan application 115 may identify one or more image having a highest score for each face of the 3D polygonal model. The identified image(s) may be selected, marked and stored in data store 125. Those images that were not selected may be removed from intraoral scan data 135A-N. If the images were previously stored, the images may be overwritten or erased from data store 125.

In embodiments, each operation of the image selection process performed by intraoral scan application 115 can be implemented using fast algorithms optimized for execution on specialized hardware such as a graphics processing unit (GPU). In embodiments, the image selection process runs in linear time on a number of images provided plus a face count of the 3D surface. In embodiments, the image selection process guarantees that an amount of images that remain after decimation will be no more than a number of faces (or some predefined multiple of the number of faces) in the 3D polygonal model. In embodiments, the image selection process guarantees that for every image that is removed by the image selection process and for every face in the 3D polygonal model there exists an image in the surviving (i.e., selected) image dataset in which the face is visible.

In some embodiments, at least some faces of the 3D polygonal model cannot be seen from any images in the intraoral scan data 135A-N, and some images are selected for multiple faces. Accordingly, in embodiments the number of selected images may be on the order of N/5, where N is a number of faces in the 3D polygonal model. To avoid selecting too few images, surface simplification can be relaxed and a 3D polygonal model having a higher number of faces may be selected per face. For example, if N is a target number of faces, then N*5 faces may be selected. This approach ensures that too few images are not selected, at the expense of potentially selecting more than a desired number of images in the worst case scenario. Alternatively, or additionally, an increased number of images may be selected per face.

In some embodiments, after images have been selected there are still too many images remaining in the selected dataset. Accordingly, in some embodiments intraoral scan application sorts faces according to the scores of the images selected for those faces. Intraoral scan application 115 may then select M faces having assigned images with highest scores, where M may be a preconfigured value less than N or may be a user selected value less than N. Intraoral scan application may deselect the images associated with the remaining N minus M faces that were not selected. This enables strict guarantees of a number of images in a worst case scenario while also selecting a target number of images on average.

During scanning one or more foreign objects may obstruct a dental site being imaged. Such foreign objects may be captured in intraoral scans as well as 2D images generated by scanner 150. Examples of such foreign objects include lips, tongue, fingers, dental tools, and so on. In some embodiments, intraoral scan application 115 may process images and/or intraoral scans of intraoral scan data 135A-N using a trained machine learning model that performs pixel-level or patch-level classification of the images into different dental object classes. Based on the output of the trained machine learning model, intraoral scan application 115 may determine which pixels of which faces in images are obscured by foreign objects and use such information in computing scores for faces of the 3D polygonal model in the images. For example, intraoral scan application 115 may detect obscuring objects in 2D or intraoral scans images and may not count pixels for parts of faces of the 3D polygonal model that are projected to regions obscured by the obscuring objects. In this way, intraoral scan application 115 can take into account that particular images may not show particular regions of interest on a 3D polygonal model because it is obscured by other objects in those images. If obscuring objects are detected in intraoral scans, these detected objects may be projected to 2D images by rasterization, and obscured regions may then be estimated from the rasterized object information.

The image selection process may continually or periodically be performed during intraoral scanning. Accordingly, as new intraoral scan data 135A-N is received, images in the new intraoral scan data may be scored. The scores of the new images may be compared to scores of previously selected images. If one or more new images has a higher score for a face of the 3D polygonal model, then a new image may replace the previously selected image. This may cause the previously selected image to be removed from data store 125 if it was previously stored thereon. Additionally, as additional intraoral scan data 135A-N is received and stitched to a 3D surface, the 3D surface may expand. A new simplified 3D polygonal model may be generated for the expanded 3D surface, which may have more faces than the previous version of the 3D surface. New images may be selected for the new faces. This process may continue until an entire dental site has been scanned (e.g., until an entire upper or lower dental arch has been scanned).

In addition to, or instead of, selecting a subset of images from intraoral scan data 135A-N, intraoral scan application 115 may perform brightness attenuation of the images (or the subset of images) using an uniformity correction model trained from intraoral scan data 135A-N and/or prior intraoral scan data generated b scanner 150 and/or another scanner. Intraoral scan application 115 may additionally train a uniformity correction model to attenuate non-uniform illumination output by scanner 150 based on intraoral scan data 135A-N. Training and use of a uniformity correction model are described in detail below with reference to FIGS. 14-18B.

When a scan session or a portion of a scan session associated with a particular scanning role (e.g., upper jaw role, lower jaw role, bite role, etc.) is complete (e.g., all scans for an dental site or dental site have been captured), intraoral scan application 115 may generate a virtual 3D model of one or more scanned dental sites (e.g., of an upper jaw and a lower jaw). The final 3D model may be a set of 3D points and their connections with each other (i.e. a mesh). To generate the virtual 3D model, intraoral scan application 115 may register and stitch together the intraoral scans generated from the intraoral scan session that are associated with a particular scanning role. The registration performed at this stage may be more accurate than the registration performed during the capturing of the intraoral scans, and may take more time to complete than the registration performed during the capturing of the intraoral scans. In one embodiment, performing scan registration includes capturing 3D data of various points of a surface in multiple scans, and registering the scans by computing transformations between the scans. The 3D data may be projected into a 3D space of a 3D model to form a portion of the 3D model. The intraoral scans may be integrated into a common reference frame by applying appropriate transformations to points of each registered scan and projecting each scan into the 3D space.

In one embodiment, registration is performed for adjacent or overlapping intraoral scans (e.g., each successive frame of an intraoral video). Registration algorithms are carried out to register two adjacent or overlapping intraoral scans and/or to register an intraoral scan with a 3D model, which essentially involves determination of the transformations which align one scan with the other scan and/or with the 3D model. Registration may involve identifying multiple points in each scan (e.g., point clouds) of a scan pair (or of a scan and the 3D model), surface fitting to the points, and using local searches around points to match points of the two scans (or of the scan and the 3D model). For example, intraoral scan application 115 may match points of one scan with the closest points interpolated on the surface of another scan, and iteratively minimize the distance between matched points. Other registration techniques may also be used.

Intraoral scan application 115 may repeat registration for all intraoral scans of a sequence of intraoral scans to obtain transformations for each intraoral scan, to register each intraoral scan with previous intraoral scan(s) and/or with a common reference frame (e.g., with the 3D model). Intraoral scan application 115 may integrate intraoral scans into a single virtual 3D model by applying the appropriate determined transformations to each of the intraoral scans. Each transformation may include rotations about one to three axes and translations within one to three planes.

Intraoral scan application 115 may generate one or more 3D models from intraoral scans, and may display the 3D models to a user (e.g., a doctor) via a graphical user interface (GUI). The 3D models can then be checked visually by the doctor. The doctor can virtually manipulate the 3D models via the user interface with respect to up to six degrees of freedom (i.e., translated and/or rotated with respect to one or more of three mutually orthogonal axes) using suitable user controls (hardware and/or virtual) to enable viewing of the 3D model from any desired direction. If scaling of image on screen is also considered, than the doctor can virtually manipulate the 3D models with respect to up to seven degrees of freedom (the previously described six degrees of freedom in addition to zoom or scale).

After completion of the 3D model(s) and/or during generation of the 3D model(s) intraoral scan application may perform texture mapping to map color information to the 3D model(s). The selected images (e.g., images selected using the image selection process described herein) may be processed using one or more uniformity correction model to attenuate non-uniform lighting used during generation of the images. One or more additional image processing algorithms may also be applied to the images to improve a color uniformity and/or intensity uniformity across images and/or within images. The corrected (e.g., attenuated) images may then be used for texture mapping for the 3D model(s).

Aside from using the image selection process described in embodiments herein for selecting images to be used for automated texture mapping, the image selection process may also be used for other purposes. For example, the image selection process may be used to select images to suggest for users to use in manual texture mapping. The image selection process may also be used for any problem which involves selecting a set of best covering images, such as image selection for the intraoral camera (IOC) feature. Video compression algorithms are frequently used to reduce storage requirements for sequences of images that are similar to other images generated by an intraoral scanner. These algorithms typically incorporate methods to find a subset of "key frames" that will be sored and interpolate images between the key frames. In embodiments, the image selection algorithms described herein may be used to select the "key frames" usable by video compression algorithms to perform compression.

Figure 2A:
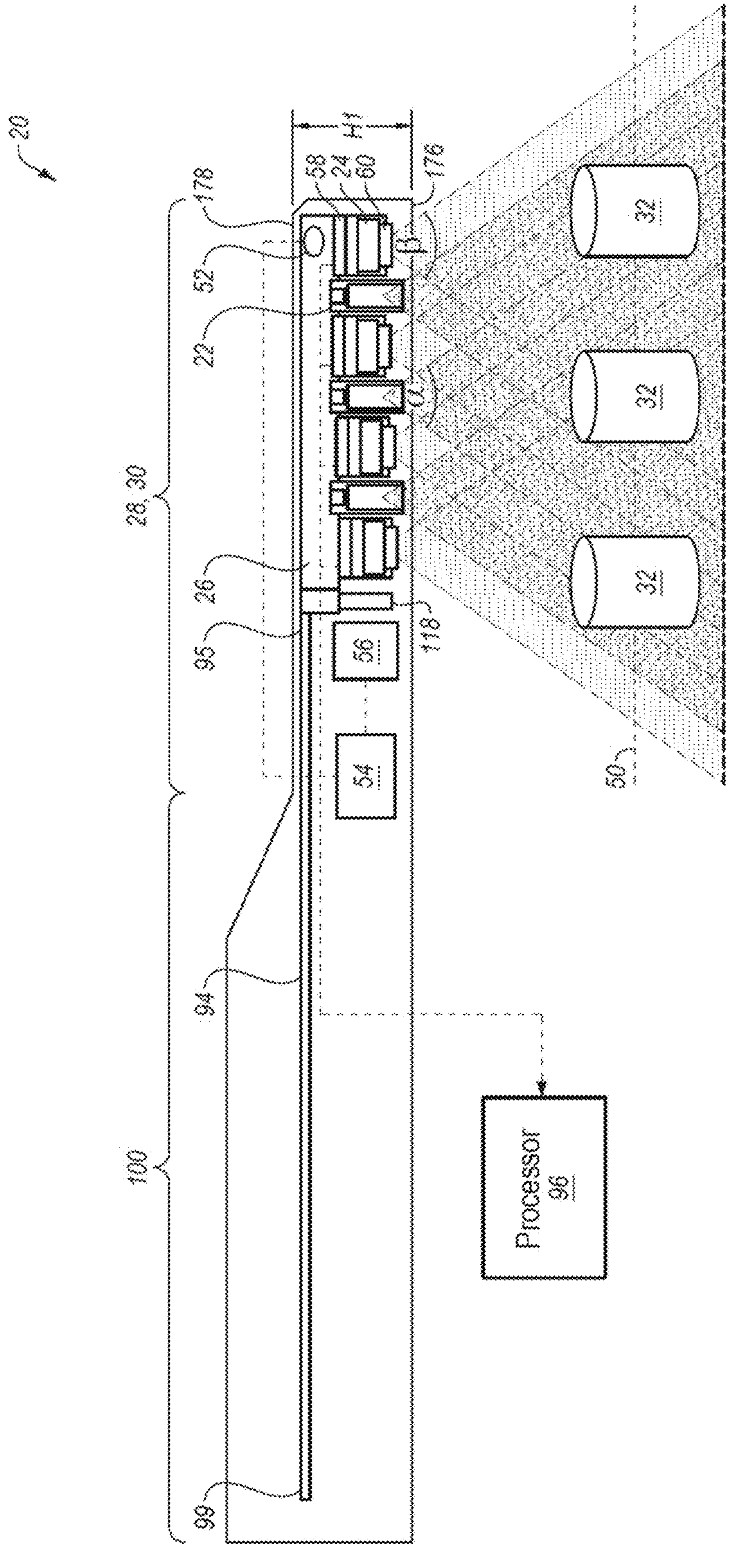
FIG. 2A is a schematic illustration of a handheld intraoral scanner with a plurality cameras disposed within a probe at a distal end of the intraoral scanner, in accordance with some applications of the present disclosure.

Reference is now made to FIG. 2A, which is a schematic illustration of an intraoral scanner 20 comprising an elongate handheld wand, in accordance with some applications of the present disclosure. The intraoral scanner 20 may correspond to intraoral scanner 150 of FIG. 1 in embodiments. Intraoral scanner 20 includes a plurality of structured light projectors 22 and a plurality of cameras 24 that are coupled to a rigid structure 26 disposed within a probe 28 at a distal end 30 of the intraoral scanner 20. In some applications, during an intraoral scanning procedure, probe 28 is inserted into the oral cavity of a subject or patient.

For some applications, structured light projectors 22 are positioned within probe 28 such that each structured light projector 22 faces an object 32 outside of intraoral scanner 20 that is placed in its field of illumination, as opposed to positioning the structured light projectors in a proximal end of the handheld wand and illuminating the object by reflection of light off a mirror and subsequently onto the object. In embodiments, the structured light projectors 22 and cameras 24 are a distance of less than 20 mm from the object 32, or less than 15 mm from the object 32, or less than 10 mm from the object 32. The distance may be measured as a distance between a camera/structured light projector and a plane orthogonal to an imaging axis of the intraoral scanner (e.g., where the imaging axis of the intraoral scanner may be perpendicular to a longitudinal axis of the intraoral scanner). Alternatively, the distance may be measured differently for each camera as a distance from the camera to the object 32 along a ray from the camera to the object.

In some embodiments, the structured light projectors are disposed at a proximal end of the handheld wand. Similarly, for some applications, cameras 24 are positioned within probe 28 such that each camera 24 faces an object 32 outside of intraoral scanner 20 that is placed in its field of view, as opposed to positioning the cameras in a proximal end of the intraoral scanner and viewing the object by reflection of light off a mirror and into the camera. This positioning of the projectors and the cameras within probe 28 enables the scanner to have an overall large field of view while maintaining a low profile probe. Alternatively, the cameras may be disposed in a proximal end of the handheld wand.

In some applications, cameras 24 each have a large field of view β (beta) of at least 45 degrees, e.g., at least 70 degrees, e.g., at least 80 degrees, e.g., 85 degrees. In some applications, the field of view may be less than 120 degrees, e.g., less than 100 degrees, e.g., less than 90 degrees. In one embodiment, a field of view β (beta) for each camera is between 80 and 90 degrees, which may be particularly useful because it provided a good balance among pixel size, field of view and camera overlap, optical quality, and cost. Cameras 24 may include an image sensor 58 and objective optics 60 including one or more lenses. To enable close focus imaging, cameras 24 may focus at an object focal plane 50 that is located between 1 mm and 30 mm, e.g., between 4 mm and 24 mm, e.g., between 5 mm and 11 mm, e.g., 9 mm-10 mm, from the lens that is farthest from the sensor. In some applications, cameras 24 may capture images at a frame rate of at least 30 frames per second, e.g., at a frame of at least 75 frames per second, e.g., at least 100 frames per second. In some applications, the frame rate may be less than 200 frames per second.

A large field of view achieved by combining the respective fields of view of all the cameras may improve accuracy due to reduced amount of image stitching errors, especially in edentulous regions, where the gum surface is smooth and there may be fewer clear high resolution 3D features. Having a larger field of view enables large smooth features, such as the overall curve of the tooth, to appear in each image frame, which improves the accuracy of stitching respective surfaces obtained from multiple such image frames.

Similarly, structured light projectors 22 may each have a large field of illumination a (alpha) of at least 45 degrees, e.g., at least 70 degrees. In some applications, field of illumination a (alpha) may be less than 120 degrees, e.g., than 100 degrees.

For some applications, in order to improve image capture, each camera 24 has a plurality of discrete preset focus positions, in each focus position the camera focusing at a respective object focal plane 50. Each of cameras 24 may include an autofocus actuator that selects a focus position from the discrete preset focus positions in order to improve a given image capture. Additionally or alternatively, each camera 24 includes an optical aperture phase mask that extends a depth of focus of the camera, such that images formed by each camera are maintained focused over all object distances located between 1 mm and 30 mm, e.g., between 4 mm and 24 mm, e.g., between 5 mm and 11 mm, e.g., 9 mm-10 mm, from the lens that is farthest from the sensor.

In some applications, structured light projectors 22 and cameras 24 are coupled to rigid structure 26 in a closely packed and/or alternating fashion, such that (a) a substantial part of each camera's field of view overlaps the field of view of neighboring cameras, and (b) a substantial part of each camera's field of view overlaps the field of illumination of neighboring projectors. Optionally, at least 20%, e.g., at least 50%, e.g., at least 75% of the projected pattern of light are in the field of view of at least one of the cameras at an object focal plane 50 that is located at least 4 mm from the lens that is farthest from the sensor. Due to different possible configurations of the projectors and cameras, some of the projected pattern may never be seen in the field of view of any of the cameras, and some of the projected pattern may be blocked from view by object 32 as the scanner is moved around during a scan.

Rigid structure 26 may be a non-flexible structure to which structured light projectors 22 and cameras 24 are coupled so as to provide structural stability to the optics within probe 28. Coupling all the projectors and all the cameras to a common rigid structure helps maintain geometric integrity of the optics of each structured light projector 22 and each camera 24 under varying ambient conditions, e.g., under mechanical stress as may be induced by the subject's mouth. Additionally, rigid structure 26 helps maintain stable structural integrity and positioning of structured light projectors 22 and cameras 24 with respect to each other.

Figure 2C:
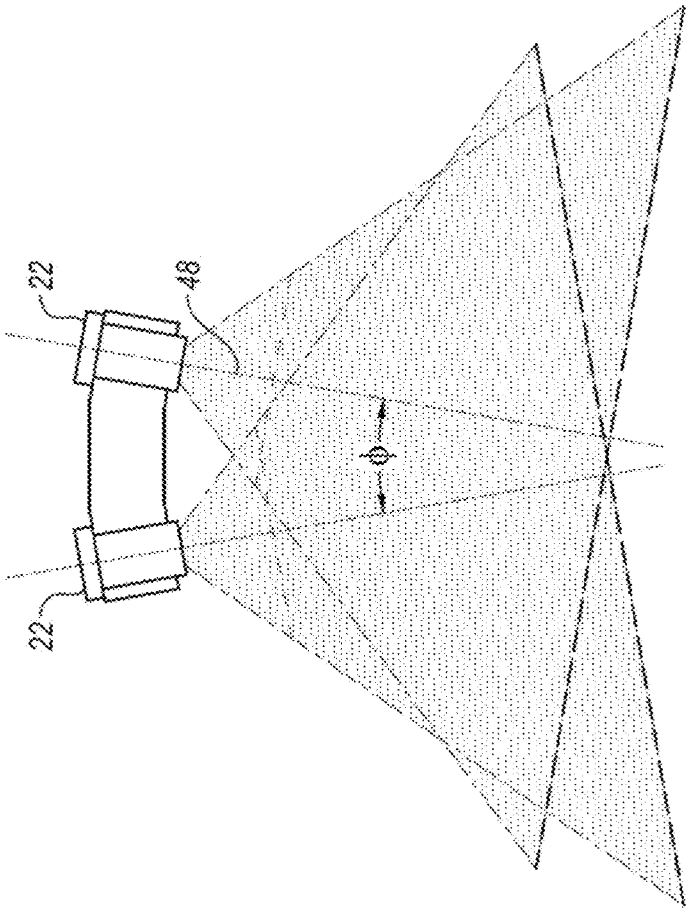
FIGS. 2B-2C comprise schematic illustrations of positioning configurations for cameras and structured light projectors of an intraoral scanner, in accordance with some applications of the present disclosure.
Figure 2B:
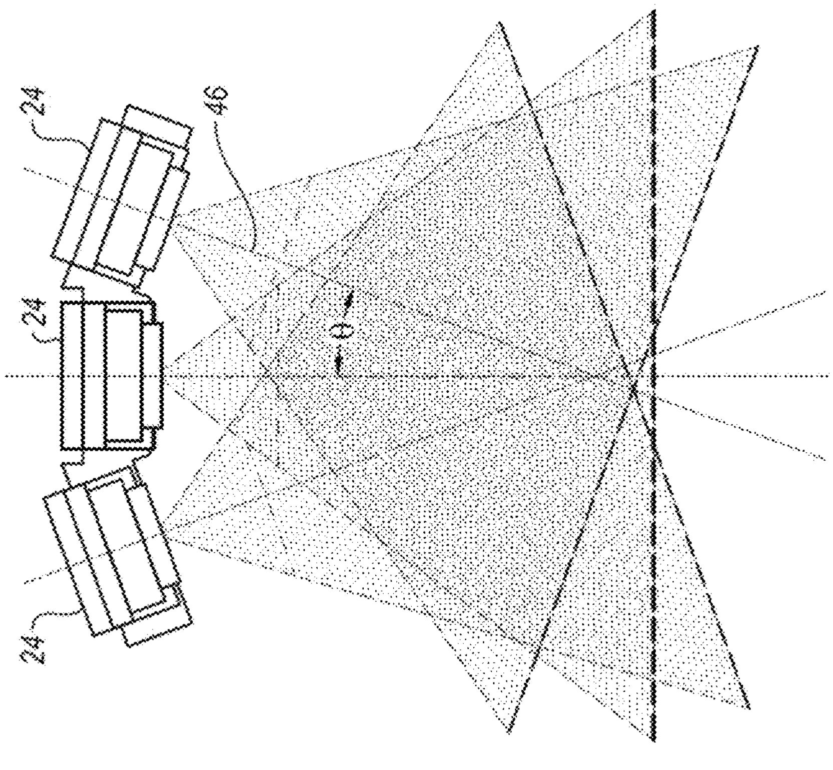

Reference is now made to FIGS. 2B-2C, which include schematic illustrations of a positioning configuration for cameras 24 and structured light projectors 22 respectively, in accordance with some applications of the present disclosure. For some applications, in order to improve the overall field of view and field of illumination of the intraoral scanner 20, cameras 24 and structured light projectors 22 are positioned such that they do not all face the same direction. For some applications, such as is shown in FIG. 2B, a plurality of cameras 24 are coupled to rigid structure 26 such that an angle θ (theta) between two respective optical axes 46 of at least two cameras 24 is 90 degrees or less, e.g., 35 degrees or less. Similarly, for some applications, such as is shown in FIG. 2C, a plurality of structured light projectors 22 are coupled to rigid structure 26 such that an angle q (phi) between two respective optical axes 48 of at least two structured light projectors 22 is 90 degrees or less, e.g., 35 degrees or less.

Figure 2D:
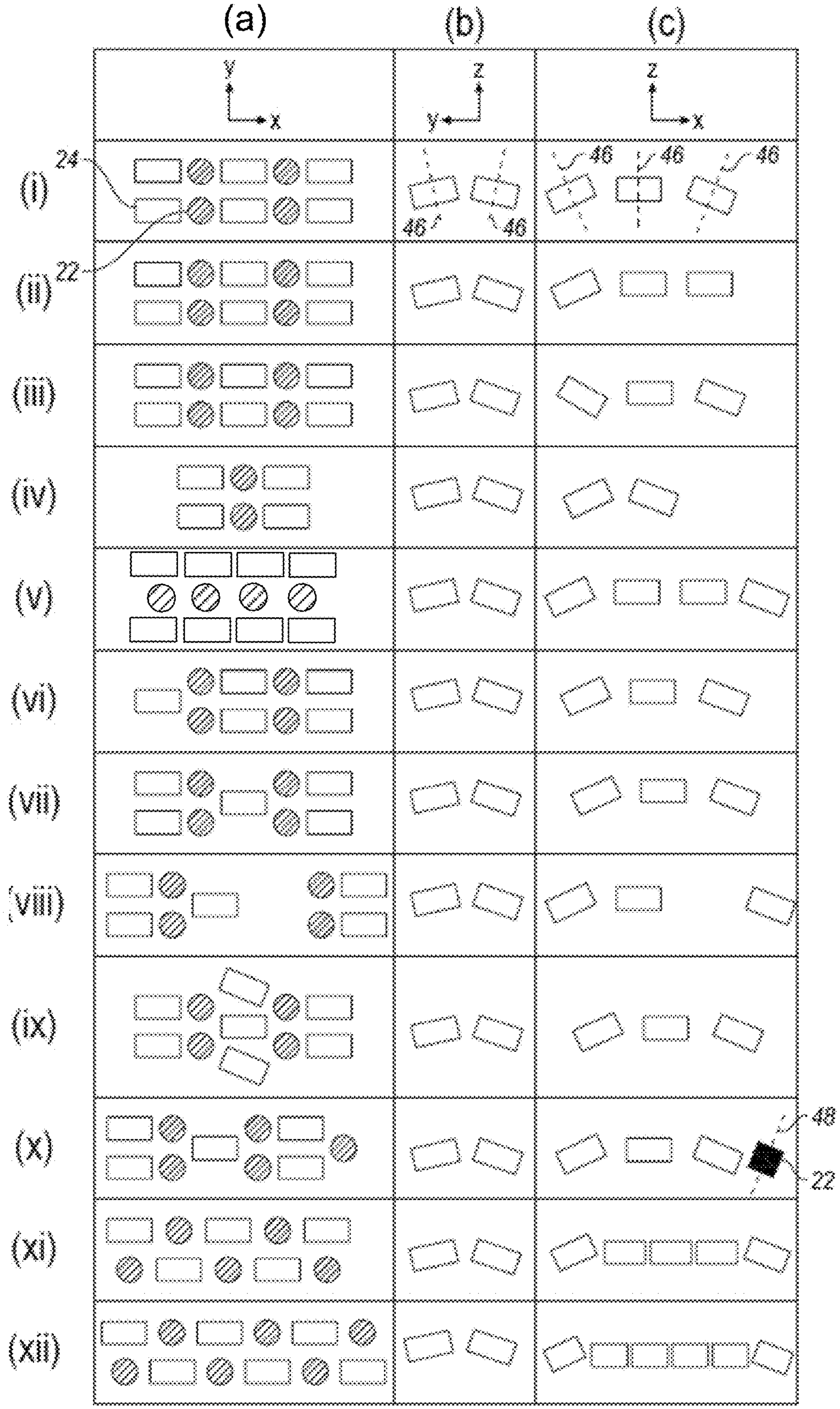
FIG. 2D is a chart depicting a plurality of different configurations for the position of structured light projectors and cameras in a probe of an intraoral scanner, in accordance with some applications of the present disclosure.

Reference is now made to FIG. 2D, which is a chart depicting a plurality of different configurations for the position of structured light projectors 22 and cameras 24 in probe 28, in accordance with some applications of the present disclosure. Structured light projectors 22 are represented in FIG. 2D by circles and cameras 24 are represented in FIG. 2D by rectangles. It is noted that rectangles are used to represent the cameras, since typically, each image sensor 58 and the field of view β (beta) of each camera 24 have aspect ratios of 1:2. Column (a) of FIG. 2D shows a bird's eye view of the various configurations of structured light projectors 22 and cameras 24. The x-axis as labeled in the first row of column (a) corresponds to a central longitudinal axis of probe 28. Column (b) shows a side view of cameras 24 from the various configurations as viewed from a line of sight that is coaxial with the central longitudinal axis of probe 28 and substantially parallel to a viewing axis of the intraoral scanner. Similarly to as shown in FIG. 2B, column (b) of FIG. 2D shows cameras 24 positioned so as to have optical axes 46 at an angle of 90 degrees or less, e.g., 35 degrees or less, with respect to each other. Column (c) shows a side view of cameras 24 of the various configurations as viewed from a line of sight that is perpendicular to the central longitudinal axis of probe 28.

Typically, the distal-most (toward the positive x-direction in FIG. 2D) and proximal-most (toward the negative x-direction in FIG. 2D) cameras 24 are positioned such that their optical axes 46 are slightly turned inwards, e.g., at an angle of 90 degrees or less, e.g., 35 degrees or less, with respect to the next closest camera 24. The camera(s) 24 that are more centrally positioned, i.e., not the distal-most camera 24 nor proximal-most camera 24, are positioned so as to face directly out of the probe, their optical axes 46 being substantially perpendicular to the central longitudinal axis of probe 28. It is noted that in row (xi) a projector 22 is positioned in the distal-most position of probe 28, and as such the optical axis 48 of that projector 22 points inwards, allowing a larger number of spots 33 projected from that particular projector 22 to be seen by more cameras 24.

In embodiments, the number of structured light projectors 22 in probe 28 may range from two, e.g., as shown in row (iv) of FIG. 2D, to six, e.g., as shown in row (xii). Typically, the number of cameras 24 in probe 28 may range from four, e.g., as shown in rows (iv) and (v), to seven, e.g., as shown in row (ix). It is noted that the various configurations shown in FIG. 2D are by way of example and not limitation, and that the scope of the present disclosure includes additional configurations not shown. For example, the scope of the present disclosure includes fewer or more than five projectors 22 positioned in probe 28 and fewer or more than seven cameras positioned in probe 28. With reference to row (v), two outer rows include a series of cameras and an inner row includes a series of projectors.

In an example application, an apparatus for intraoral scanning (e.g., an intraoral scanner 150) includes an elongate handheld wand comprising a probe at a distal end of the elongate handheld wand, at least two light projectors disposed within the probe, and at least four cameras disposed within the probe. Each light projector may include at least one light source configured to generate light when activated, and a pattern generating optical element that is configured to generate a pattern of light when the light is transmitted through the pattern generating optical element. Each of the at least four cameras may include a camera sensor (also referred to as an image sensor) and one or more lenses, wherein each of the at least four cameras is configured to capture a plurality of images that depict at least a portion of the projected pattern of light on an intraoral surface. A majority of the at least two light projectors and the at least four cameras may be arranged in at least two rows that are each approximately parallel to a longitudinal axis of the probe, the at least two rows comprising at least a first row and a second row.

In a further application, a distal-most camera along the longitudinal axis and a proximal-most camera along the longitudinal axis of the at least four cameras are positioned such that their optical axes are at an angle of 90 degrees or less with respect to each other from a line of sight that is perpendicular to the longitudinal axis. Cameras in the first row and cameras in the second row may and/or third row be positioned such that optical axes of the cameras in the first row are at an angle of 90 degrees or less with respect to optical axes of the cameras in the second row and/or third row from a line of sight that is coaxial with the longitudinal axis of the probe. A remainder of the at least four cameras other than the distal-most camera and the proximal-most camera have optical axes that are substantially parallel to the longitudinal axis of the probe. Some of the at least two rows may include an alternating sequence of light projectors and cameras. In some embodiments, some rows contain only projectors and some rows contain only cameras (e.g., as shown in row (v).

In a further application, the distal-most camera along the longitudinal axis and the proximal-most camera along the longitudinal axis are positioned such that their optical axes are at an angle of 35 degrees or less with respect to each other from the line of sight that is perpendicular to the longitudinal axis. The cameras in the first row and the cameras in the second row and/or third row may be positioned such that the optical axes of the cameras in the first row are at an angle of 35 degrees or less with respect to the optical axes of the cameras in the second row and/or third row from the line of sight that is coaxial with the longitudinal axis of the probe.

In a further application, the at least four cameras may have a combined field of view of 25-45 mm along the longitudinal axis and a field of view of 20-40 mm along a z-axis corresponding to distance from the probe.

Returning to FIG. 2A, for some applications, there is at least one uniform light projector 118 (which may be an unstructured light projector that projects light across a range of wavelengths) coupled to rigid structure 26. Uniform light projector 118 may transmit white light onto object 32 being scanned. At least one camera, e.g., one of cameras 24, captures two-dimensional color images of object 32 using illumination from uniform light projector 118.

Processor 96 may run a surface reconstruction algorithm that may use detected patterns (e.g., dot patterns) projected onto object 32 to generate a 3D surface of the object 32. In some embodiments, the processor 96 may combine at least one 3D scan captured using illumination from structured light projectors 22 with a plurality of intraoral 2D images captured using illumination from uniform light projector 118 in order to generate a digital three-dimensional image of the intraoral three-dimensional surface. Using a combination of structured light and uniform illumination enhances the overall capture of the intraoral scanner and may help reduce the number of options that processor 96 needs to consider when running a correspondence algorithm used to detect depth values for object 32. In one embodiment, the intraoral scanner and correspondence algorithm described in U.S. application Ser. No. 16/446,181, filed Jun. 19, 2019, is used. U.S. application Ser. No. 16/446,181, filed Jun. 19, 2019, is incorporated by reference herein in its entirety. In embodiments, processor 92 may be a processor of computing device 105 of FIG. 1. Alternatively, processor 92 may be a processor integrated into the intraoral scanner 20.

For some applications, all data points taken at a specific time are used as a rigid point cloud, and multiple such point clouds are captured at a frame rate of over 10 captures per second. The plurality of point clouds are then stitched together using a registration algorithm, e.g., iterative closest point (ICP), to create a dense point cloud. A surface reconstruction algorithm may then be used to generate a representation of the surface of object 32.

For some applications, at least one temperature sensor 52 is coupled to rigid structure 26 and measures a temperature of rigid structure 26. Temperature control circuitry 54 disposed within intraoral scanner 20 (a) receives data from temperature sensor 52 indicative of the temperature of rigid structure 26 and (b) activates a temperature control unit 56 in response to the received data. Temperature control unit 56, e.g., a PID controller, keeps probe 28 at a desired temperature (e.g., between 35 and 43 degrees Celsius, between 37 and 41 degrees Celsius, etc.). Keeping probe 28 above 35 degrees Celsius, e.g., above 37 degrees Celsius, reduces fogging of the glass surface of intraoral scanner 20, through which structured light projectors 22 project and cameras 24 view, as probe 28 enters the intraoral cavity, which is typically around or above 37 degrees Celsius. Keeping probe 28 below 43 degrees, e.g., below 41 degrees Celsius, prevents discomfort or pain.

In some embodiments, heat may be drawn out of the probe 28 via a heat conducting element 94, e.g., a heat pipe, that is disposed within intraoral scanner 20, such that a distal end 95 of heat conducting element 94 is in contact with rigid structure 26 and a proximal end 99 is in contact with a proximal end 100 of intraoral scanner 20. Heat is thereby transferred from rigid structure 26 to proximal end 100 of intraoral scanner 20. Alternatively or additionally, a fan disposed in a handle region 174 of intraoral scanner 20 may be used to draw heat out of probe 28.

FIGS. 2A-2D illustrate one type of intraoral scanner that can be used for embodiments of the present disclosure. However, it should be understood that embodiments are not limited to the illustrated type of intraoral scanner. In one embodiment, intraoral scanner 150 corresponds to the intraoral scanner described in U.S. application Ser. No. 16/910,042, filed Jun. 23, 2020 and entitled "Intraoral 3D Scanner Employing Multiple Miniature Cameras and Multiple Miniature Pattern Projectors", which is incorporated by reference herein. In one embodiment, intraoral scanner 150 corresponds to the intraoral scanner described in U.S. application Ser. No. 16/446,181, filed Jun. 19, 2019 and entitled "Intraoral 3D Scanner Employing Multiple Miniature Cameras and Multiple Miniature Pattern Projectors", which is incorporated by reference herein.

In some embodiments an intraoral scanner that performs confocal focusing to determine depth information may be used. Such an intraoral scanner may include a light source and/or illumination module that emits light (e.g., a focused light beam or array of focused light beams). The light passes through a polarizer and through a unidirectional mirror or beam splitter (e.g., a polarizing beam splitter) that passes the light. The light may pass through a pattern before or after the beam splitter to cause the light to become patterned light. Along an optical path of the light after the unidirectional mirror or beam splitter are optics, which may include one or more lens groups. Any of the lens groups may include only a single lens or multiple lenses. One of the lens groups may include at least one moving lens.

The light may pass through an endoscopic probing member, which may include a rigid, light-transmitting medium, which may be a hollow object defining within it a light transmission path or an object made of a light transmitting material, e.g. a glass body or tube. In one embodiment, the endoscopic probing member includes a prism such as a folding prism. At its end, the endoscopic probing member may include a mirror of the kind ensuring a total internal reflection. Thus, the mirror may direct the array of light beams towards a teeth segment or other object. The endoscope probing member thus emits light, which optionally passes through one or more windows and then impinges on to surfaces of intraoral objects.

The light may include an array of light beams arranged in an X-Y plane, in a Cartesian frame, propagating along a Z axis, which corresponds to an imaging axis or viewing axis of the intraoral scanner. As the surface on which the incident light beams hits is an uneven surface, illuminated spots may be displaced from one another along the Z axis, at different $(X_i, Y_i)$ locations. Thus, while a spot at one location may be in focus of the confocal focusing optics, spots at other locations may be out-of-focus. Therefore, the light intensity of returned light beams of the focused spots will be at its peak, while the light intensity at other spots will be off peak. Thus, for each illuminated spot, multiple measurements of light intensity are made at different positions along the Z-axis. For each of such $(X_i, Y_i)$ location, the derivative of the intensity over distance (Z) may be made, with the $Z_i$ yielding maximum derivative, $Z_0$, being the in-focus distance.

The light reflects off of intraoral objects and passes back through windows (if they are present), reflects off of the mirror, passes through the optical system, and is reflected by the beam splitter onto a detector. The detector is an image sensor having a matrix of sensing elements each representing a pixel of the scan or image. In one embodiment, the detector is a charge coupled device (CCD) sensor. In one embodiment, the detector is a complementary metal-oxide semiconductor (CMOS) type image sensor. Other types of image sensors may also be used for detector. In one embodiment, the detector detects light intensity at each pixel, which may be used to compute height or depth.

Alternatively, in some embodiments an intraoral scanner that uses stereo imaging is used to determine depth information.

FIGS. 3-13C are flow charts and associated figures illustrating various methods related to image selection. FIGS. 14-18B are flow charts and associated figures illustrating various methods related to attenuation of non-uniform light in images. The methods may be performed by a processing logic that may comprise hardware (e.g., circuitry, dedicated logic, programmable logic, microcode, etc.), software (e.g., instructions run on a processing device to perform hardware simulation), firmware, or a combination thereof. In one embodiment, at least some operations of the methods are performed by a computing device of a scanning system and/or by a server computing device (e.g., by computing device 105 of FIG. 1 or computing device 1900 of FIG. 19). In some embodiments, intraoral scan data is transmitted to a cloud computing system (e.g., one or more server computing devices executing at a data center), which may perform the methods of one or more of FIGS. 3-16.

Figure 3:
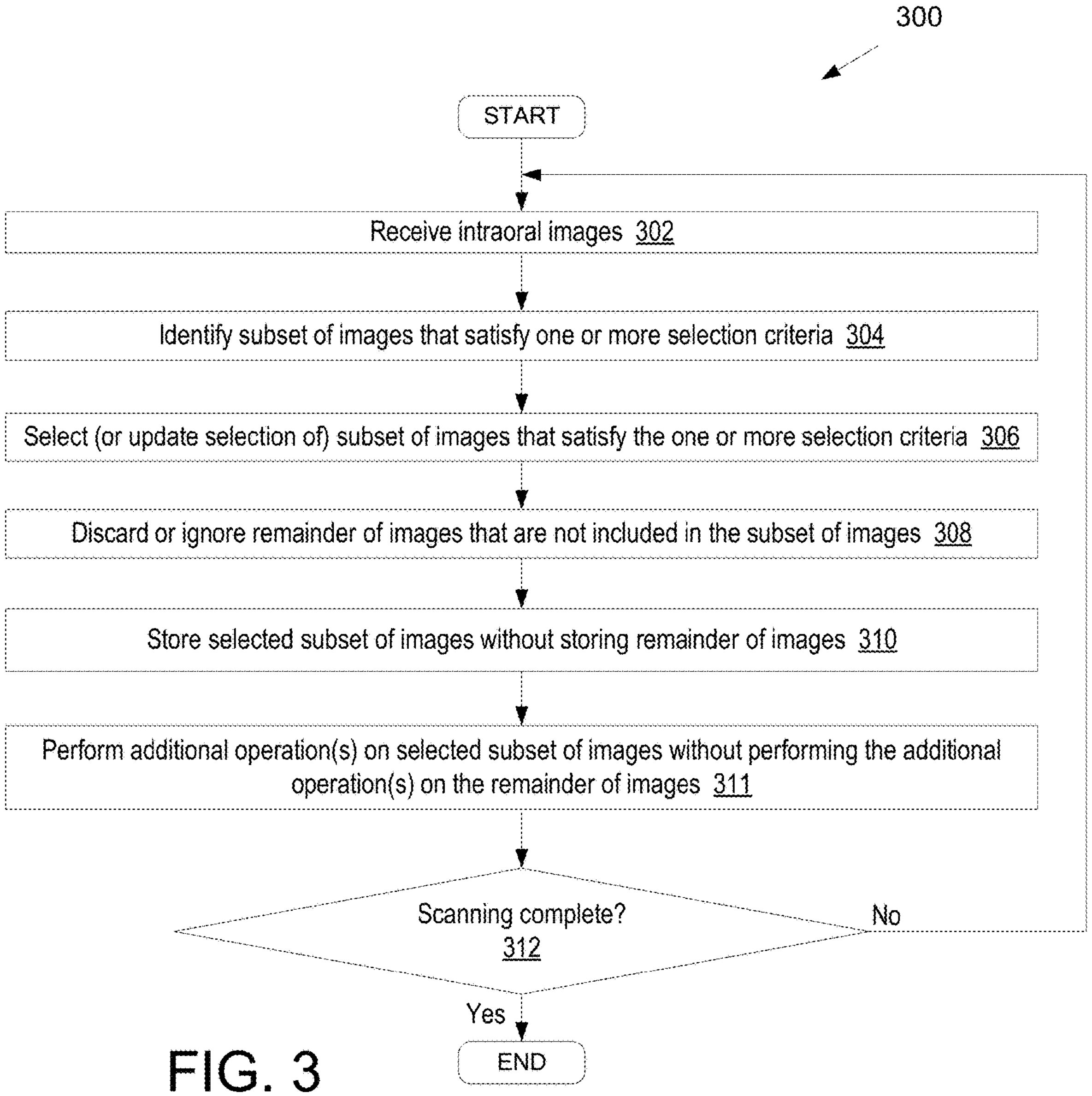
FIG. 3 is a flow chart for a method of selecting a subset of images generated by an intraoral scanner during intraoral scanning, in accordance with embodiments of the present disclosure.

FIG. 3 is a flow chart for a method 300 of selecting a subset of images generated by an intraoral scanner during intraoral scanning, in accordance with embodiments of the present disclosure. In some embodiments, method 300 is performed on-the-fly during intraoral scanning. Additionally, or alternatively, method 300 may be performed after scanning is complete. At block 302 of method 300, processing logic receives a plurality of intraoral images of a dental site. The images may include two-dimensional (2D) images of the dental site, which may include color 2D images, near infrared (NIR) 2D images, 2D images generated under ultraviolet light, and so on.

At block 304, processing logic identifies a subset of images that satisfy one or more image selection criteria. At block 306, processing logic selects the identified subset of images that satisfy the one or more selection criteria. In embodiments, the image selection criteria include scoring criteria. Each image may be scored using one or more scoring metrics. Images having highest scores may then be selected. Additionally, or alternatively, images having scores that exceed a score threshold may be selected. In some embodiments, processing logic divides the dental site being imaged into multiple regions, and selects one or more images that satisfy one or more image selection criteria for each of the regions. For example, a highest scoring image or images may be selected for each region of the dental site. One technique that may be used to divide the dental site into regions is to generate a 3D surface of the dental site based on intraoral scans received from the intraoral scanner during the intraoral scanning, and generating a simplified 3D polygonal model from the 3D surface, where each surface of the 3D polygonal model may correspond to a different region of the dental site.

At block 308, processing logic may discard or ignore a remainder of the images that are not included in the selected subset of images. At block 310, processing logic may store the selected subset of images without storing the remainder of images. At block 311, processing logic may perform one or more additional operations on the selected subset of images without performing the additional operations on the remainder of images. Examples of additional operations that may be performed include outputting selected images to a display, performing texture mapping on a 3D surface using information (e.g., color information) from the selected images, performing image compression using the selected images, and so on.

At block 312, processing logic determines whether scanning is complete. If scanning is not complete, the method may return to block 302, and additional intraoral images may be received. The operations of one or more of blocks 302-311 may be repeated multiple times as additional scanning is performed and additional intraoral images are received. This may cause newly received images to cause previously selected images to no longer satisfy one or more image selection criteria. A previously selected image may then be deselected, and may be discarded and/or ignored. If the previously selected image had been stored, then it may be removed from storage. This process may repeat until scanning is complete. If at block 312 a determination is made that scanning is complete, the method may end. In some embodiments, operations of blocks 308, 310 and/or 312 may be performed after scanning is complete in addition to or instead of during scanning. For example, the operations of blocks 308, 310 and/or 311 may be performed after at block 312 a determination has been made that scanning is complete.

Figure 4:
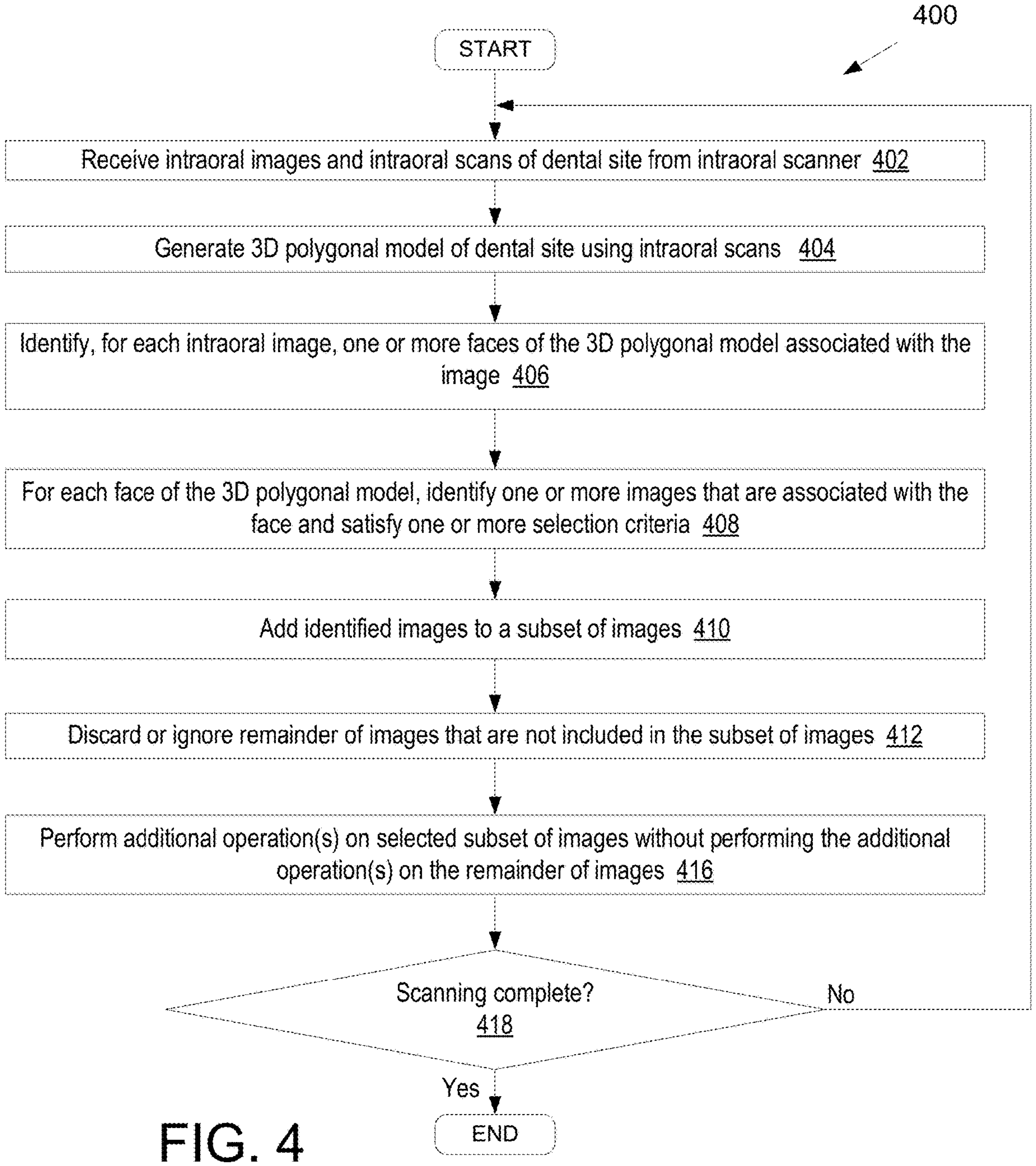
FIG. 4 is a flow chart for a method of selecting a subset of images generated by an intraoral scanner during intraoral scanning, in accordance with embodiments of the present disclosure.

FIG. 4 is a flow chart for a method 400 of selecting a subset of images generated by an intraoral scanner during intraoral scanning, in accordance with embodiments of the present disclosure. At block 402 of method 400, processing logic receives one or more intraoral scans of a dental site. Processing logic additionally receives two-dimensional (2D) images of the dental site, which may include color 2D images, near infrared (NIR) 2D images, 2D images generated under ultraviolet light, and so on. Each of the intraoral scans may include three-dimensional information about a captured portion of the dental site. For example, each intraoral scan may include point clouds. In embodiments, each intraoral scan includes three dimensional information (e.g., x, y, z coordinates) for multiple points on a dental surface. Each of the multiple points may correspond to a spot or feature of structured light that was projected by a structured light projector of the intraoral scanner onto the dental site and that was captured in images generated by one or more cameras of the intraoral scanner.

At block 404, processing logic generates a 3D surface representing the scanned dental site using the one or more received intraoral scans. This may include registering and stitching together multiple intraoral scans and/or registering and stitching one or more intraoral scans to an already generated 3D surface to update the 3D surface. In one embodiment, a simultaneous localization and mapping (SLAM) algorithm is used to perform the registration and/or stitching. The registration and stitching process may be performed as described in greater detail above. As further intraoral scans are received, those intraoral scans may be registered and stitched to the 3D surface to add information for more regions/portions of the 3D surface and/or to improve the quality of one or more regions/portions of the 3D surface that are already present. In some embodiments, the generated surface is an approximated surface that may be of lower quality than a surface that will be later calculated.

Once the 3D surface has been generated, a simplified 3D polygonal model (e.g., a polygon mesh) may be generated from the 3D surface. The original 3D surface may have a high resolution, and thus may have a large number of faces. The simplified 3D polygonal model, by contrast, may have a reduced number of faces. Such faces may include triangles, quadrilaterals (quads), or other convex polygons (n-gons). The simplified 3D polygonal model may additionally or alternatively have a reduced number of surfaces, polygons, vertices, edges, and so on. In embodiments, the 3D polygonal model may have between about 500 and about 6000 faces, or between about 600 and about 4000 faces, or between about 700 and about 2000 faces. Other numbers of faces may also be used for the 3D polygonal model. While the number of faces is reduced in the 3D polygonal model, the 3D polygonal model still maintains a recognizable representation of the scanned dental site (e.g., of a scanned dental arch). Any known surface and/or mesh simplification algorithm may be used to reduce a number of faces, etc. of the 3D polygonal model. FIGS. 10A-D illustrate a 3D surface and simplified 3D polygonal models of increasing levels of simplicity, any of which may be used for image selection in embodiments.

At block 406, processing logic identifies, for each intraoral image, one or more faces of the 3D polygonal model associated with the image. Identifying the faces of the 3D polygonal model that are associated with an image may include determining a camera that generated the image, a position and/or orientation of the camera that generated the image relative to the 3D polygonal model, and/or parameters of the camera that generated the image such as a focus setting of the camera at the time of image generation.

For each 2D image, processing logic may determine a position of the intraoral scanner that generated the 2D image relative to the 3D surface. Since intraoral scans include many points with distance information indicating distance of those points in the intraoral scan to the intraoral scanner, the distance between the intraoral scanner to the dental site (and thus to the 3D surface to which the intraoral scans are registered and stitched) is known and/or can be easily computed for any intraoral scan. The intraoral scanner may alternate between generating intraoral scans and 2D images. Accordingly, the distance between the intraoral scanner and the dental site (and/or the 3D surface) that is associated with a 2D image may be interpolated based on distances associated with intraoral scans generated before and after the 2D image in embodiments.

Once the camera, camera position/orientation and/or camera settings are determined for an image, processing logic may use such information to project the 3D polygonal model onto a plan associated with the image. The plane may be a plane at a focal distance from the camera that generated the image and may be parallel to a plane of the image. A synthetic version of the image may be generated by projecting the 3D polygonal model onto the determined plane. In embodiments, generating the synthetic version of the image includes performing rendering or rasterization of the 3D polygonal model from a point of view of the camera that generated the image. The synthetic image includes one or more faces of the 3D polygonal model as seen from a viewpoint of the camera that generated the image. In one embodiment, the synthetic image comprises a height map, where each pixel includes height information on a depth of that pixel (e.g., a distance between the point on the 3D surface and a camera for that pixel). Processing logic may determine that an image is associated with those faces that are shown in an associated synthetic version of that image.

At block 408, for each face of the 3D polygonal model, processing logic identifies one or more images that are associated with the face and that satisfy one or more image selection criteria. In one embodiment, processing logic determines, for each image, and for each face associated with the image, a score for that face. Multiple different techniques may be used to score faces of the 3D polygonal model shown in images, some of which are described with reference to FIGS. 6-7. Processing logic may then select, for each face of the 3D polygonal model, one or more image having a highest score for that face.

At block 410, processing logic adds those images that were identified as being associated with a face and as satisfying an image selection criterion for that face to a subset of images. Processing logic may select the identified subset of images.

At block 412, processing logic may discard or ignore a remainder of the images that are not included in the selected subset of images. Processing logic may additionally store the selected subset of images without storing the remainder of images. At block 416, processing logic may perform one or more additional operations on the selected subset of images without performing the additional operations on the remainder of images. Examples of additional operations that may be performed include outputting selected images to a display, performing texture mapping on a 3D surface using information (e.g., color information) from the selected images, performing image compression using the selected images, and so on.

At block 418, processing logic determines whether scanning is complete. If scanning is not complete, the method may return to block 402, and additional intraoral images may be received. The operations of one or more of blocks 402-416 may be repeated multiple times as additional scanning is performed and additional intraoral images are received. This may cause newly received images to cause previously selected images to no longer satisfy one or more image selection criteria. A previously selected image may then be deselected, and may be discarded and/or ignored. If the previously selected image had been stored, then it may be removed from storage. This process may repeat until scanning is complete. If at block 418 a determination is made that scanning is complete, the method may end. In some embodiments, operations of blocks 412 and/or 416 may be performed after scanning is complete in addition to or instead of during scanning. For example, the operations of blocks 412 and/or 416 may be performed after a determination has been made at block 418 that scanning is complete.

Figure 5:
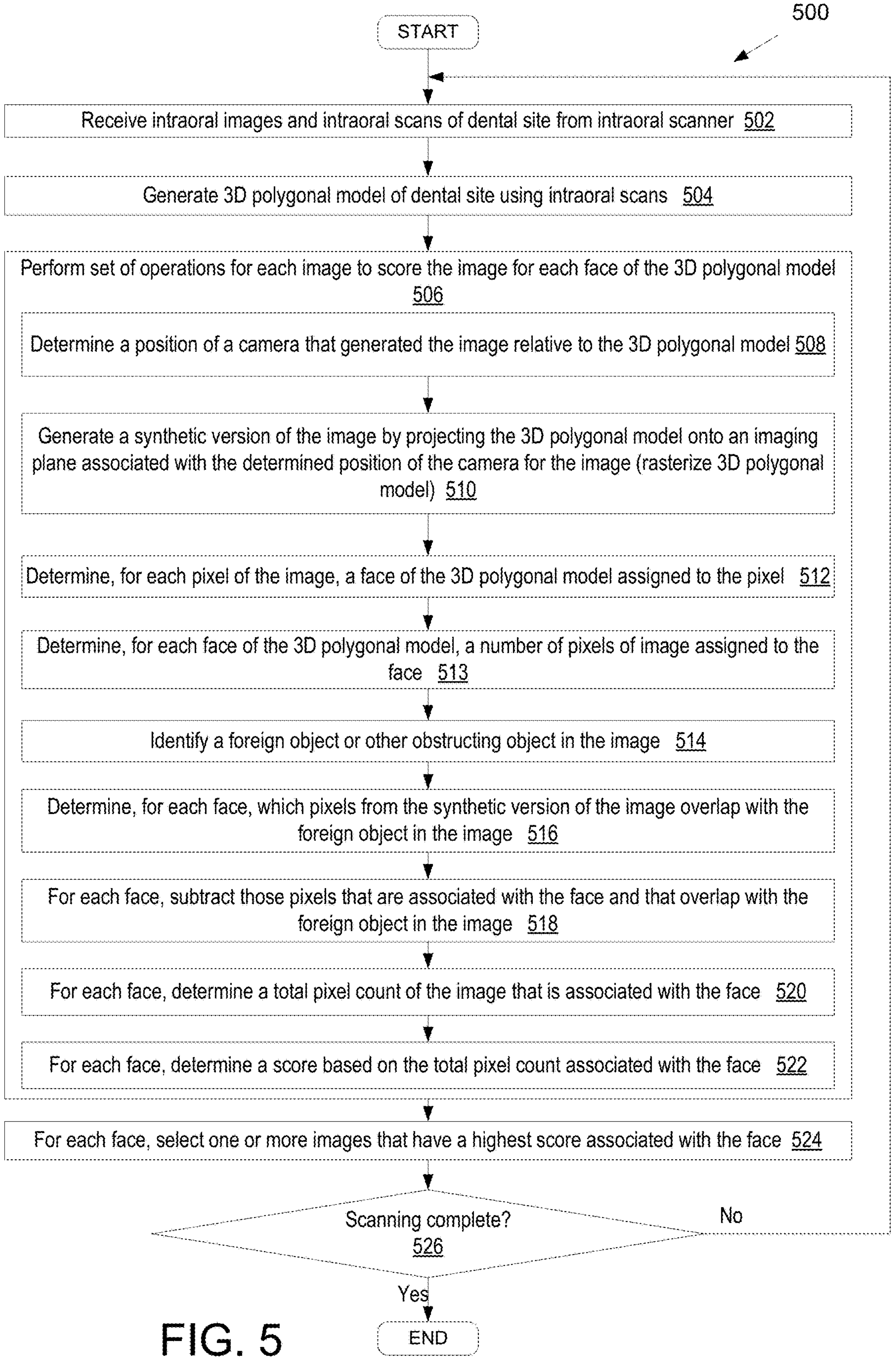
FIG. 5 is a flow chart for a method of scoring images generated by an intraoral scanner and selecting a subset of the images based on the scoring, in accordance with embodiments of the present disclosure.

FIG. 5 is a flow chart for a method 500 of scoring images generated by an intraoral scanner and selecting a subset of the images based on the scoring, in accordance with embodiments of the present disclosure. At block 502 of method 500, processing logic receives one or more intraoral scans of a dental site. Processing logic additionally receives two-dimensional (2D) images of the dental site, which may include color 2D images, near infrared (NIR) 2D images, 2D images generated under ultraviolet light, and so on.

At block 504, processing logic generates a 3D surface representing the scanned dental site using the one or more received intraoral scans. Once the 3D surface has been generated, a simplified 3D polygonal model (e.g., a polygon mesh) may be generated from the 3D surface. In embodiments, the 3D polygonal model may have between about 500 and about 6000 faces, or between about 600 and about 4000 faces, or between about 700 and about 2000 faces. Other numbers of faces may also be used for the 3D polygonal model.

At block 506, processing logic performs a set of operations for each image to score the image for each face of the 3D polygonal model. The set of operations may result in a score being assigned to an image for each face of the 3D polygonal model. For faces that are not shown in an image, the scores for the faces may be zero. For faces that are shown in the image, the scores for the faces may be some quantity above zero. In one embodiment, the set of operations that is performed on each image includes the operations of blocks 508-522.

In one embodiment, at block 508 processing logic determines a position of the intraoral scanner that generated the 2D image relative to the 3D surface. This may include determining a three-dimensional location of the camera (e.g., x, y, z coordinates of the camera). Since intraoral scans include many points with distance information indicating distance of those points in the intraoral scan to the intraoral scanner, the distance between the intraoral scanner to the dental site (and thus to the 3D surface to which the intraoral scans are registered and stitched) is known and/or can be easily computed for any intraoral scan. The intraoral scanner may alternate between generating intraoral scans and 2D images. Accordingly, the distance z between the intraoral scanner and the dental site (and/or the 3D surface) as well as the x and y coordinates of the scanner relative to the dental site/3D surface that is associated with a 2D image may be interpolated based on distances, x coordinate and/or z coordinate associated with intraoral scans generated before and after the 2D image in embodiments. Interpolation may be performed based on movement, rotation and/or acceleration data (e.g., from the IMU), differences between intraoral scans, timing of the intraoral scans and the image, and/or assumptions about scanner movement in a short time period due to inertia. The x, y and z coordinates of the camera may therefore be determined by interpolating between x, y, z positions of the camera of an intraoral scan generated before the image and an intraoral scan generated after the image. The distance between the intraoral scanner and the dental site may then be the z coordinate for the camera. Registration of the 3D scans to the 3D surface and interpolation using scans generated before and after a 2D image may also yield rotation values about three axes (e.g., about x, y and z axes), which provides an orientation of the camera relative to the 3D surface for the 2D image.

At block 510, processing logic generates a synthetic version of the image. Once the camera, camera position/orientation and/or camera settings are determined for an image, processing logic may use such information to project the 3D polygonal model onto a plane associated with the image. The plane may be a plane at a focal distance from the camera that generated the image and may be parallel to a plane of the image. A synthetic version of the image may be generated by projecting the 3D polygonal model onto the determined plane. In embodiments, generating the synthetic version of the image includes performing rendering or rasterization of the 3D polygonal model from a point of view of the camera that generated the image. The synthetic image includes one or more faces of the 3D polygonal model as seen from a viewpoint of the camera that generated the image. Processing logic may determine that an image is associated with those faces that are shown in an associated synthetic version of that image.

At block 512, processing logic determines, for each pixel of the image, a face of the 3D polygonal model assigned to the pixel. The faces assigned to pixels of the image can be determined using the synthetic version of the image. The synthetic version of the image includes multiple faces of the 3D polygonal model that would be visible in the image. Processing logic may determine which pixels of the synthetic version of the image are associated with which faces. The corresponding pixels in the original image may also be associated with the same faces.

Figure 11C:
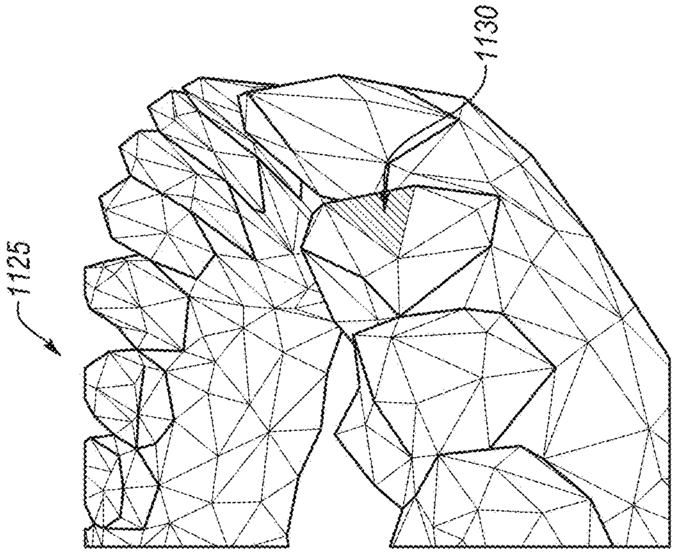
FIGS. 11A-C illustrate three different synthetic images of a dental site, in accordance with embodiments of the present disclosure.
Figure 11B:
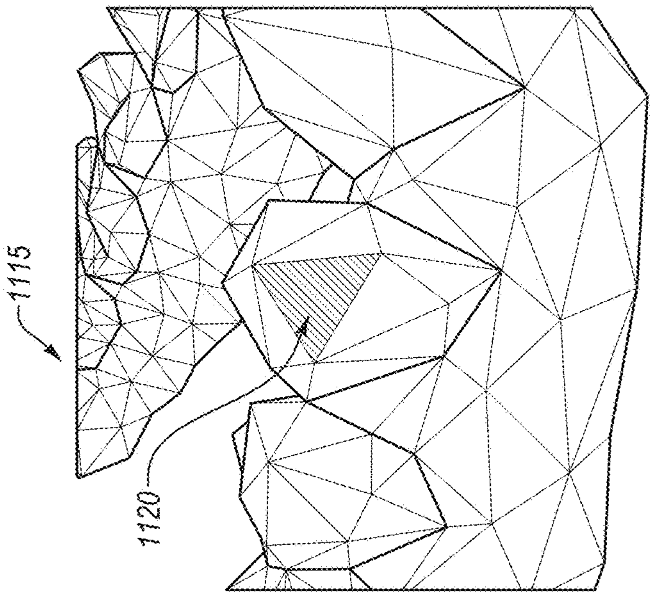
Figure 11A:
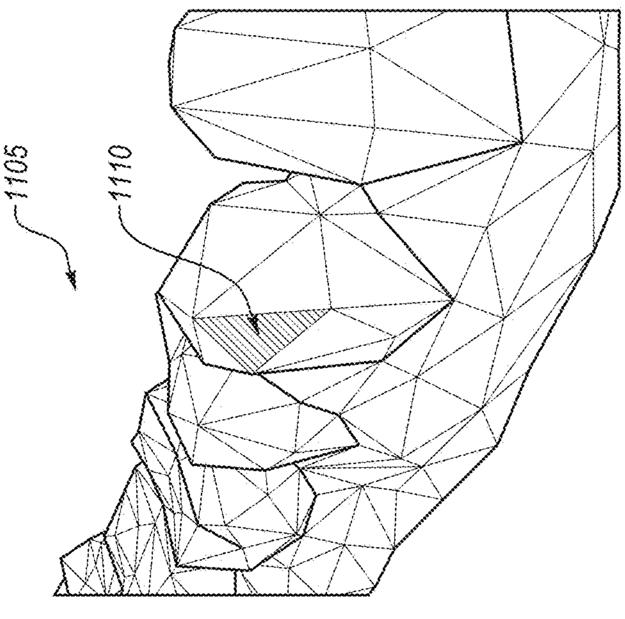
Figure 12A:
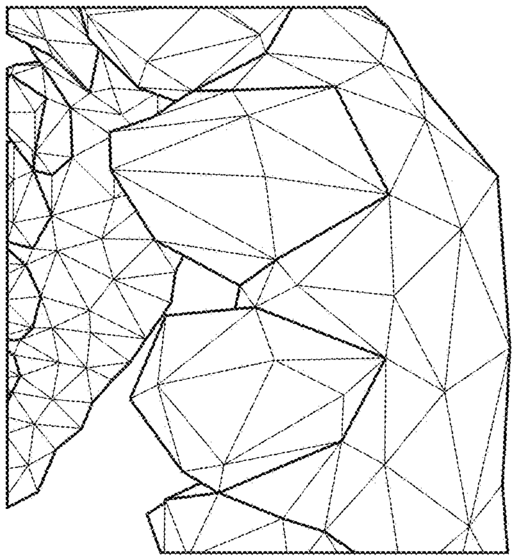
FIGS. 12A-C illustrate three different synthetic images of a dental site, in accordance with embodiments of the present disclosure.
Figure 12B:
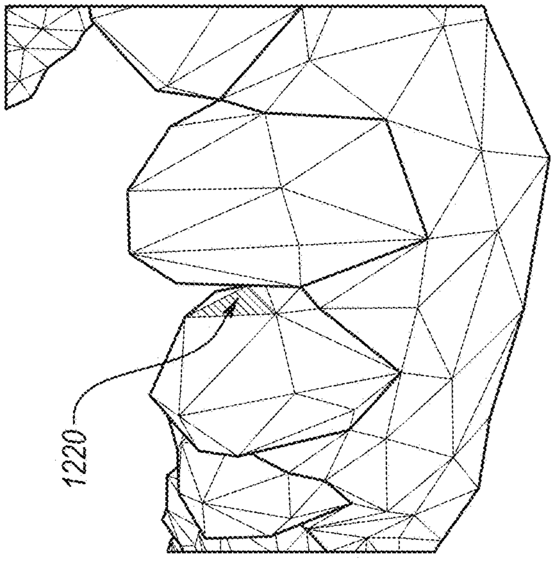
Figure 12C:
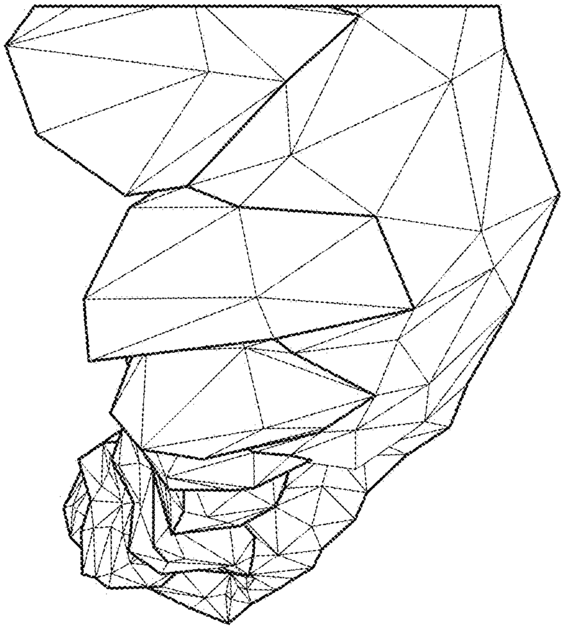

At block 513, processing logic may determine, for each face of the 3D polygonal model, a number of pixels of the image that are associated with the face. For the image, a separate score may be determined for each face based on the number of pixels associated with that face in the image. FIGS. 11A-C illustrate multiple synthetic images that each include a representation of the same face of a 3D polygonal model. FIGS. 12A-C illustrate multiple additional synthetic images some of which include a representation of the a first face of a 3D polygonal model and some of which show one or more other faces obscuring the first face.

At block 514, processing logic may identify a foreign object in the image. In one embodiment, the foreign object is identified in the image by processing the image using a trained machine learning model that has been trained to identify foreign objects in images. In one embodiment, the trained machine learning model performs pixel-level or patch-level identification of foreign objects. In an example, the trained machine learning model may be trained to perform pixel-level classification of an input image into multiple dental object classes. One example of dental object classes include a foreign object class and a native object class. One example of dental object classes include a tooth class, a gingiva class, and one or more additional object classes (e.g., such as a foreign object class, a moving tissue class, a tongue class, a lips class, and so on).

In one embodiment, the intraoral image is classified and/or segmented using one or more trained neural networks. The machine learning model (e.g., neural network) may process the image data and output a dental object classification for the image. In embodiments, classification is performed using a trained machine learning model such as is discussed in U.S. application Ser. No. 17/230,825, filed Apr. 14, 2021, which is incorporated by reference herein in its entirety.

One type of machine learning model that may be used to perform some or all of the above tasks is an artificial neural network, such as a deep neural network. Artificial neural networks generally include a feature representation component with a classifier or regression layers that map features to a desired output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g. classification outputs). Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In an image recognition application, for example, the raw input may be a matrix of pixels; the first representational layer may abstract the pixels and encode edges; the second layer may compose and encode arrangements of edges; the third layer may encode higher level shapes (e.g., teeth, lips, gums, etc.); and the fourth layer may recognize a scanning role. Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

Training of a neural network may be achieved in a supervised learning manner, which involves feeding a training dataset consisting of labeled inputs through the network, observing its outputs, defining an error (by measuring the difference between the outputs and the label values), and using techniques such as deep gradient descent and backpropagation to tune the weights of the network across all its layers and nodes such that the error is minimized. In many applications, repeating this process across the many labeled inputs in the training dataset yields a network that can produce correct output when presented with inputs that are different than the ones present in the training dataset. In high-dimensional settings, such as large images, this generalization is achieved when a sufficiently large and diverse training dataset is made available.

An output of the trained machine learning model may be a mask that includes a dental object class assigned to each pixel of the image. In some embodiments, an output of the trained machine learning model may be a probability map that includes, for each pixel, a different probability for each type of dental object class that the machine learning model is trained to identify.

Figures 13A, 13B, 13C:
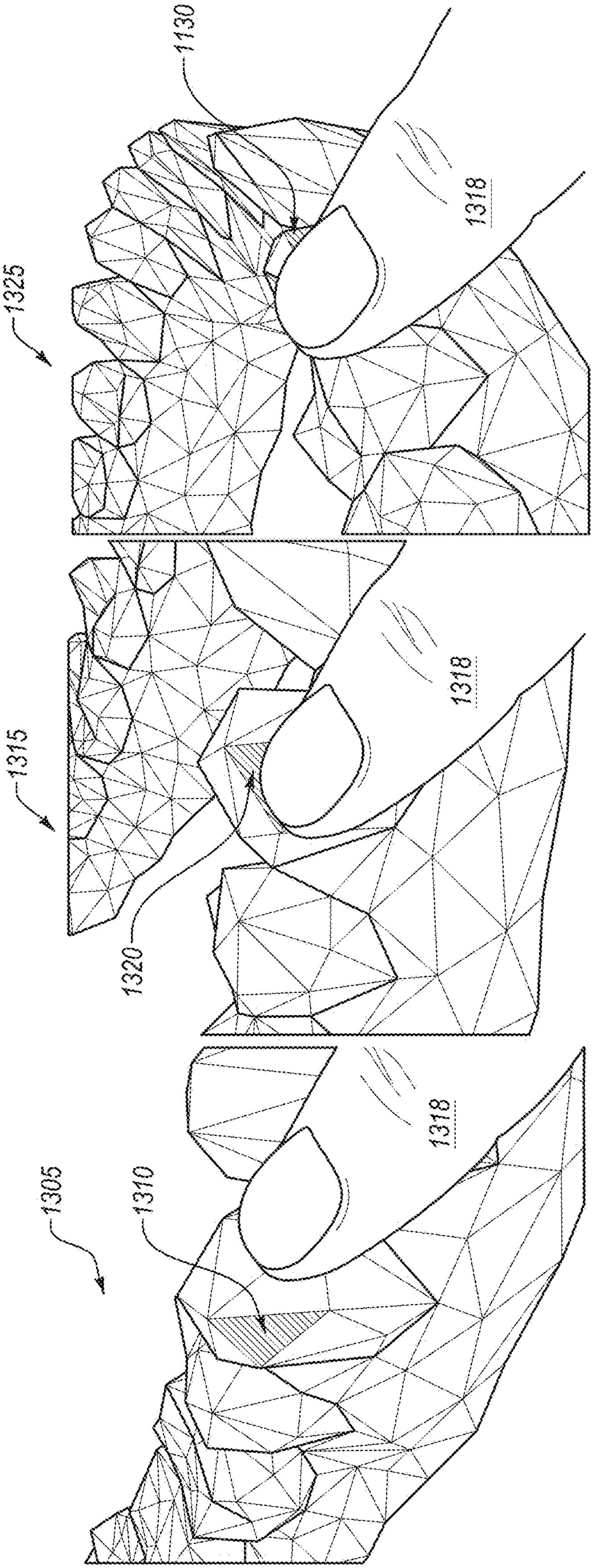
FIGS. 13A-C illustrate three different synthetic images of a dental site obstructed by a foreign object, in accordance with embodiments of the present disclosure.

At block 516, processing logic may determine which pixels in the synthetic version of the image overlap with pixels in the image that have been classified as a foreign object or other obstructing object (e.g., an object other than teeth or gingiva). At block 518, for each pixel in the synthetic version of the image that overlaps with a pixel in the image classified as a foreign object or other obstructing object, processing logic may remove the association between that pixel and a particular face of the 3D polygonal model. In other words, for each face, processing logic may subtract from the pixel count for the face those pixels that are associated with the face and that overlap with the foreign/obstructing object in the image. FIGS. 13A-C illustrate multiple synthetic images that each include a representation of the same face of a 3D polygonal model and a foreign object obscuring parts of the synthetic images.

At block 520, processing logic determines, for each face of the 3D polygonal model, a total pixel count of the image that is associated with the face. The operations of blocks 514-518 may or may not be performed prior to performance of the operations of block 520.

At block 524, processing logic determines, for each face of the 3D polygonal model, a score for the image based on the total pixel count of the image associated with the face. In a simplistic example, if 200 pixels were associated with a first face, then the first face may have a score of 200, and if 50 pixels were associated with a second face, then the second face may have a score of 50. In some embodiments, the score is a value between 0 and 1, where 1 is a highest score and 0 is a lowest score. In such embodiments, the score may be a normalized value in which the highest number of pixels correlates to a score of 1, for example. In embodiments, the score for a face may be a function of a number of pixels of the image associated with the face. The score for the face may be weighted based on one or more factors, as is discussed in greater detail with reference to FIGS. 6-7. For example, in one embodiment, for each image of the plurality of images, and for one or more face of the 3D polygonal model, processing logic determines one or more properties associated with the one or more face and the image and applies a weight to the score for the face based on the one or more properties. Additionally, or alternatively, for each image of the plurality of images, processing logic determines one or more properties associated with the image and applies a weight to the score for the image based on the one or more properties. Such a weight that is applied to an image may apply to each face associated with that image. Additionally, or alternatively, the contribution of one or more pixels to the score for a face may be weighted based one or more factors, as is discussed in greater detail with reference to FIGS. 6-7. Additionally, or alternatively, the scores for all faces for an image may be weighted based on one or more factors (e.g., such as scanner velocity).

At block 524, for each face of the 3D polygonal model, processing logic selects one or more images that have a highest score associated with the face. In one embodiment, a single image is selected for each face. Alternatively, two, three, four, five, six, seven or more images with highest scores may be selected for each face. Processing logic may determine a subset of selected images. Processing logic may discard or ignore a remainder of the images that are not included in the selected subset of images. Processing logic may additionally store the selected subset of images without storing the remainder of images. Processing logic may perform one or more additional operations on the selected subset of images without performing the additional operations on the remainder of images. Examples of additional operations that may be performed include outputting selected images to a display, performing texture mapping on a 3D surface using information (e.g., color information) from the selected images, performing image compression using the selected images, and so on.

At block 526, processing logic determines whether scanning is complete. If scanning is not complete, the method may return to block 502, and additional intraoral images may be received. The operations of one or more of blocks 502-524 may be repeated multiple times as additional scanning is performed and additional intraoral images are received. This may cause newly received images to cause previously selected images to no longer satisfy one or more image selection criteria. A previously selected image may then be deselected, and may be discarded and/or ignored. If the previously selected image had been stored, then it may be removed from storage. This process may repeat until scanning is complete. If at block 526 a determination is made that scanning is complete, the method may end.

Figure 6:
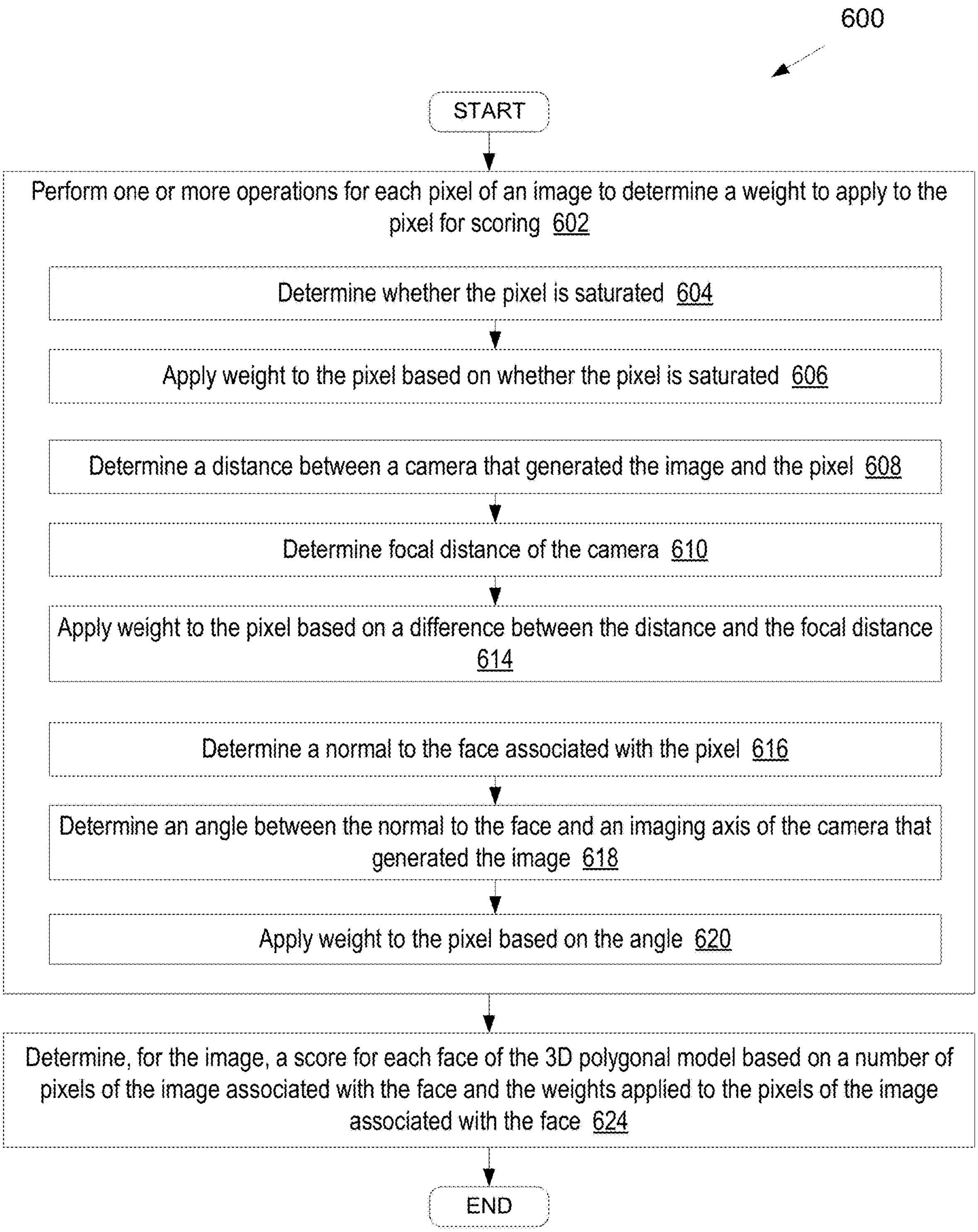
FIG. 6 is a flow chart for a method of scoring images generated by an intraoral scanner, in accordance with embodiments of the present disclosure.

FIG. 6 is a flow chart for a method 600 of scoring images generated by an intraoral scanner, in accordance with embodiments of the present disclosure. Method 600 may be performed, for example, at block 304 of method 300, at block 408 of method 400, and/or at block 522 of method 500. At block 602 of method 600, processing logic performs one or more operations for each pixel of an image to determine a weight to apply to the pixel in scoring. In one embodiment, each pixel associated with a face has a default weight (e.g., a default weight of 1) for that image. That default weight may be modified based on one or more properties of the pixel and/or image. Adjustments to the weighting applied to a pixel may include an increase in the weighting or a decrease in the weighting.

In one embodiment, at block 604 processing logic determines whether a pixel is saturated. A pixel may be saturated if an intensity of the pixel corresponds to a maximum intensity detectable by the camera that generated the image. If a pixel is saturated, this may indicate that the color information for that pixel is unreliable. Accordingly, at block 606 processing logic may apply a weight to the pixel based on whether the pixel is saturated. In one embodiment, if the pixel is saturated, then a fractional weight (e.g., 0.5, 0.7, etc.) is applied to the pixel. This will cause the contribution of the pixel to a final score for a face associated with the pixel for an image to be reduced.

In one embodiment, at block 608 processing logic determines a distance between a camera that generated the image and the pixel. At block 610, processing logic determines a focal distance of the camera. At block 614, processing logic determines a difference between the distance and the focal distance. Processing logic may apply a weight to the pixel based on the difference. In one embodiment, if the distance is zero, then no weight is applied to the contribution of the pixel to the score or a positive weight is applied to the pixel to increase a contribution of the pixel to the score. In one embodiment, if the distance is greater than 0, then a fractional weight (e.g., 0.5, 0.7, etc.) is applied to the pixel based on the distance. The greater the distance, the smaller the fractional weight that is applied to the pixel. For example, a difference of 0.1 mm may result in a weight of 0.9, while a difference of 0.5 mm may result in a weight of 0.5. This will cause the contribution of the pixel to a final score for a face associated with the pixel for an image to be reduced.

In one embodiment, at block 616 processing logic determines a normal to the face associated with the pixel. The normal to the face may be determined from the 3D polygonal model in an embodiment. At block 618, processing logic determines an angle between the normal to the face and an imaging axis of the camera that generated the image that includes the pixel. The imaging axis of the camera may be normal to a sensing surface of the camera and may have an origin at a center of the sensing surface of the camera in an embodiment. At block 620, processing logic applies a weight to the pixel based on the angle. In one embodiment, if the angle is zero degrees, then no weight is applied to the contribution of the pixel to the score or a positive weight is applied to the pixel to increase a contribution of the pixel to the score. In one embodiment, if the angle deviates from zero degrees, then a fractional weight (e.g., 0.5, 0.7, etc.) is applied to the pixel based on the angle. The greater the angle, the smaller the fractional weight that is applied to the pixel. For example, an angle of 5 degrees may result in a weight of 0.9, while an angle of 60 degrees may result in a weight of 0.5. This will cause the contribution of the pixel to a final score for a face associated with the pixel for an image to be reduced.

At block 624, processing logic determines, for the image, a score for each face of the 3D polygonal model based on a number of pixels of the image associated with the face and weights applied to the pixels of the image associated with the face. Some or all of the weights discussed with reference to block 602 may be used and/or other weights may be used that are based on other criteria. In one embodiment, a value is applied to each pixel, and the values of each pixel are potentially adjusted by one or more weights determined for the pixel. The weighted values of the pixels may then be summed for each face to determine a final score for that face. As discussed with reference to FIG. 5, some of the pixels associated with a face may be disassociated with the face due to an overlapping obstructing object, which ultimately reduces a score for the face.

Figure 7:
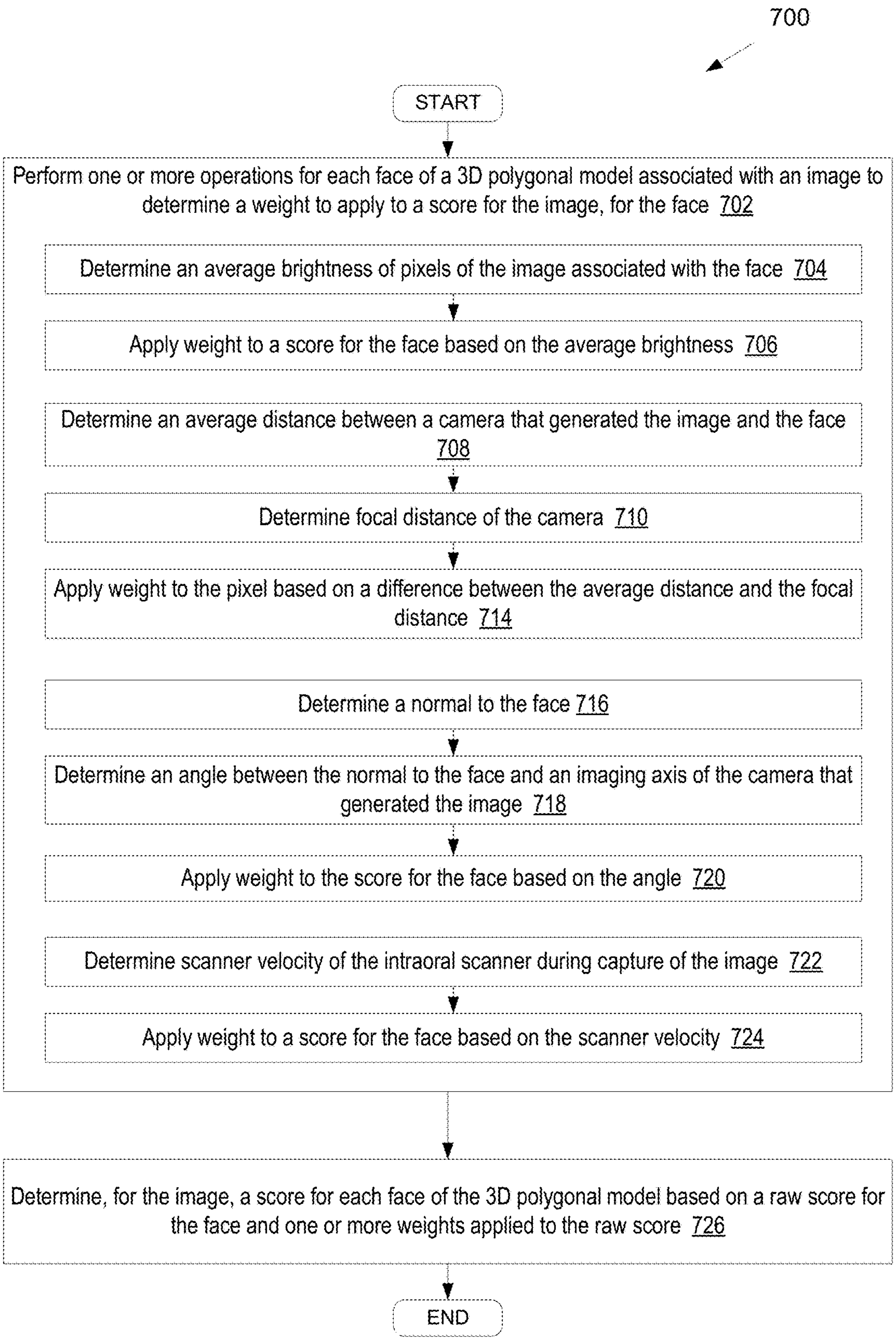
FIG. 7 is a flow chart for a method of scoring images generated by an intraoral scanner, in accordance with embodiments of the present disclosure.

FIG. 7 is a flow chart for a method 700 of scoring images generated by an intraoral scanner, in accordance with embodiments of the present disclosure. Method 700 may be performed, for example, at block 304 of method 300, at block 408 of method 400, and/or at block 522 of method 500. At block 702 of method 700, processing logic performs one or more operations for each face of a polygonal model associated with an image to determine a weight to apply to a score for the image, for the face.

In one embodiment, at block 704 processing logic determines an average brightness of pixels of the image associated with the face. At block 706, processing logic may then apply a weight to a score for the face based on the average brightness. For example, if the average brightness for a face is low, then a lower weight may be applied to the score for the face in the image. If the average brightness is high, then a higher weight may be applied to the score for the face in the image.

In one embodiment, at block 708 processing logic determines a distance between a camera that generated the image and the face. The distance may be an average distance of the pixels of the face in an embodiment. At block 710, processing logic determines a focal distance of the camera. At block 714, processing logic determines a difference between the distance and the focal distance. Processing logic may apply a weight to the face based on the difference. In one embodiment, if the distance is zero, then no weight is applied to the face. In one embodiment, if the distance is greater than 0, then a fractional weight (e.g., 0.5, 0.7, etc.) is applied to the face based on the distance. The greater the distance, the smaller the fractional weight that is applied to the face. For example, a difference of 0.1 mm may result in a weight of 0.9, while a difference of 0.5 mm may result in a weight of 0.5. This will cause the final score for the face associated to be reduced.

In one embodiment, at block 716 processing logic determines a normal to the face. The normal to the face may be determined from the 3D polygonal model in an embodiment. At block 718, processing logic determines an angle between the normal to the face and an imaging axis of the camera that generated the image. The imaging axis of the camera may be normal to a sensing surface of the camera and may have an origin at a center of the sensing surface of the camera in an embodiment. At block 720, processing logic applies a weight to the face based on the angle. In one embodiment, if the angle is zero degrees, then no weight is applied to the score. In one embodiment, if the angle deviates from zero degrees, then a fractional weight (e.g., 0.5, 0.7, etc.) is applied to the score based on the angle. The greater the angle, the smaller the fractional weight that is applied to the score. For example, an angle of 5 degrees may result in a weight of 0.9, while an angle of 60 degrees may result in a weight of 0.5. This will cause the final score for the face to be reduced.

In one embodiment, at block 722 processing logic determines a scanner velocity of the intraoral scanner during capture of the image. In one embodiment, movement data is generated by an inertial measurement unit (IMU) of the intraoral scanner. The IMU may generate inertial measurement data, including acceleration data, rotation data, and so on. The inertial measurement data may identify changes in position in up to three dimensions (e.g., along three axes) and/or changes in orientation or rotation about up to three axes. The movement data from the IMU may be used to perform dead reckoning of the scanner 150. Use of data from the IMU for registration may suffer from accumulated error and drift, and so may be most applicable for scans generated close in time to one another. In embodiments, movement data from the IMU is particularly accurate for detecting rotations of the scanner 150.

In one embodiment, movement data is generated by extrapolating changes in position and orientation (e.g., current motion) based on recent intraoral scans that successfully registered together. Processing logic may compare multiple intraoral images (e.g., 2D intraoral images) and/or 3D surfaces and determine a distance between a same point or sets of points that are represented in each of the multiple intraoral images and/or scans. For example, movement data may be generated based on the transformations performed to register and stitch together multiple intraoral scans. Each image and scan may include an associated time (e.g., time stamp) indicating a time at which the image/scan was generated, from which processing logic may determine the times at which each of the images and/or scans was generated. Processing logic may use the received or determined times and the distances between the features in the images and/or scans to determine a rate of change of the distances between the features (e.g., a speed or velocity of the intraoral scanner between scans). In one embodiment, processing logic may determine or receive times at which each of the images and/or scans was generated and determine the transformations between scans to determine a rate of rotation and/or movement between scans.

In some implementations processing logic automatically determines a scanner speed/velocity associated with intraoral scans and/or images. Moving the scanner too quickly may result in blurry intraoral scans and/or a low amount of overlap between scans.

At block 724, processing logic applies a weight to the scores for each of the faces associated with the image based on the scanner velocity. In one embodiment, if the scanner velocity is below a threshold velocity, then no weight is applied to the score. In one embodiment, a weight to apply to the scores for each of the faces in the image is determined based on the scanner velocity, where an increase in the scanner velocity correlates to a decrease in the weight to apply to the scores for the faces in the image.

At block 726, processing logic determines, for the image, a score for each face of the 3D polygonal model based on a raw score for the face (e.g., as determined based on a number of pixels associated with the face are in the image) and one or more weights applied to the raw score (e.g., as determined at one or more of blocks 702-724. Some or all of the weights discussed with reference to block 702 may be used and/or other weights may be used that are based on other criteria.

Figure 8:
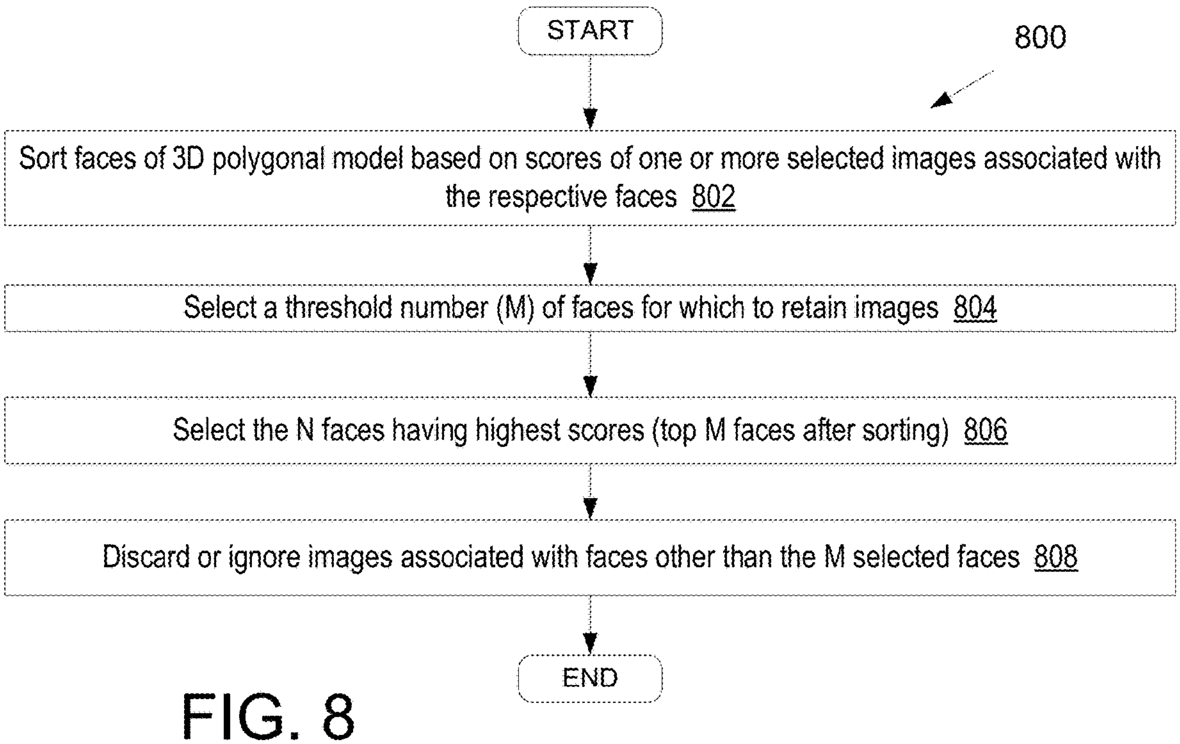
FIG. 8 is a flow chart for a method of reducing a number of images in a selected image data set, in accordance with embodiments of the present disclosure.

FIG. 8 is a flow chart for a method 800 of reducing a number of images in a selected image data set, in accordance with embodiments of the present disclosure. In some embodiments, at least some faces of the 3D polygonal model cannot be seen from any images in intraoral scan data, and some images are selected for multiple faces. Accordingly, in embodiments the number of selected images may be on the order of N/5, where N is a number of faces in the 3D polygonal model. To avoid selecting too few images, surface simplification can be relaxed and a higher number of faces may be selected. For example, if N is a target number of faces, then N*2, N*3, N*4, N*5, and so on faces may be selected. This approach ensures that too few images are not selected, at the expense of potentially selecting more than a desired number of images in the worst case scenario.

In some embodiments, after images have been selected there are still too many images remaining in the selected dataset. Accordingly, in some embodiments processing logic performs method 800 to reduce a number of selected images. At block 802, processing logic sorts faces of a 3D polygonal model based on the scores of the images selected for those faces. At block 804, processing logic selects a threshold number (M), where M may be a preconfigured value less than N or may be a user selected value less than N. At block 806, processing logic selects M faces having assigned images with highest scores. Intraoral scan application may deselect the images associated with the remaining N minus M faces that were not selected. The deselected images associated with faces other than the M selected faces may be discarded or ignored. Accordingly, there may be no remaining selected images associated with some faces. The faces for which there are no selected images are by their nature smaller faces of lesser importance. Method 800 enables strict guarantees of a number of images in a worst case scenario while also selecting a target number of images on average.

Figure 9:
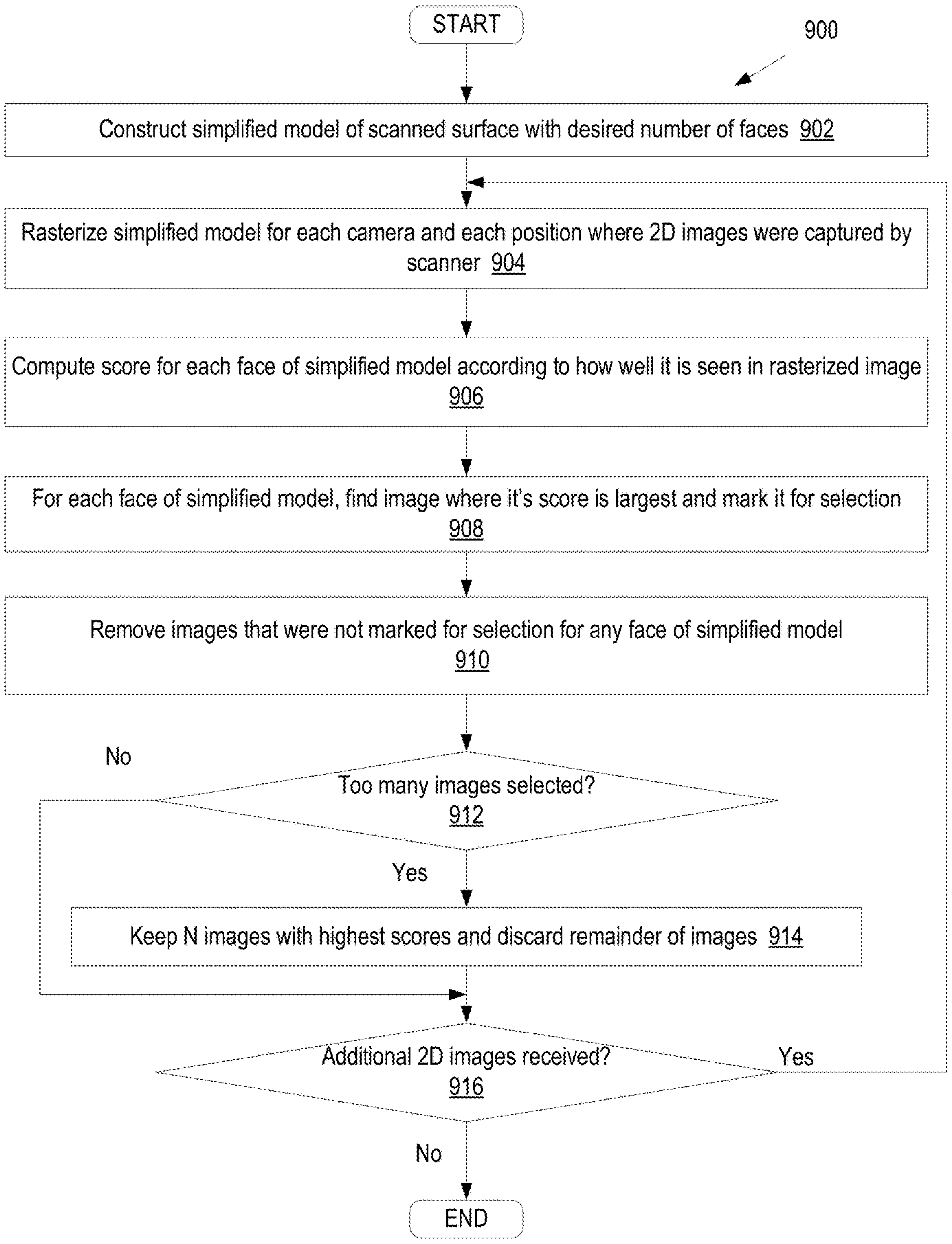
FIG. 9 is a flow chart for a method of scoring images generated by an intraoral scanner and selecting a subset of the images based on the scoring, in accordance with embodiments of the present disclosure.

FIG. 9 is a flow chart for a method 900 of scoring images generated by an intraoral scanner and selecting a subset of the images based on the scoring, in accordance with embodiments of the present disclosure. At block 902 of method 900, processing logic constructs a simplified 3D polygonal model of a scanned surface, the 3D polygonal model having a target number of faces. The 3D polygonal model may be constructed by first generating a 3D surface from intraoral scans and then simplifying the 3D surface in embodiments.

At block 904, processing logic rasterizes the simplified 3D polygonal model for each camera and each position where 2D images were captured by an intraoral scanner. This produces a synthetic version of each captured image. At block 906, processing logic computes a score for each face of the simplified 3D polygonal model for each image according to how well the face can be seen in the rasterized image. At block 908, for each face of the simplified 3D polygonal model processing logic finds an image where that image's score for the face is largest among scores for that face and marks that image for selection.

At block 910, processing logic removes images that were not marked for selection for any face of the simplified 3D polygonal model. This may include deleting the images. At block 912, processing logic may determine whether too many images (e.g., more than a threshold number of images) have been selected. If too many images have not been selected, the method continued to block 916. If too many images have been selected, the method proceeds to block 914, at which processing logic keeps N images with highest scores and discards a remainder of images. N may be an integer value, which may be preset or may be set by a user.

At block 916, processing logic determines whether additional images have been received. If so, the method may return to block 904 and repeated for the new images. If no new images are received, the method ends.

Figure 10B:
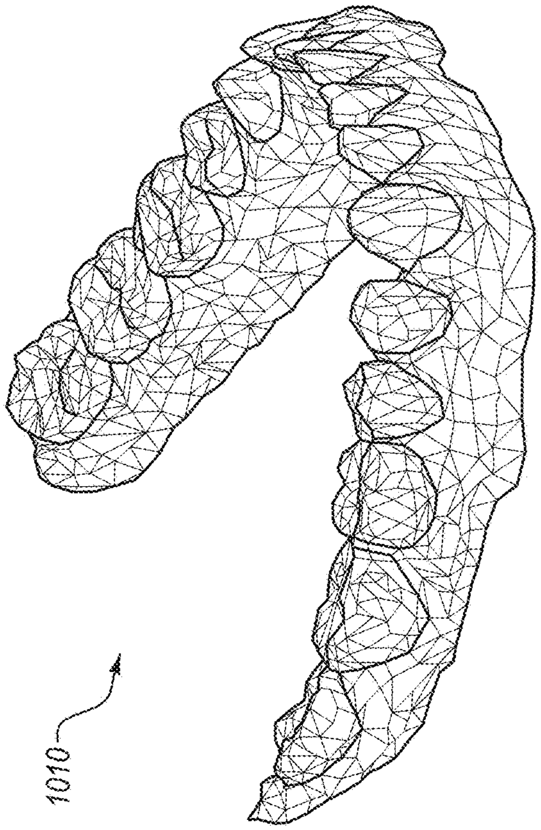
FIGS. 10A-D illustrate 3D polygonal models of a dental site each having a different number of faces, in accordance with embodiments of the present disclosure.
Figure 10A:
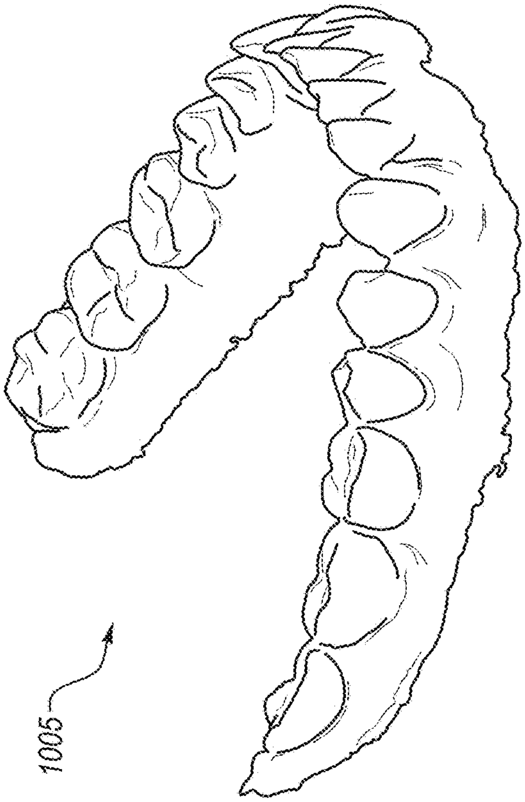
Figure 10D:
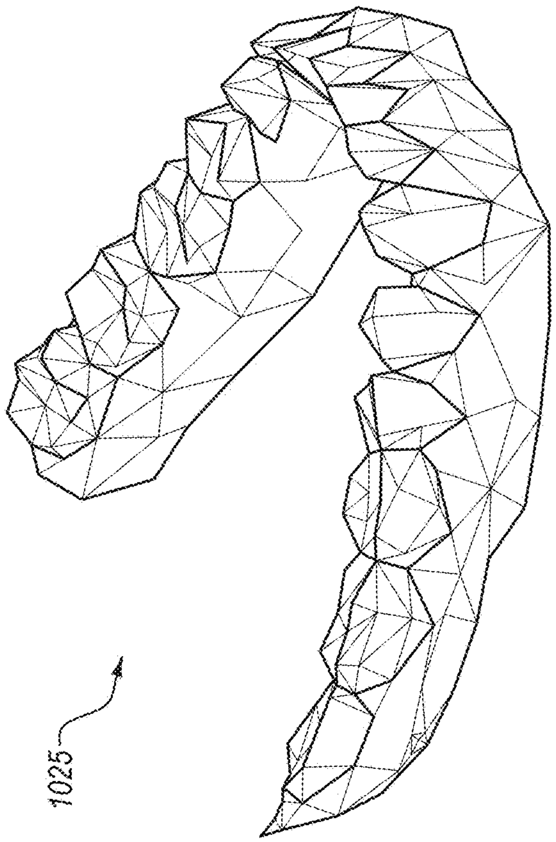
Figure 10C:
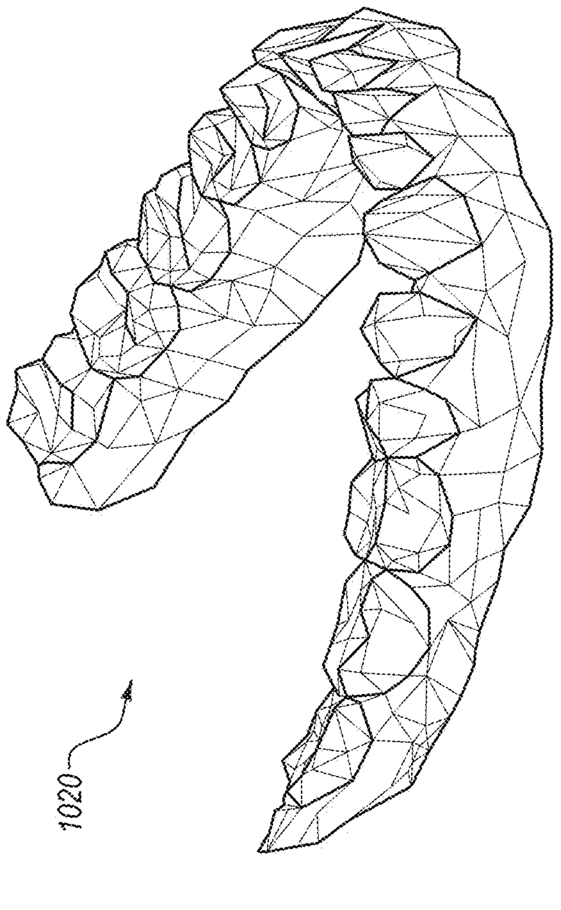

FIGS. 10A-D illustrate 3D polygonal models of a dental site each having a different number of faces, in accordance with embodiments of the present disclosure. FIG. 10A illustrates a 3D surface before simplification, which may include about 431,000 faces in an embodiment. FIG. 10B illustrates a simplified 3D polygonal model having about 31,000 faces, according to an embodiment. FIG. 10C illustrates simplified 3D polygonal model having about 3000 faces, according to an embodiment. FIG. 10D illustrates simplified 3D polygonal model having about 600 faces, according to an embodiment.

FIGS. 11A-D illustrate three different synthetic images of a dental site, in accordance with embodiments of the present disclosure. As shown, FIG. 11A depicts a first image 1105 that includes a first representation 1110 of a first face, the first representation 1110 having a first size. FIG. 11B depicts a second image 1115 that includes a second representation 1120 of the first face, the second representation 1120 having a second size that is greater than the first size. FIG. 11C depicts a third image 1125 that includes a third representation 1130 of the first face, the third representation 1130 having a third size that is smaller than the first and second sizes. In embodiments each image is assigned a score for the face based at least in part on the size of the face in that image. The image having the highest score for the face may then be selected, which would be image 1115 in this example.

FIGS. 12A-C illustrate three different synthetic images of a dental site, in accordance with embodiments of the present disclosure. As shown, FIG. 12A depicts a first image 1205 in which a first face is obscured. FIG. 12B depicts a second image 1215 that includes a representation 1220 of the first face, where the first face is not obscured in the second image 1215. FIG. 12C depicts a third image 1225 in which the first face is obscured. In embodiments each image is assigned a score for the face based at least in part on the size of the face in that image and whether the face is obscured. For images for which the face is obscured, the face may be assigned a value of 0. The image having the highest score for the face may then be selected, which would be image 1215 in this example.

FIGS. 13A-C illustrate three different synthetic images of a dental site obstructed by a foreign object, in accordance with embodiments of the present disclosure. As shown, FIG. 13A depicts a first image 1305 that includes a first representation 1310 of a first face, the first representation 1310 having a first size. A foreign object (e.g., a finger) 1318 is captured in the image 1305 and obscures a portion of the image. However, in image 1305 the foreign object 1318 does not obscure the first representation of the first face 1310. FIG. 13B depicts a second image 1315 that includes a second representation 1320 of the first face. The second representation 1320 of the first face has larger surface area than the first representation 1310 of the first image 1305 for the first face. However, foreign object 1318 blocks a portion of the second representation 1320 of the first face. By determining the pixels in the synthetic image 1315 classified as foreign object and subtracting those pixels that overlie the second representation 1320 of the first face from the second representation, the size of the first face in the second representation 1320 is reduced to a point where it becomes smaller than the first representation 1310 of the first face. FIG. 13C depicts a third image 1325 that includes a third representation 1330 of the first face. The third representation 1330 of the first face has smaller surface area than the first and second representations of the first face. Additionally, foreign object 1318 blocks majority of the third representation 1330 of the first face. By determining the pixels in the synthetic image 1325 classified as foreign object and subtracting those pixels that overlie the third representation 1330 of the first face from the third representation, the size of the first face in the third representation 1320 is reduced. Accordingly, after accounting for occlusion by the foreign object 1318, the first image 1305 has the highest score for the first face and would be selected.

For some intraoral scanners the light output by one or more light sources of the intraoral scanners causes non-uniform illumination of a dental site to be imaged. Such non-uniform illumination can cause the intensity of pixels in images of the dental site to have wide fluctuations, which can reduce a uniformity of, for example, color information for the dental site in color 2D images of the dental site. This effect is exacerbated for intraoral scanners for which the light sources and/or cameras of the intraoral scanner are very close to the surfaces being scanned. For example, the intraoral scanner shown in FIG. 2A has light sources and cameras in a distal end of the intraoral scanner and very close to (e.g., less than 20 mm or less than 15 mm away from) an object 32 being scanned. At such close ranges, the non-uniformity of illumination provided by the light sources is increased. Additionally, small changes in the distance between the intraoral scanner and the object being scanned at such close range can cause large fluctuations in the pattern of the light non-uniformity and can cause changes in how light from multiple light sources interacts with each other. In some embodiments, the intraoral scanner has a high non-uniformity in each of x, y and z axes.

Figure 14A:
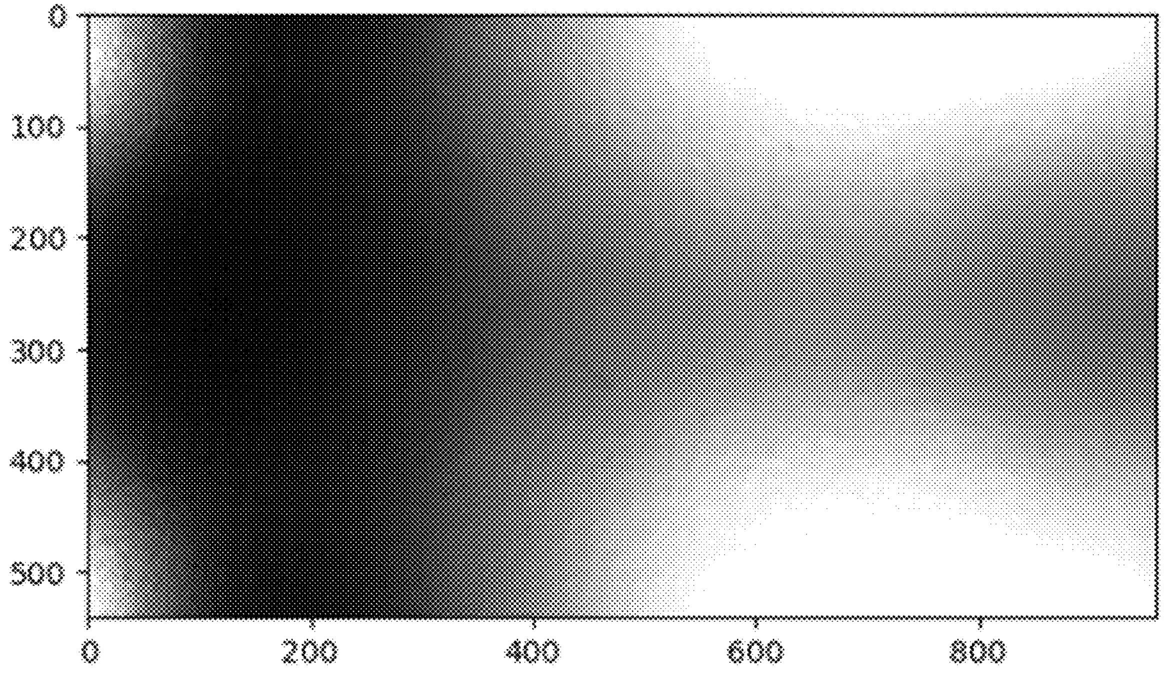
FIGS. 14A-D illustrate non-uniform illumination of a plane at different distances from an intraoral scanner, in accordance with embodiments of the present disclosure.
Figure 14B:
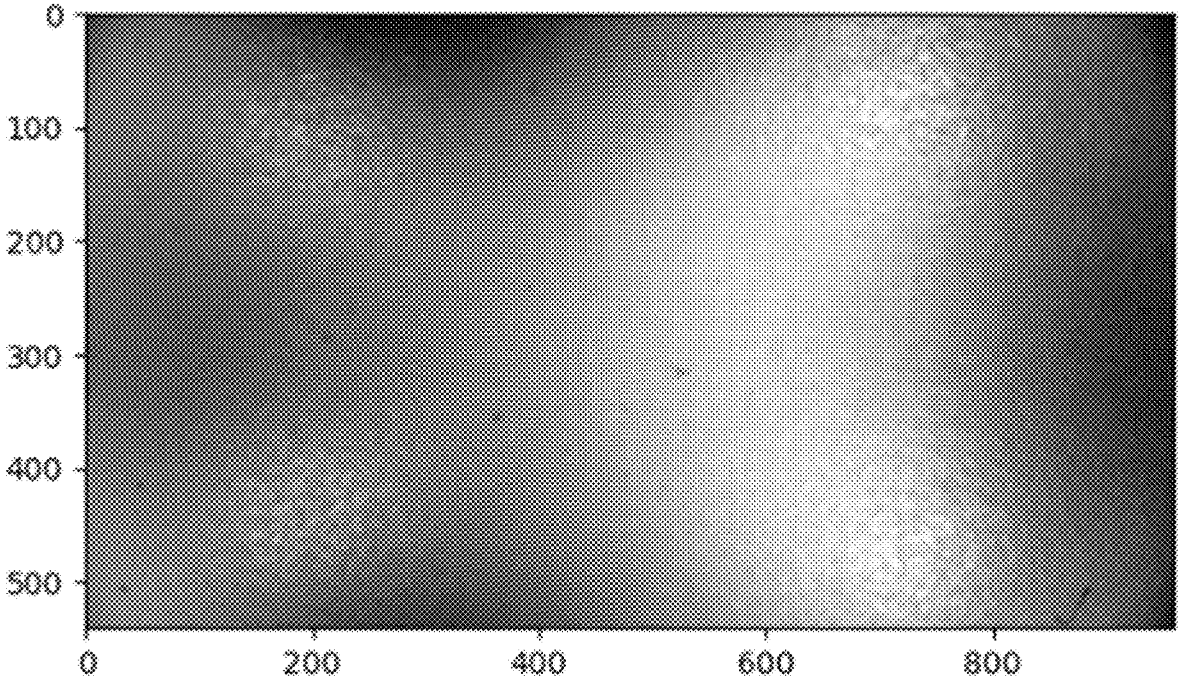
Figure 14C:
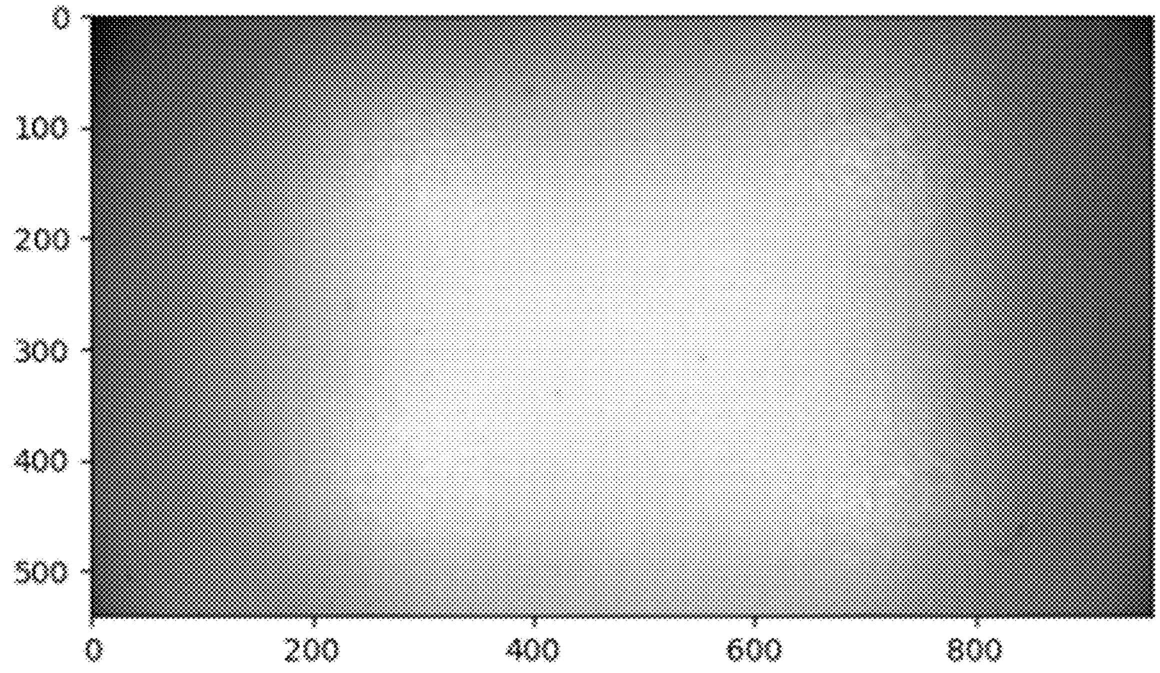
Figure 14D:
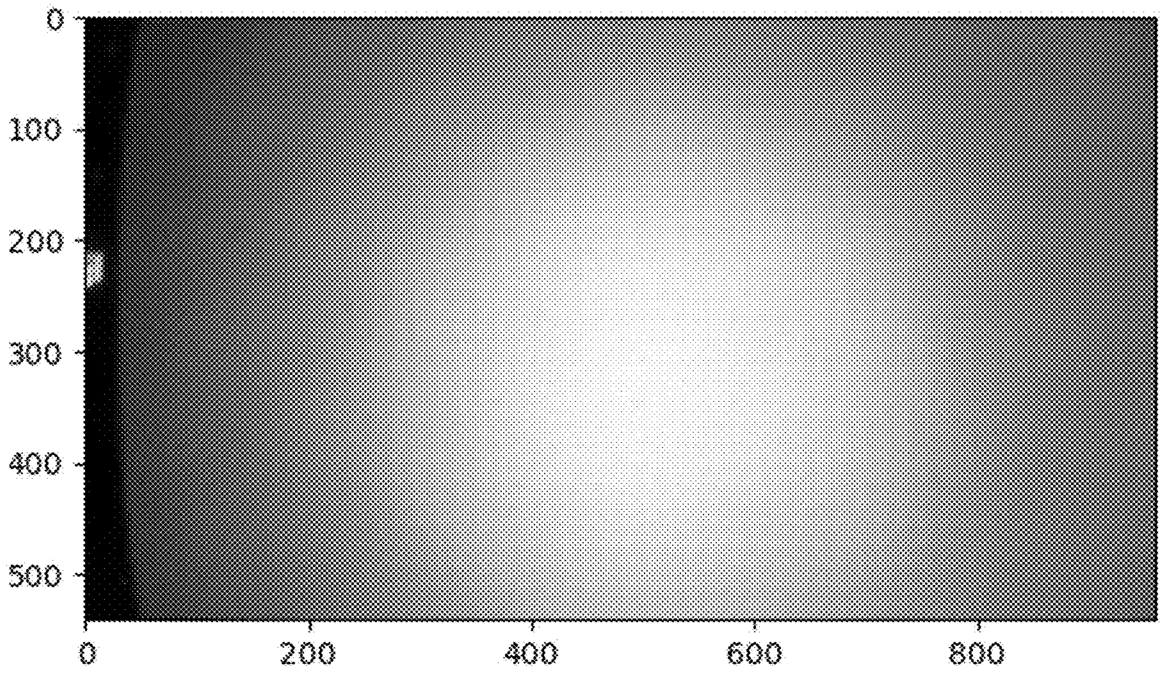

FIGS. 14A-D illustrate non-uniform illumination of a plane at different distances from the intraoral scanner described in FIG. 2A, in accordance with embodiments of the present disclosure. In each of FIGS. 14A-D the x and y axes correspond to x and y axes of an image generated by a camera of the intraoral scanner, where the image is of a flat surface at a set distance from the camera, and wherein a white pixel indicates maximum brightness and a black pixel indicates minimum brightness. In FIG. 14A, the flat surface is about 2.5 mm from the camera. As can be seen, pixels of the image having an x value of between 0 and 400 are generally very dark at this distance, while pixels having of the image having an x value of above 400 are generally much brighter. In FIG. 14B, the flat surface is about 5 mm from the camera. As can be seen, the illumination of the flat surface at 5 mm is completely different from the illumination of the flat surface at 2.5 mm. In FIG. 14C, the flat surface is about 7 mm from the camera. As can be seen, the illumination of the flat surface at 7 mm is completely different from the illumination of the flat surface at 5 mm or at 2.5 mm. For example, the central pixels of the flat surface are generally well illuminated, while the peripheral regions are less well illuminated. In FIG. 14D, the flat surface is about 20 mm from the camera. As can be seen, the illumination of the flat surface at 20 mm is completely different from the illumination of the flat surface at 2.5 mm or at 5 mm, and is also different from the illumination of the flat surface at 7 mm. At about 20 mm and further distances, the illumination of the flat surface becomes relatively uniform with changes in distance. For example, the illumination at 25 mm may be about the same as or very similar to the illumination at 20 mm.

For most intraoral scanners, illumination non-uniformity is not an issue because the camera and light source of the intraoral scanners is relatively far away from the surfaces being scanned (e.g., in a proximal region of an intraoral scanner). One possible technique that may be used to address illumination non-uniformity is use of a calibration jig or fixture that has a target with a known shape, and that precisely controls the positioning of the target and generates images of the target at many predetermined positions to ultimately determine the illumination non-uniformity and calibrate the intraoral scanner to address the illumination non-uniformity. However, such a calibration process takes considerable time, and thus increases the cost of intraoral scanners. Additionally, the jig/fixture generally requires maintenance and is not capable of capturing the real physical effects of light interaction and/or reflections and/or percolations that would occur in a real-world environment during actual scans of patients.

Embodiments described herein include one or more uniformity correction models that are capable of attenuating the non-uniform illumination provided by an intraoral scanner. For example, a separate uniformity correction model may be provided for each camera of an intraoral scanner. The uniformity correction models may attenuate non-uniform illumination at many different distances and pixel locations (e.g., x, y pixel coordinates). A uniformity correction model may receive an input of a pixel coordinate (e.g., a u, v coordinate of a pixel) and a depth of the pixel (e.g., distance between the scanned surface associated with the pixel and a camera that generated the image that includes the pixel, or distance between an exit window of the intraoral scanner and the scanned surface at the pixel coordinates) and output a gain factor to multiple by an intensity value of the pixel. In one embodiment, the image has a red, green, blue (RGB) color space, and the gain value is multiplied by each of a red value, a green value, and a blue value for the pixel.

Embodiments also cover a process of training one or more uniformity correction models using intraoral scans taken in the field (e.g., of actual patients). In embodiments, a general uniformity correction model may be trained based on data from multiple intraoral scanners of the same type (e.g., same make and model), and may be applied to each intraoral scanner of that type. Each individual intraoral scanner may then use the general uniformity correction model until that individual scanner has generated enough scan data to use that scan data to generate an updated or new uniformity correction model that is specific to that intraoral scanner. Each intraoral scanner may have slight variations in positioning and/or orientation of one or more light sources and/or cameras, may include light sources having slightly different intensities, and so on. These minor differences may not be taken into account in the general uniformity correction model(s) (e.g., one for each camera of an intraoral scanner), but the specific uniformity correction model(s) may address such minor differences.

Figure 15:
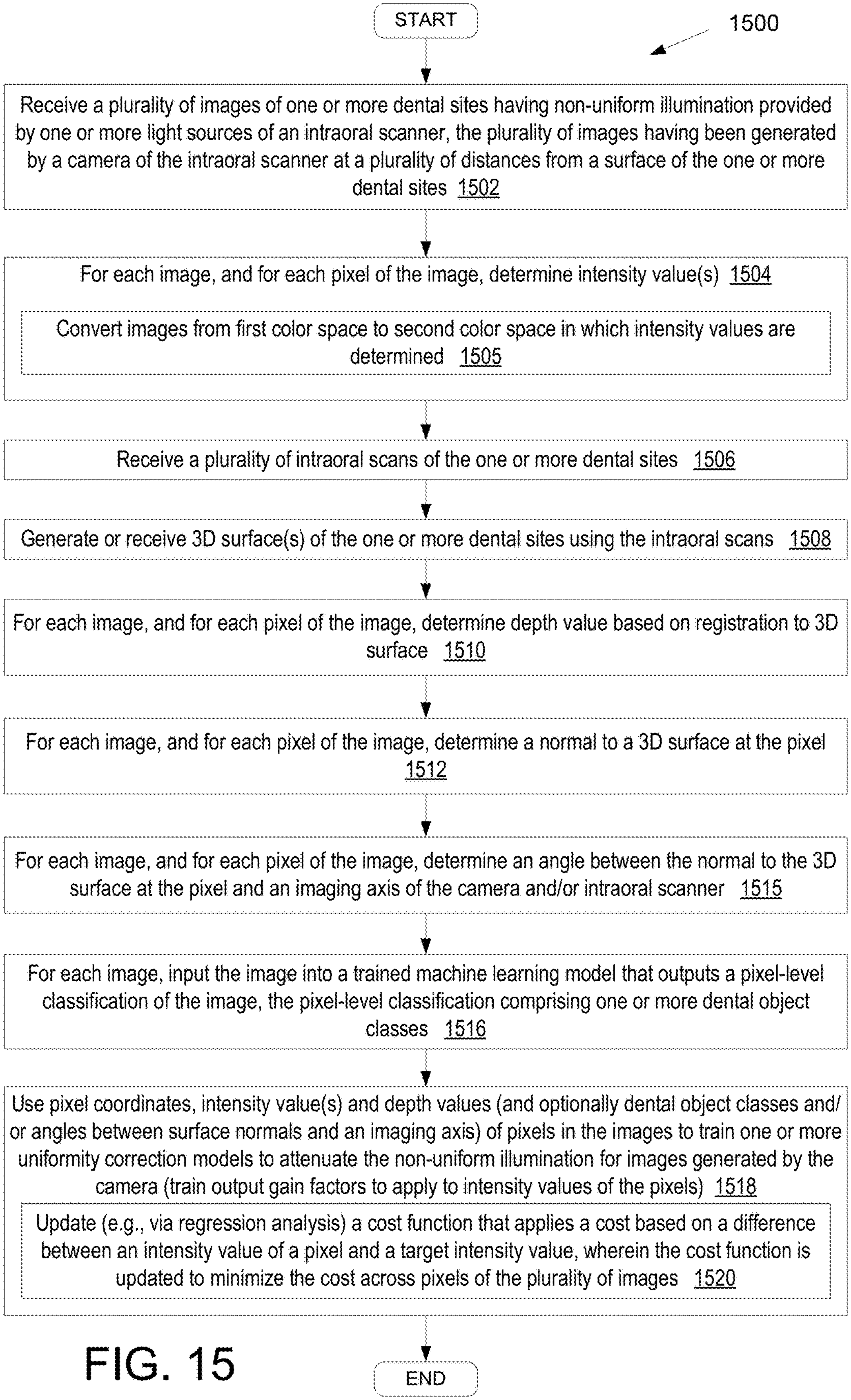
FIG. 15 is a flow chart for a method of training one or more uniformity correction models to attenuate the non-uniform illumination of images generated by an intraoral scanner, in accordance with embodiments of the present disclosure.

FIG. 15 is a flow chart for a method 1500 of training one or more uniformity correction models to attenuate the non-uniform illumination of images generated by an intraoral scanner, in accordance with embodiments of the present disclosure. At block 1502 of method 1500, processing logic receives a plurality of images of one or more dental sites. Each image may be labeled with information on an intraoral scanner that generated the image and a camera of the intraoral scanner that generated the image. For each of the images, the dental sites had non-uniform illumination provided by one or more light sources of an intraoral scanner during capture of the images. Different images of the plurality of images were generated by a camera of the intraoral scanner while an imaged surface was at different distances from the intraoral scanner. Accordingly, the non-uniform illumination varies across the images with changes in the distance between the imaged dental site and the scanner. All of the images may have been captured by the same intraoral scanner. Alternatively, different images may have been captured by different intraoral scanners. However, all of the intraoral scanners in such an instance would be of the same type (e.g., such that they include the same arrangement of cameras and light sources). The intraoral scanner(s) that generated the images may include multiple cameras, where different images were generated by different cameras of the intraoral scanner(s).

At block 1504, for each image, and for each pixel of the image, processing logic determines one or more intensity values. The image may initially have a first color space, such as an RGB color space. In one embodiment, the intensity for a pixel is the value for a particular channel of the first color space (e.g., the R channel). In one embodiment, the intensity for a pixel is a combination of values from multiple channels of the first color space (e.g., sum of the R, G and B values for an RGB image). In one embodiment, at block 1505 processing logic converts the image from the first color space to a second color space. For example, the first color space may be the RGB color space, and the second color space may be the YUV color space or another color space in which a single value represents the brightness or intensity of a pixel. The intensity of the pixel may then be determined in the second color space. For example, I the image is converted to a YUV image, then the Y value for the pixel may be determined. Due to the non-uniform illumination of the imaged dental sites, the brightness of the pixels in the images may include both intra-image variation and inter-image variation. Such variation can make it difficult to determine a true representation of colors of the imaged dental site.

At block 1506, processing logic receives a plurality of intraoral scans of the one or more dental sites. Each intraoral scan may include a label identifying an intraoral scanner that generated the intraoral scan and may be associated with one or more of the received intraoral images. At block 1508, processing logic generates one or more 3D surfaces of the one or more dental sites using the intraoral scans. Alternatively, the 3D surfaces (which may be 3D models of the scanned dental sites) may have already been generated and may be retrieved from storage.

The operations of blocks 1502, 1504 and/or 1508 may be performed together in embodiments. Processing logic may retrieve patient case details for multiple patient cases, where each patient case includes intraoral scans, intraoral images and 3D surfaces/models of a same dental site. For example, a patient case may include intraoral scans of an upper and lower dental arch of a patient and 2D images of the of the upper and lower dental arch captured during intraoral scanning, and may further include a first 3D model of the upper dental arch and a second 3D model of the lower dental arch.

The intraoral scanner(s) that generated the images of the dental sites may alternate between generation of intraoral scans and images in a predetermined sequence at the time of scanning. Accordingly, though specific distance and/or relative position/orientation of the scanner to the imaged dental site may not be known for an image, such information can be interpolated based on knowledge of that information for intraoral scans generated before and after that image, as was described in greater detail above. Additionally, or alternatively, each image may be registered to a 3D model associated with that image, and based on such registration depth values may be determined for pixels of the image. At block 110, for each image, and for each pixel of the image, processing logic determines a depth value based on registration of the image to the associated 3D surface/model. In one embodiment, a depth value is determined for an entire image, and that depth value is applied to each of the pixels in the image.

Once the depth values are determined for the pixels of the images, processing logic may have enough information to train one or more uniformity correction models provided there are enough images in a training dataset. However, other types of information may also be considered to improve an accuracy of the one or more uniformity correction models.

In one embodiment, at block 1512, for each image, and for each pixel of the image, processing logic determines a normal to the associated 3D surface/model at the pixel. This information may be determined based on the registration of the image to the associated 3D surface/model. At block 1515, for each image, and for each pixel of the image, processing logic determines an angle between the normal to the associated 3D surface/model at the pixel and an imaging axis of the camera and/or of the intraoral scanner. The imaging axis of the camera that generated an image may be normal to a plane of the image. As the angle between the normal to the surface an the imaging axis increases, the accuracy of information for that surface in the image decreases. For example, the error for the information of the surface is high for an angle of close to 90 degrees. Accordingly, the angle between the imaging axis and the normal to the surface may be determined for each pixel and may be used to weight the pixel's contribution to training of a uniformity correction model.

Different materials may have different optical properties. For example, some materials may have higher reflectance than other materials, such as teeth may have a higher reflectance than gingiva, and metal implants in a patient's mouth may have a higher reflectivity than teeth. In some embodiments, such information is taken into account for uniformity correction models. In one embodiment, at block 1516, for each image, processing logic inputs the image into a trained machine learning model that outputs a pixel-level classification of the image. The pixel-level classification of the image may include classification into two or more dental object classes, such as a tooth class and a gingiva class.

At block 1518, processing logic uses the training dataset as augmented with additional information as determined at one or more of blocks 1504-1516 to train one or more uniformity correction models. In one embodiment, processing logic uses the pixel coordinates, intensity values and depth values of pixels in the images of a training dataset to train the one or more uniformity correction models to attenuate the non-uniform illumination for images generated by cameras of the intraoral scanner. A different uniformity correction model may be trained for each camera of the intraoral scanner. This may include generating separate training datasets for each camera, where each training dataset is restricted to images generated by that camera. In one embodiment, for each camera of the intraoral scanner a different uniformity correction model is trained for each dental object class. For example, the training dataset may be divided into multiple training datasets, where there is a different training dataset for each dental object class used to train one or more uniformity correction models to apply to pixels depicting a particular type of dental object (e.g., having a particular material). In one embodiment, processing logic uses the pixel coordinates, intensity values, depth values, dental object classes, and/or angles between surface normals and imaging axis of pixels in the images of a training dataset to train the one or more uniformity correction models to attenuate the non-uniform illumination for images generated by cameras of the intraoral scanner.

In some embodiments, one or more uniformity correction models may already exist for an intraoral scanner. For example, one or more general uniformity correction models may have been trained for a particular make and/or model of intraoral scanner. However, such a general uniformity correction model may not account for manufacturing variations between scanners. In one embodiment, at block 1518 processing logic retrains one or more existing uniformity correction models for a specific intraoral scanner or trains one or more replacement uniformity correction models for the specific intraoral scanner using data generated by that specific intraoral scanner (e.g., using only data generated by that specific intraoral scanner). This model may be more accurate than a general model trained for intraoral scanners of a particular make and/or model but not for a specific intraoral scanner having that make and/or model. Once the specific model is trained, it may replace the general model.

In one embodiment, at block 1520 training a uniformity correction model includes updating a cost function that applies a cost based on a different between an intensity value of a pixel and a target intensity value. The target intensity value may be, for example, an average intensity value determined from experimentation or based on averaging over intensity values of multiple images. The cost function may be updated to minimize a cost across pixels of the plurality of images, where the cost increases with increases in the differences between the intensity values of pixels and the target intensity value. In some embodiments, a regression analysis is performed to train the uniformity correction model. For example, at least one of a least squares regression analysis, an elastic-net regression analysis, or a least absolute shrinkage and selection operator (LASSO) regression analysis may be performed to train the uniformity correction model.

The data included in the training datasets is not synesthetic. Additionally, the data is generally sparse data, meaning that there is not data for each pixel location and each depth for all cameras. Accordingly, in embodiments the trained uniformity correction models are low order polynomial models. This prevents the chance of following noise and over-fitting the models, and provides an optimal average value for every continuous input. The optimization can be performed, for example, as a least squares problem or other regression analysis problem in which processing logic attempts to replicate an input target intensity value, DN. In one embodiment, the target intensity value DN represents a target gray level, such as a value of 200 or 250. In one embodiment, processing logic optimized the following function to generate a trained uniformity correction model:

$$J = \sum_k \left(P\left(u^k, v^k, Z^k, C^k\right) - dn^k\right)^2 \quad (1)$$

Where J is the cost function, P( ) is the model output, k is a sample image, $u^k$, $v^k$ are the image location (e.g., pixel coordinates) of the Kth sample, $Z^k$ is the distance of the object from the wand (e.g., depth associated with a pixel) for the kth sample, $C^k$ is the camera the captured that image for the kth same, and $d^{nk}$ is the target intensity for the kth sample.

In some embodiments, method 1500 is performed separately for each color channel. Accordingly, a different uniformity correction model may be trained for each color channel and for each camera. For example, a first model may be trained for a red color channel for a first camera, a second model may be trained for a blue color channel for the first camera, and a third model may be trained for a green color channel for the first camera.

In embodiments, a trained uniform correction model may be a trained function, which may be a unique function generated for a specific camera of an intraoral scanner (and optionally for a specific color channel) based on images captured by that camera. Each function may be based on two-dimensional (2D) pixel locations as well as depth values associated with those 2D pixel locations. A set of functions (one per color channel of interest) may be generated for a camera in an embodiment, where each function provides the intensity, I, for a given color channel, c, at a given pixel location (x,y) and a given depth (z) according to one of the following equations:

$$I_c(x, y, z) = f(x, y) + g(z) \quad (2a)$$

$$I_c(x, y, z) = f(x, y)g(z) \quad (2b)$$

As shown in equations 2a-2b above, the function for a color channel may include two sub-functions f(x,y) and g(z). The interaction between these two sub-functions can be modeled as an additive interaction (as shown in equation 2a) or as a multiplicative interaction (as shown in equation 2b). If the interaction effect between the sub-functions is multiplicative, then the rate of change of the intensity also depends on the 2D location (x,y). Functions f(x,y) and g(z) may both be parametric functions or may both be non-parametric functions. Additionally, a first one of function f(x,y) and g(z) may be a parametric function and a second of f(x,y) and g(z) may be a non-parametric function. In an example, the intensity I (or lightness L) may be set up as a random variable with Gaussian distribution, with a conditional mean being a function of x, y and z. In some embodiments, separate functions are not determined for separate color channels.

In one embodiment, the LAB color space is used for uniformity correction models, and lightness (L) is modeled as a function of 2D location (x,y) and depth (z). For example, images may be generated in the RGB color space and may be converted to the LAB color space.

In one embodiment, RGB is modeled as a second degree polynomial of (x,y) pixel location. In one embodiment, for depth (z), lightness (L) is modeled as a function of x, y and z. Color channels may be kept as in the above second degree polynomial.

The sub-functions may be combined and converted to the RGB color space. The sub-functions may be set up as polynomials of varying degree and/or as other parametric functions or non-parametric functions. Additionally, multiple different interaction effects between the sub-functions may be modeled (e.g., between f(x,y) and g(z)). Accordingly, in one embodiment the lightness L may be modeled according to one of the following equations:

$$E[L \mid (x, y, z)] = f(x, y) + g(z) \quad (3a)$$

$$E[L \mid (x, y, z)] = f(x, y)g(z) \quad (3b)$$

where E is the expectation or mean.

There are multiple different functions that may be used for f and g above, and these functions may be combined in multiple different ways. In one embodiment, f is modeled as a second degree polynomial and g is modeled as a linear function, as follows:

$$f(x, y) = a_0 + a_1x^2 + a_2y^2 \quad (4)$$

-continued $$g(z)=b_0+b_1z \quad (5)$$

where $a_0$, $a_1$, $a_2$, $b_0$ and $b_1$ are coefficients (parameters) for each term of the functions, x is a variable representing a location on the x axis, y is a variable representing a location on the y axis (e.g., x and y coordinates for pixel locations, respectively), and z is a variable representing depth (e.g., location on the z axis).

A multiplicative combination of these functions results in:

$$I_c(x,y,z)=w_0+w_1x^2+w_2y^2+w_3x^2z+w_4y^2z \quad (6)$$

An additive combination of these functions results in:

$$I_c(x,y,z)=w_0+w_1x^2+w_2y^2+w_3z \quad (7)$$

where $w_0$ may be equal to $a_0+b_0$, $w_1$ may be equal to $a_1$, $w_2$ may be equal to $a_2$ and $w_3$ may be equal to $b_1$.

These embodiments result in stable models that are efficient and fast to solve for.

If the function is a parametric function, then it may be solved using linear regression (e.g., multiple linear regression). Some example techniques that may be used to perform the linear regression include the ordinary least squares method, the generalized least squares method, the iteratively reweighted least squares method, instrumental variables regression, optimal instruments regression, total least squares regression, maximum likelihood estimation, rigid regression, least absolute deviation regression, adaptive estimation, Bayesian linear regression, and so on.

If the function is a non-parametric function, then it may be solved using back-fitting. To perform back-fitting, both functions f and g are initial set as constant functions. Then processing logic iterates between fixing a first function, and fitting the residual $L-\hat{L}$ against the second function. Then alternating and fixing the second function and fitting the residual $L-\hat{L}$ against the first function. This may be repeated one or more times until the residual falls below some threshold.

An example non-parametric function that may be used is a spline, such as a smoothing spline. Non-parametric models like natural splines have local support and are more stable than high degree polynomials. However, the fitting process for non-parametric functions takes longer and uses more computing resources than the fitting process for parametric functions.

In some embodiments, method 1500 is performed by a server computing device that may be remote from one or more locations at which intraoral scan data (e.g., including intraoral scans and/or images) has been generated. The server computing device may process the information and may ultimately generate one or more uniformity correction models. The server computing device may then transmit the uniformity correction model(s) to intraoral scanning systems (e.g., that include a scanner and an associated computing device) for implementation.

In some embodiments, as an intraoral scanner ages the intensity of one or more light sources may change (e.g., may decrease). Such a gradual decrease in intensity of the one or more light sources may be captured in the images, and may be accounted for in the generated uniformity correction models. This may ensure that an intraoral scanner will not fall out of calibration as it ages and its components change over time.

Figure 16:
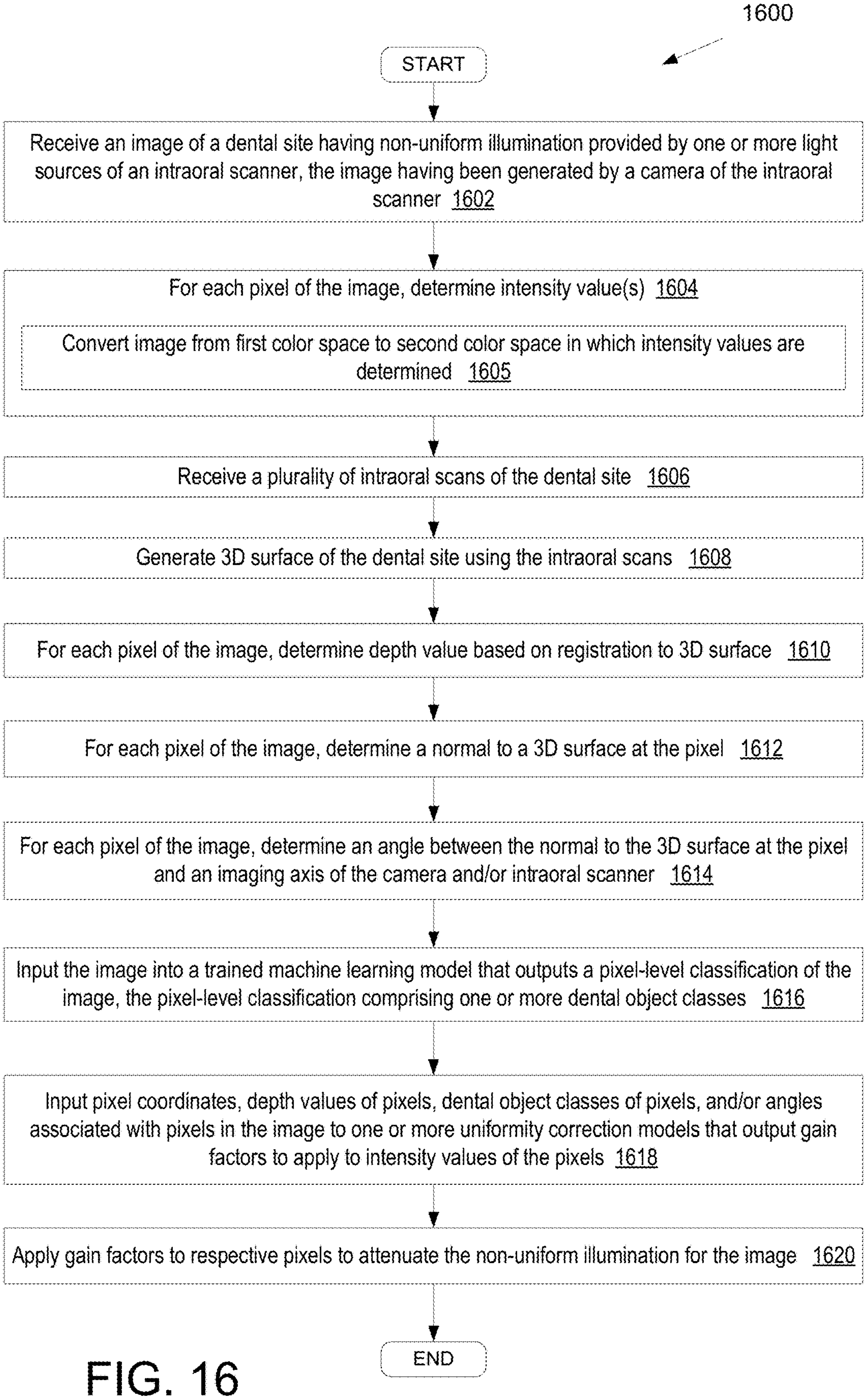
FIG. 16 is a flow chart for a method of attenuating the non-uniform illumination of an image generated by an intraoral scanner, in accordance with embodiments of the present disclosure.

Once a uniformity correction model (or set of uniformity correction models) has been trained, that model(s) may be used to correct the brightness of images on a per-pixel basis, causing the images to have more uniform color and brightness. FIG. 16 is a flow chart for a method 1600 of attenuating the non-uniform illumination of an image generated by an intraoral scanner, in accordance with embodiments of the present disclosure. At block 1602 of method 1600, processing logic receives in image of a dental site that had non-uniform illumination during capture of the image by one or more light sources of an intraoral scanner. The image may have been generated by a particular camera of the intraoral scanner.

At block 1604, processing logic may determine the intensity values of each pixel in the image. This may include determining separate intensity values for different color channels, such as a green value, a blue value and a red value for an RGB image. These intensity values may be combined to generate a single intensity value in an embodiment. In one embodiment, processing logic converts the image from a first color space in which it was generated (e.g., an RGB color space) into a second color space (e.g., such as a LAB color space or YUV color space). In one embodiment, the intensity values of the pixels are determined in the second color space.

At block 1606, processing logic receives a plurality of intraoral scans of the dental site, the intraoral scans also having been generated by the intraoral scanner. At block 1608, processing logic generates a 3D surface of the dental site using the intraoral scans.

At block 1610, processing logic determines a depth value for each pixel of the image based on registering the image to the 3D surface. In one embodiment, processing logic determines a single depth value to apply to all pixels of the image. Alternatively, processing logic may determine a depth value for each pixel, where different pixels may have different depth values.

In one embodiment, at block 1612, for each pixel of the image, processing logic determines a normal to the associated 3D surface/model at the pixel. This information may be determined based on the registration of the image to the associated 3D surface/model. At block 1614, for each pixel of the image, processing logic determines an angle between the normal to the associated 3D surface/model at the pixel and an imaging axis of the camera and/or of the intraoral scanner. The imaging axis of the camera that generated an image may be normal to a plane of the image. As the angle between the normal to the surface an the imaging axis increases, the accuracy of information for that surface in the image decreases. For example, the error for the information of the surface is high for an angle of close to 90 degrees. Accordingly, the angle between the imaging axis and the normal to the surface may be determined for each pixel and may be used to weight the pixel's contribution to training of a uniformity correction model.

In one embodiment, at block 1616, processing logic inputs the image into a trained machine learning model that outputs a pixel-level classification of the image. The pixel-level classification of the image may include classification into two or more dental object classes, such as a tooth class and a gingiva class. In one embodiment, the machine learning model is a trained neural network that outputs a mask or bitmap classifying pixels.

At block 1618, processing logic inputs the data for the image (e.g., pixel coordinates, depth value, camera identifier, dental object class, angle between surface normal and imaging axis, etc.) into one or more trained uniformity correction models or functions. The uniformity correction models may include a different model for each camera in one embodiment. In one embodiment, the uniformity correction models include, for each camera, a different model for each color channel. In one embodiment, the uniformity correction models include, for each camera, a different model for each dental object class or material type. The uniformity correction model(s) receive the input information and output gain factors to apply to the intensity values of pixels in the image.

At block 1620, processing logic applies the determined gain factors (e.g., as output by the uniformity correction model(s) to the respective pixels to attenuate the non-uniform illumination for the image. This may include multiplying the gain factor to the intensity value for the pixel, which might cause the intensity value to increase or decrease depending on the gain factor. For example, for each pixel the collected information about that pixel may be input into a uniformity correction model, which may output a gain factor to apply to the intensity of that pixel. Due to the non-uniform illumination of a dental site captured in the image, some regions of the image may tend to be dark, while other regions may tend to be bright. The uniformity correction model may act to brighten the dark regions and darken the bright regions, achieving a more uniform overall brightness or intensity across the image that might have been achieved had there been uniform lighting conditions.

Method 1600 may be applied to images during intraoral scanning as the images are captured. The attenuated images may then be stored together with or instead of non-attenuated images. In embodiments, method 1600 may be performed on images before those images are used for other operations such as texture mapping of colors to a 3D surface. In embodiments, method 1600 is run in real time or near real time as images are captured. During scanning, a 3D surface may be generated from intraoral scans, and color information from associated 2D color images may be attenuated using the uniformity correction models described herein before they are used to perform texture mapping to add color information to the 3D surface. In some embodiments, one or more of methods 300-900 are performed to select a subset of the image, and attenuation is only performed to the selected subset of images, reducing an amount of processing that is performed for color correction. The attenuated subset of images may then be used to perform texture mapping of color information to the 3D surface.

As additional intraoral scans are received, the 3D surface may be updated and added to. Additionally as additional associated 2D images are received, those images may be scored and a subset of the images may be selected and then have their intensity attenuated before being applied to the updated 3D surface. Other image processing may also be performed on images for averaging out the color information mapped to the 3D surface to smooth out the texture mapping.

Figure 17A:
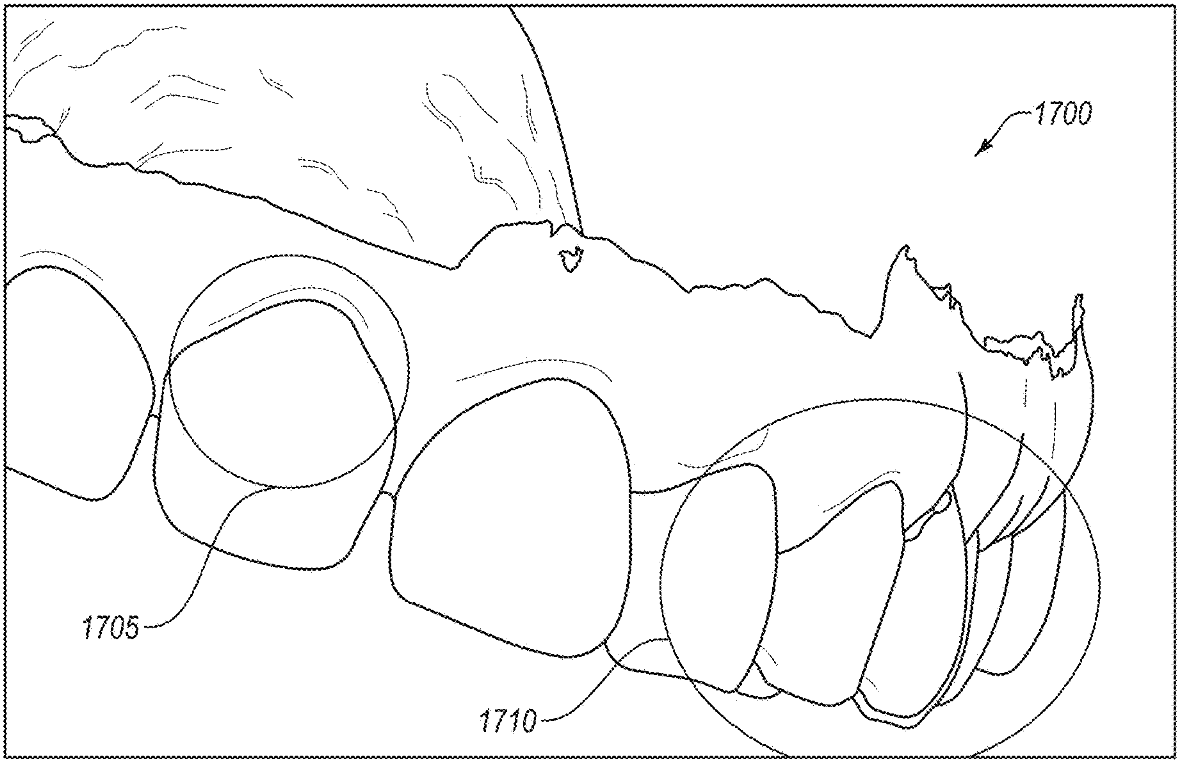
FIGS. 17A-B illustrate an image of a dental site generated by an intraoral scanner before and after attenuation of non-uniform illumination, in accordance with embodiments of the present disclosure.
Figure 17B:
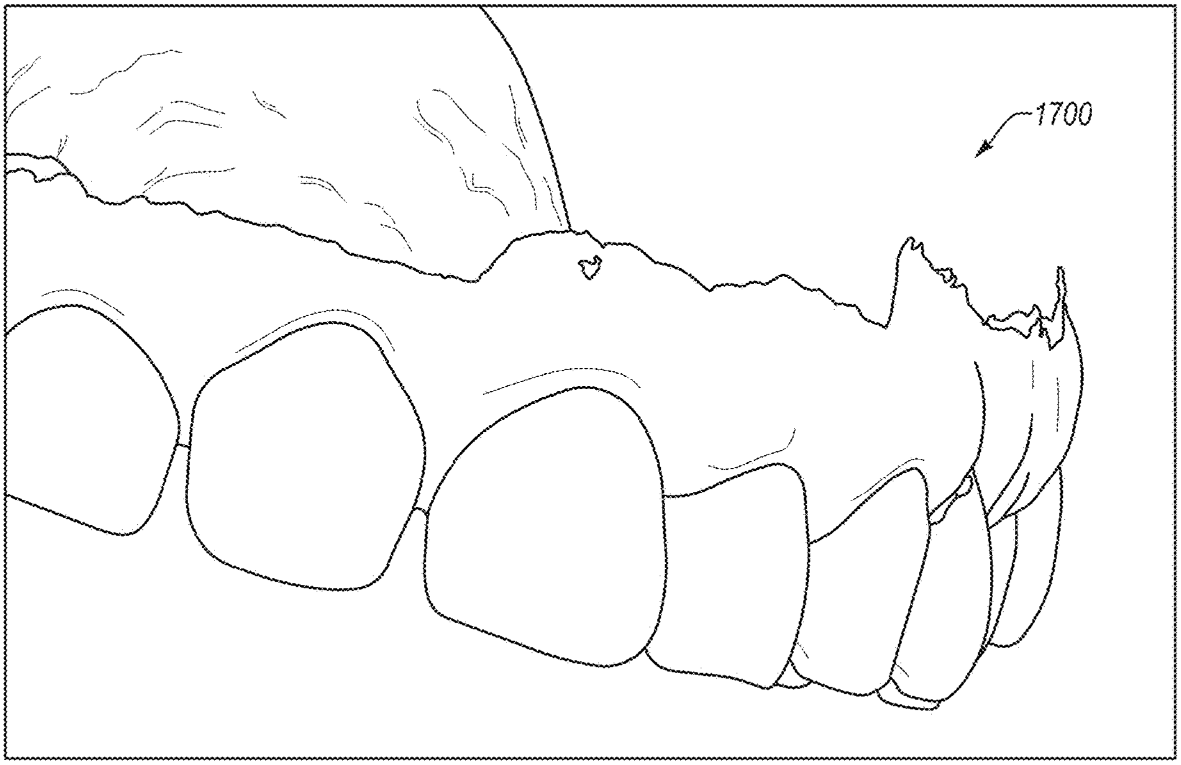

In embodiments, method 600 may be performed on images to correct brightness information of pixels in the image before performing one or more additional image processing operations on the images. Examples of further operations that may be performed on the images includes outputting the images to a display, selecting a subset of the images, calculating an interproximal spacing between teeth in the images, FIGS. 17A-B illustrate an image of a dental site generated by an intraoral scanner before and after attenuation of non-uniform illumination using a trained uniformity correction model, in accordance with embodiments of the present disclosure. FIG. 17A shows the image before attenuation of non-uniform illumination 1700, which includes overly bright regions 1705, 1710. FIG. 17B shows the image after attenuation of the non-uniform illumination 1720, in which the overly bright regions have been attenuated.

Figure 18A:
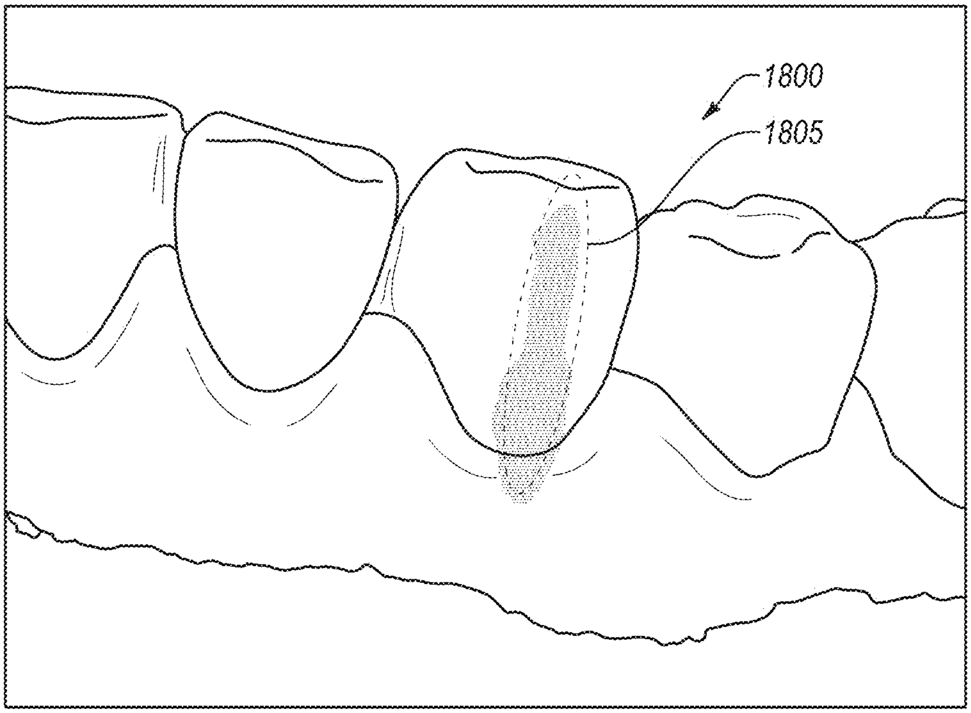
FIGS. 18A-B illustrate an image of a dental site generated by an intraoral scanner before and after attenuation of non-uniform illumination, in accordance with embodiments of the present disclosure.
Figure 18B:
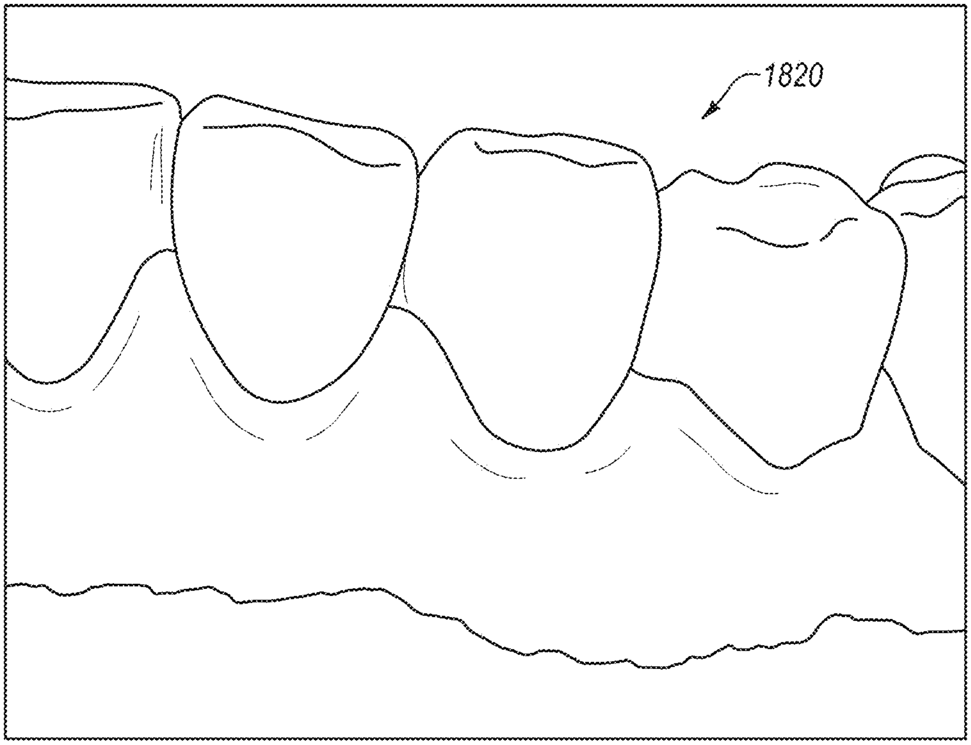

FIGS. 18A-B illustrate an image of a dental site generated by an intraoral scanner before and after attenuation of non-uniform illumination using a trained uniformity correction model, in accordance with embodiments of the present disclosure. FIG. 18A shows the image before attenuation of non-uniform illumination 1800, which includes a darkened region 1805. FIG. 18B shows the image after attenuation of the non-uniform illumination 1820, in which the dark region has been attenuated.

Figure 19:
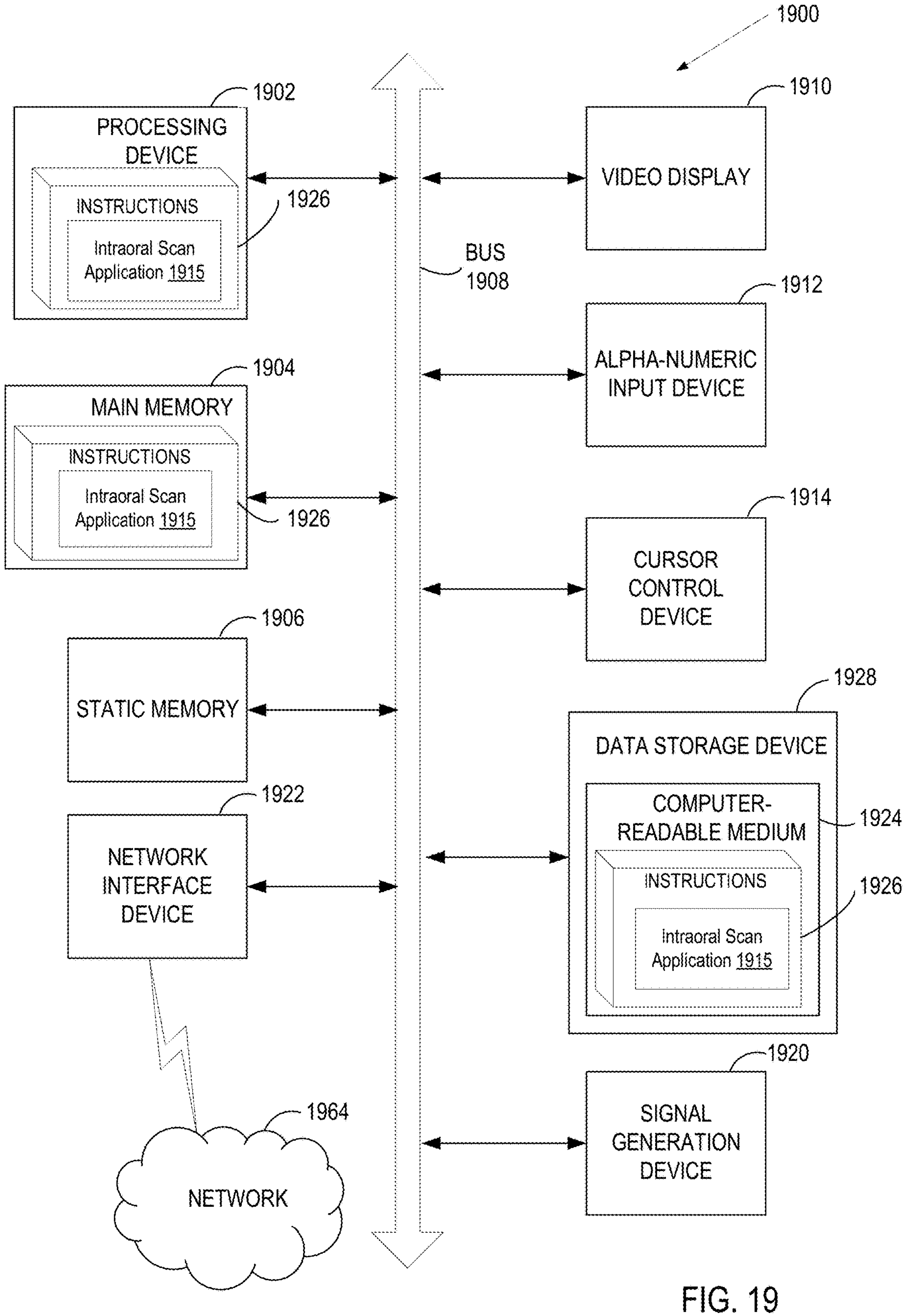
FIG. 19 illustrates a block diagram of an example computing device, in accordance with embodiments of the present disclosure.

FIG. 19 illustrates a diagrammatic representation of a machine in the example form of a computing device 1900 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The computing device 1900 may correspond, for example, to computing device 105 and/or computing device 106 of FIG. 1. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 1900 includes a processing device 1902, a main memory 1904 (e.g., read-only memory (ROM), flash memory, dynamic random access memory (DRAM) such as synchronous DRAM (SDRAM), etc.), a static memory 1906 (e.g., flash memory, static random access memory (SRAM), etc.), and a secondary memory (e.g., a data storage device 1928), which communicate with each other via a bus 1908.

Processing device 1902 represents one or more general-purpose processors such as a microprocessor, central processing unit, or the like. More particularly, the processing device 1902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1902 may also be one or more special-purpose processing devices such as an application specific integrated circuit (ASIC), a field programmable gate array (FPGA), a digital signal processor (DSP), network processor, or the like. Processing device 1902 is configured to execute the processing logic (instructions 1926) for performing operations and steps discussed herein.

The computing device 1900 may further include a network interface device 1922 for communicating with a network 1964. The computing device 1900 also may include a video display unit 1910 (e.g., a liquid crystal display (LCD) or a cathode ray tube (CRT)), an alphanumeric input device 1912 (e.g., a keyboard), a cursor control device 1914 (e.g., a mouse), and a signal generation device 1920 (e.g., a speaker).

The data storage device 1928 may include a machine-readable storage medium (or more specifically a non-transitory computer-readable storage medium) 1924 on which is stored one or more sets of instructions 1926 embodying any one or more of the methodologies or functions described herein, such as instructions for intraoral scan application 1915, which may correspond to intraoral scan application 115 of FIG. 1. A non-transitory storage medium refers to a storage medium other than a carrier wave. The instructions 1926 may also reside, completely or at least partially, within the main memory 1904 and/or within the processing device 1902 during execution thereof by the computing device 1900, the main memory 1904 and the processing device 1902 also constituting computer-readable storage media.

The computer-readable storage medium 1924 may also be used to store dental modeling logic 1950, which may include one or more machine learning modules, and which may perform the operations described herein above. The computer readable storage medium 1924 may also store a software library containing methods for the intraoral scan application 115. While the computer-readable storage medium 1924 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media.

It is to be understood that the above description is intended to be illustrative, and not restrictive. Many other embodiments will be apparent upon reading and understanding the above description. Although embodiments of the present disclosure have been described with reference to specific example embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. An intraoral scanning system, comprising:

an intraoral scanner to generate intraoral scan data comprising a plurality of images of a dental site and a plurality of intraoral scans of the dental site; and a computing device, connected to the intraoral scanner by a wired or wireless connection, wherein the computing device is to perform the following during intraoral scanning:

receive the intraoral scan data;

generate a three-dimensional (3D) polygonal model of the dental site using the plurality of intraoral scans, the 3D polygonal model comprising a plurality of faces;

identify, for each image of the plurality of images, one or more faces of the plurality of faces that are associated with the image;

for each face of the 3D polygonal model, identify one or more images of the plurality of images that are associated with the face and that satisfy one or more selection criteria;

select a subset of images of the plurality of images, the subset of images comprising the one or more images identified for one or more of the plurality of faces; and discard or ignore a remainder of images of the plurality of images that are not included in the subset of images.

2. The intraoral scanning system of claim 1, wherein the computing device is further to perform at least one of:

a) store the selected subset of images without storing the remainder of images from the plurality of images; or b) perform further processing of the subset of images without performing further processing of the remainder of images.

3. The intraoral scanning system of claim 1, wherein the plurality of images comprises at least one of:

a) a plurality of color two-dimensional (2D) images; or b) a plurality of near-infrared (NIR) two-dimensional (2D) images.

4. The intraoral scanning system of claim 1, wherein the computing device is further to:

receive one or more additional images of the dental site generated by the intraoral scanner during the intraoral scanning;

determine that the one or more additional images satisfy the one or more selection criteria and cause an image of the subset of images to no longer satisfy the one or more selection criteria;

select the one or more additional images that satisfy the one or more selection criteria;

remove the image that no longer satisfies the one or more selection criteria from the subset of images; and discard or ignore the image that no longer satisfies the one or more selection criteria.

5. The intraoral scanning system of claim 1, wherein the 3D polygonal model is a simplified polygonal model having about 600 to about 3000 faces, and wherein at least one of:

a) the subset of images comprises, for each face of the 3D polygonal model, at least one image associated with the face; or b) the subset of images comprises, for each face of the 3D polygonal model, at most one image associated with the face.

6. The intraoral scanning system of claim 5, wherein the computing device is further to:

determine a number of faces to use for the 3D polygonal model.

7. The intraoral scanning system of claim 1, wherein identifying one or more faces of the 3D polygonal model associated with an image comprises:

determining a position of a camera that generated the image relative to the 3D polygonal model;

generating a synthetic version of the image by projecting the 3D polygonal model onto an imaging plane associated with the determined position of the camera; and identifying the one or more faces of the 3D polygonal model in the synthetic version of the image.

8. The intraoral scanning system of claim 7, wherein the synthetic version of the image comprises a height map.

9. The intraoral scanning system of claim 7, wherein determining the position of the camera that generated the image relative to the 3D polygonal model comprises:

determining a first position of the camera relative to the 3D polygonal model based on a first intraoral scan generated prior to generation of the image;

determining a second position of the camera relative to the 3D polygonal model based on a second intraoral scan generated after generation of the image; and interpolating between the first position of the camera relative to the 3D polygonal model and the second position of the camera relative to the 3D polygonal model-based.

10. The intraoral scanning system of claim 7, wherein the computing device is further to:

determine a face of the 3D polygonal model assigned to each pixel of the synthetic version of the image;

identify a foreign object in the image;

determine which pixels from the synthetic version of the image are associated with a particular face overlap with the foreign object in the image; and subtract those pixels that are associated with the particular face and that overlap with the foreign object in the image from a count of a number of pixels of the synthetic version of the image that are associated with the particular face.

11. The intraoral scanning system of claim 1, wherein the computing device is further to:

for each image of the plurality of images, determine a respective score for each face of the 3D polygonal model;

wherein identifying, for each face of the 3D polygonal model, the one or more images that are associated with the face and that satisfy the one or more selection criteria comprises determining that the one or more images have a highest score for the face.

12. The intraoral scanning system of claim 11, wherein the computing device is further to:

for each image of the plurality of images, assign a face of the 3D polygonal model to each pixel of the image;

wherein determining, for an image of the plurality of images, the score for a face of the 3D polygonal model comprises determining a number of pixels of the image assigned to the face of the 3D polygonal model.

13. The intraoral scanning system of claim 11, wherein the computing device is further to:

for each image of the plurality of images, and for one or more faces of the 3D polygonal model, perform the following comprising:

determine one or more properties associated with the one or more faces and the image; and apply a weight to the score for the one or more faces based on the one or more properties.

14. The intraoral scanning system of claim 11, wherein the computing device is further to:

for each image of the plurality of images, perform the following comprising:

determine one or more properties associated with the image; and apply a weight to the respective score for each face of the 3D polygonal model that is associated with the image based on the one or more properties.

15. The intraoral scanning system of claim 11, wherein the computing device is further to:

sort the faces of the 3D polygonal model based on scores of the one or more images associated with the faces; and select a threshold number of faces associated with images having highest scores.

16. The intraoral scanning system of claim 15, wherein the computing device is further to:

discard or ignore images associated with faces not included in the threshold number of faces.

17. The intraoral scanning system of claim 1, wherein the computing device is further to:

perform texture mapping of the 3D polygonal model based on information from the subset of images without using information from the remainder of the plurality of images.

18. A non-transitory computer readable medium comprising instructions that, when executed by a processing device, cause the processing device to perform operations during an intraoral scanning session, comprising:

receiving a plurality of images of a dental site generated by an intraoral scanner;

receiving a plurality of intraoral scans of the dental site generated by the intraoral scanner;

generating a three-dimensional (3D) polygonal model of the dental site using the plurality of intraoral scans, the 3D polygonal model comprising a plurality of faces;

identifying, for each image of the plurality of images, one or more faces of the plurality of faces that are associated with the image;

for each face of the 3D polygonal model, identifying one or more images of the plurality of images that are associated with the face and that satisfy one or more selection criteria;

selecting a subset of images of the plurality of images, the subset of images comprising the one or more images identified for one or more of the plurality of faces;

discarding or ignoring a remainder of images of the plurality of images that are not included in the subset of images; and performing texture mapping of the 3D polygonal model of the dental site based on information from the subset of images without using information from the remainder of the plurality of images.

19. The non-transitory computer readable medium of claim 18, wherein identifying one or more faces of the 3D polygonal model associated with an image comprises:

determining a position of a camera that generated the image relative to the 3D polygonal model;

generating a synthetic version of the image by projecting the 3D polygonal model onto an imaging plane associated with the determined position of the camera; and identifying the one or more faces of the 3D polygonal model in the synthetic version of the image.

20. The non-transitory computer readable medium of claim 18, the operations further comprising:

for each image of the plurality of images, determining a respective score for each face of the 3D polygonal model;

wherein identifying, for each face of the 3D polygonal model, the one or more images that are associated with the face and that satisfy the one or more selection criteria comprises determining that the one or more images have a highest score for the face.

* * * * *